US007038228B2

(12) United States Patent
Hasegawa et al.

(10) Patent No.: US 7,038,228 B2
(45) Date of Patent: *May 2, 2006

(54) IMAGE FORMING APPARATUS WITH SPECIFIC DOCUMENT DETERMINING MODULE AND ABNORMALITY DETECTION MEANS

(75) Inventors: Yutaka Hasegawa, Tokyo (JP); Takeshi Ukai, Kanagawa (JP); Hideaki Yamagata, Kanagawa (JP); Kazuhisa Ohtsubo, Kanagawa (JP); Mamoru Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 312 days.

This patent is subject to a terminal disclaimer.

(21) Appl. No.: 10/640,021

(22) Filed: Aug. 14, 2003

(65) Prior Publication Data

US 2004/0046988 A1 Mar. 11, 2004

Related U.S. Application Data

(62) Division of application No. 09/408,127, filed on Sep. 29, 1999, now Pat. No. 6,696,696, which is a division of application No. 08/957,737, filed on Oct. 24, 1997, now Pat. No. 6,025,603.

(30) Foreign Application Priority Data

| Oct. 25, 1996 | (JP) | ................................... 8-284396 |
| Oct. 25, 1996 | (JP) | ................................... 8-284397 |
| Oct. 31, 1996 | (JP) | ................................... 8-289894 |
| Oct. 31, 1996 | (JP) | ................................... 8-289895 |
| Nov. 6, 1996 | (JP) | ................................... 8-294194 |

(51) Int. Cl.
*G06K 11/00* (2006.01)
(52) U.S. Cl. ........................ 250/556; 399/366; 382/135

(58) Field of Classification Search ................ 250/556; 382/135, 137; 399/366
See application file for complete search history.

(56) References Cited

U.S. PATENT DOCUMENTS

| 4,524,276 | A | 6/1985 | Ohtombe ................ 250/338.1 |
| 5,038,223 | A | 8/1991 | Yamada ..................... 348/445 |
| 5,260,582 | A | 11/1993 | Danek et al. ............... 250/556 |
| 5,502,575 | A | 3/1996 | Kai et al. ................... 358/405 |
| 5,640,467 | A | 6/1997 | Yamashita et al. .......... 382/181 |
| 5,672,859 | A | 9/1997 | Samyn et al. ............... 235/468 |
| 5,682,103 | A | 10/1997 | Burrell ....................... 324/642 |
| 6,025,603 | A | 2/2000 | Hasegawa et al. .......... 250/556 |
| 6,185,321 | B1 * | 2/2001 | Fukushima et al. ......... 382/135 |

FOREIGN PATENT DOCUMENTS

WO   WO 95/24000   9/1995

\* cited by examiner

*Primary Examiner*—Thanh X. Luu
(74) *Attorney, Agent, or Firm*—Oblon, Spivak, McClelland, Maier & Neustadt, P.C.

(57) ABSTRACT

The present specific document determining apparatus according to the present invention comprises a microwave sensor for irradiating a microwave to and scanning a document, detecting a reflected portion of the irradiated microwave, outputting a first detection signal, again irradiating a microwave and scanning the document after the document is placed on a contact glass, detecting a reflected portion of the irradiated microwave, and outputting a second detection signal; a signal processing section for using the first detection signal as a reference signal and comparing a level of the reference signal to a level of the second detection signal to make determination as to whether metallic fiber is included in the document or not, and a controller for making determination as to whether the document is a specific one or not according to a result of determination by the signal processing section.

4 Claims, 57 Drawing Sheets

IMAGE FORMING APPARATUS WITH SPECIFIC DOCUMENT DETERMINING MODULE AND ABNORMALITY DETECTION MEANS

FIELD OF THE INVENTION

The present invention relates to a specific document determining apparatus, an image reading apparatus for, and a specific document determining method of making determination as to whether a document is a specific document (note) such as bills or marketable securities with metallic fiber included therein or not by detecting metallic fiber included in a document using a microwave, and to a computer-readable recording medium with a program for execution of the same stored therein, and more particularly to a specific document determining apparatus, an image reading apparatus, and a specific document determining method each always enabling determination of a specific document such as bills or marketable securities with metallic fiber included therein at high accuracy even if a condition for detecting the metallic fiber has changed, and to a computer-readable recording medium with a program for execution of the same stored therein.

The present invention further relates to a specific document determining method for preventing a specific document (note) such as bills or marketable securities with metallic fiber included therein by detecting metallic fiber existing in a document from being illegally copied, a computer-readable recording medium with a program for execution of the method stored therein, a specific document determining apparatus, and an image reading apparatus available for the method, and more particularly to a specific document determining method for preventing a specific document (note) such as bills or marketable securities with metallic fiber included therein from being illegally copied, said method enabling detection of metallic fiber with improved accuracy, a computer-readable recording medium for execution of the method, a specific document determining apparatus, and an image reading apparatus available for the method.

The present invention relates to an image reading apparatus having a specific document determining function for preventing a specific document (note) such as bills or marketable securities with metallic fiber included therein from being illegally copied by detecting metallic fiber included in a document by means of using a microwave, an method of controlling an image reading apparatus having a specific document determining function, and a computer-readable recording medium with a program for execution of the control method stored therein, and more particularly to an image reading apparatus having a specific document determining function for preventing a human body from being affected by a microwave by preventing irradiation of a microwave to the human body, a method of controlling the image reading apparatus having the specific document determining function, and a computer-readable recording medium with a program for execution of the control program stored therein.

The present invention further relates to a specific document determining apparatus for making determination as to whether a document is a specific document (note) such as bills or marketable securities with metallic fiber included therein or not by detecting metallic fiber included in the document by means of using a microwave, and more particularly to a specific document determining apparatus with improved accuracy in determination of a specific document for making determination as to whether a microwave sensor for detecting metallic fiber is operating normally or not.

The present invention further relates to an image forming apparatus comprising a specific document determining apparatus for making determination as to whether a document is a specific document (note) such as bills or marketable securities and having a function to prevent a document determined as a specific document from being illegally copied, and more particularly to an image forming apparatus for preventing a specific document from being illegally copied and at the same time enabling continuous execution of the copying operation by restricting the functions or changing the image processing even when any abnormality occurs in the specific document determining apparatus due to a breakdown thereof or so and a processing for determination of a specific document can not be executed.

BACKGROUND OF THE INVENTION

In recent years, in association with improvement in the image processing technology as well as in the image forming technology it has become possible to form an image so precisely that a copied bill copied with a color copying machine can not easily be differentiated from an actual bill. For this reason there has been developed an apparatus for determining a specific document such as bills or marketable securities inhibited to be copied and for inhibiting an illegal operation for copying when it is determined that the document is a specific document, and also there has been proposed an image forming apparatus such as a copying machine with a function for determining a specific document incorporated therein.

As the specific document as described above, there are bills with metallic fiber included therein to indicate that the bills are specific documents. To differentiate the specific documents from ordinary documents as described above, it is required only to detect metallic fiber included in a document. For this purpose, as an image forming apparatus having a function to determine a specific document with metallic fiber included therein, there has been proposed an apparatus comprising a microwave sensor for irradiating a microwave to a document, detecting a transmitted wave or a reflected wave of the irradiated microwave, and outputting a detection signal, and a signal determining section for receiving the detection signal outputted from the microwave sensor and making determination as to whether metallic fiber is included in the document or not.

The microwave sensor in the image forming apparatus is provided generally in an image reading unit having a CCD or the like for photographing, reciprocates for scanning together with the image reading unit over a document placed on the document base, irradiates a microwave to the document for detecting metallic fiber and detects a reflected wave in the forward direction for scanning. Then the signal determining section receives the detection signal for the reflected wave outputted from the microwave sensor, compares a level of the received detection signal to a preset threshold value, and determines that metallic fiber is included in the document when the level of the detection signal exceeds the threshold value, and also determines that metallic fiber is not included in the document when the level of the detection signal does not exceed the threshold value. As a result, it is determined that the document is a specific document such as bills or marketable securities with metallic fiber included therein when it is determined that metallic fiber is included in the document.

However, in the conventional technology, for example, when a metallic member is included in a pressure plate, when an attached condition of the pressure plate is changed, or when a use environment of the apparatus is changed, a level of a detection signal outputted from the microwave sensor may change, which makes accuracy in detection of metallic fiber included in a document changed.

Also, in the conventional technology, any interference elements such as a noise due to an influence of vibrations of the image reading unit and changing in temperature or the like may sometimes be included in the detection signal outputted from the microwave sensor, so that it is not always possible to make determination of a specific document with high accuracy.

In the conventional technology, during the operation for making determination as to whether a document is a specific document or not, a user may unintentionally open the pressure plate. In this case, a microwave may directly be irradiated to the user, and for this reason, it is necessary to design the apparatus so as not to directly irradiate a microwave to a human body.

In the conventional technology, when the microwave sensor is not operating normally, metallic fiber included in a document can not accurately be detected, so that accuracy in determination of a specific document may lower.

In the image forming apparatus based on the conventional technology, when any abnormality occurs in a specific document determining apparatus due to a breakdown thereof or so and determination is not made as to whether the document is a specific document or not, an operation for copying ordinary documents can not be performed until the specific document determining apparatus is got back to normal to operate because action for preventing illegal copying of a specific document is taken by inhibiting whole operations for copying.

Especially, even though illegal copying of bills or marketable securities generally requires color copying, with the conventional technology, copying in a monochrome copy mode used with high frequency is also inhibited in a copying machine having both a color copy mode and a monochrome copy mode, so that it is not possible to make effective use of a copying machine having a color copy mode as well as a monochrome copy mode.

SUMMARY OF THE INVENTION

It is a first object of the present invention to always enable detection of metallic fiber included in a document with high accuracy.

It is a second object of the present invention to improve accuracy in determination of a specific document such as bills or marketable securities with metallic fiber included therein by eliminating influences due to interference elements in a detection signal on the operations.

It is a third object of the present invention to secure safety to a user by stopping irradiation of a microwave when a user happens to open a pressure plate during irradiation of the microwave.

It is a fourth object of the present invention to enable prevention of a specific document such as bills or marketable securities with metallic fiber included therein from being illegally copied even when determination can not be made, because of stopping of an output of a microwave, as to whether a document is a specific document or not.

It is a fifth object of the present invention to secure safety to a user by making a pressure plate incapable of opening when a microwave is irradiated.

It is a sixth object of the present invention to improve accuracy in determination of a specific document by making determination as to whether a microwave sensor is normally operating or not.

It is a seventh object of the present invention to enable prevention of a specific document such as bills or marketable securities from being illegally copied and at the same time to enable continuation of copying operation even when determination can not be made, because of occurrence of any abnormality in a specific document determining apparatus, as to whether a document is a specific document or not.

with the present invention, the apparatus comprises a detector which irradiates a microwave to and scans a specified area of the specific document determining apparatus before the document is placed on the document base, detects a reflected portion of the irradiated microwave, outputs a first detection signal, then irradiates a microwave to and scans the document after the document is placed on the document base and is covered with a pressure plate, detects a reflected portion of the irradiated microwave, and outputs a second detection signal; a first determining unit for making determination as to whether metallic fiber is included in the document or not by using the first detection signal as a reference and comparing a level of the reference signal to a level of the second detection signal; and a second determining unit for making determination according to a result of determination by the first determining unit as to whether the document is the specific document or not, so that a reference signal appropriate to a current environment of the apparatus can be obtained and determination can always be made with constantly high accuracy as to whether a document is a specific document such as bills or marketable securities with metallic fiber included therein or not even if a level of the detection signal outputted from the microwave sensor is changed, for example, when the pressure plate is constructed with a metallic member, when the attached condition of the pressure plate is changed, or when the use environment of the apparatus is changed.

With the present invention, the method comprises a first step of irradiating a microwave to the document in both the forward and backward directions for scanning, detecting a reflected portion thereof, and outputting a detection signal when irradiating a microwave to and scanning the document and detecting a reflected portion of the irradiated microwave; a second step of making determination as to whether metallic fiber is included in the document or not by using detection signals for reflected waves in both the forward and backward directions for scanning detected in the first step; and a third step for making determination, according to a result of determination in the second step, as to whether the document is the specific document or not, so that interference elements such as each direction of irradiation and reflection of a microwave, temperature, signals, and external noises can be removed from detection signals, which allows processing for determination of a specific document with high accuracy to be executed.

The present invention has a pressure plate determining unit for making determination as to whether a pressure plate pressing a document to a document base is in the open state or in the closed state when irradiating a microwave to and scanning the document, and a specific document determining unit for stopping irradiation of a microwave when it is determined by the pressure plate determining unit that the pressure plate is in the open state, and also executing the processing for irradiating a microwave to and scanning a document when it is determined by the pressure plate determining unit that the pressure plate is in the closed state, so that it is possible to prevent a microwave from being directly irradiated to a human body.

The present invention comprises testing members comprising metallic members and non-metallic members provided for checking operations of the microwave sensor, and a determination controller for controlling the microwave sensor to make it irradiate a microwave to and scan the metallic members and non-metallic members, receiving an output signal from the metallic members and an output signal from the non-metallic members each outputted from the microwave sensor, and making determination whether the microwave sensor is working normally or not by comparing the output signal from the metallic members to that from the non-metallic members, so that it is possible to accurately determine whether the microwave sensor is normally working or not. As a result, it is possible to prevent the processing for determining a specific document from being executed when the microwave sensor is not working normally, which improves a precision in determination of a specific document.

The present invention has a controller for having the copying operation executed in the state where some of functions owned by the image forming apparatus are suppressed when any abnormality is detected in the specific document determining apparatus, so that, even when determination of a specific document can not be executed, it is possible to prevent a specific document such as bills or marketable securities from being illegally copied by inhibiting only the copying operations using the suppressed functions, and at the same time to have the copying operation without using the suppressed functions, thus the copying operation being executed continuously. Also all the copying operations are not inhibited, so that down time of the image forming apparatus can be minimized.

Other objects and features of this invention will become understood from the following description with reference to the accompanying drawings.

DESCRIPTION OF THE PREFERRED EMBODIMENTS

Detailed description is made hereinafter for a specific document determining apparatus, an image reading apparatus, a specific document determining method, a computer-readable recording medium with a program for execution of the method stored therein, an image reading apparatus having a specific document determining function, a method for controlling the image reading apparatus having the specific document determining function, a computer-readable recording medium with a program for execution of the same stored therein, and an image forming apparatus according to embodiments of the present invention with reference to the related drawings.

Figure 1:
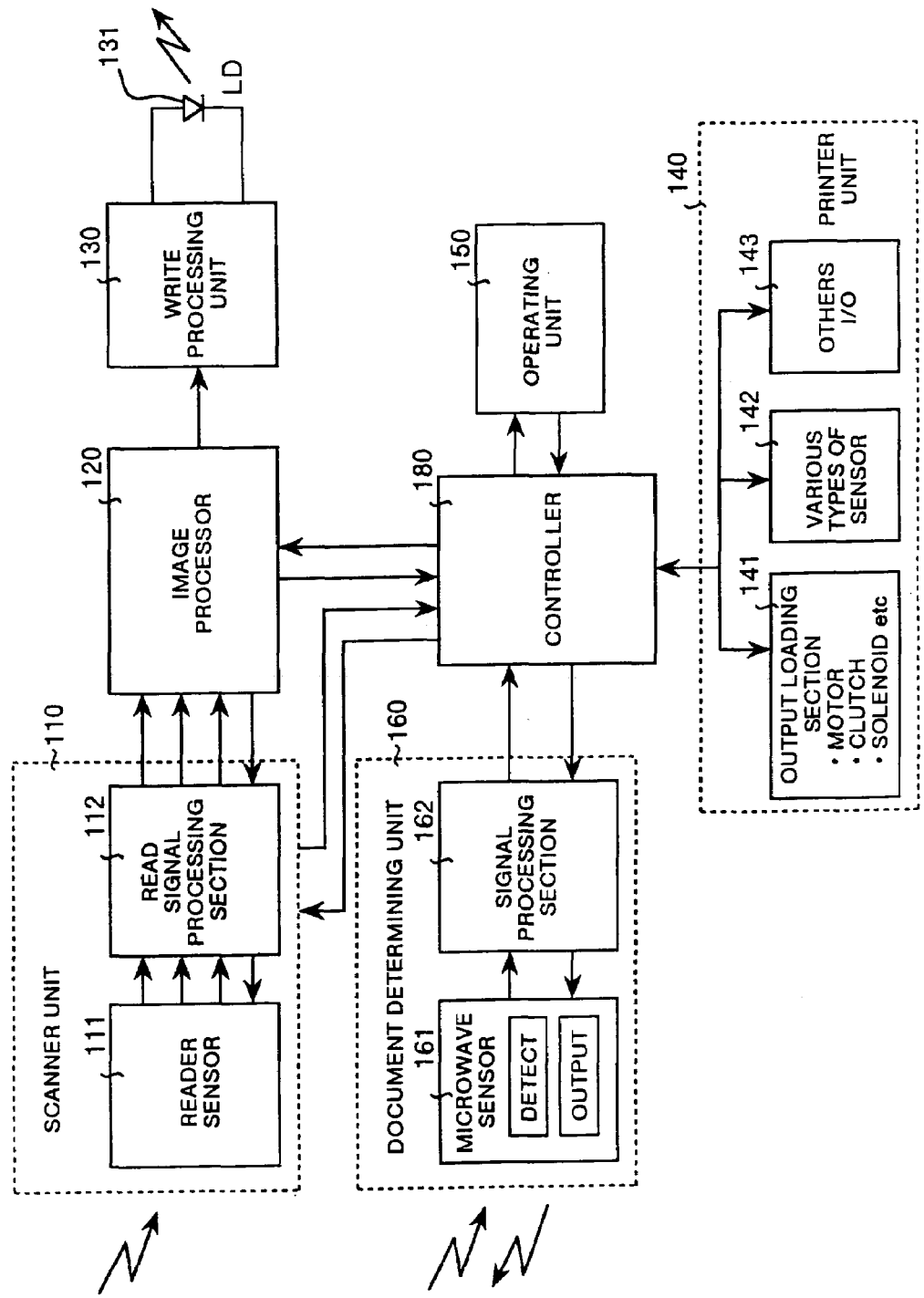
FIG. 1 is a block diagram showing an image reading apparatus to which a specific document determining apparatus according to Embodiment 1 is applied.

FIG. 1 is a block diagram showing an image reading apparatus to which a specific document determining apparatus according to Embodiment 1 is applied. The image reading apparatus shown in FIG. 1 comprises a scanner unit 110 for reading color image data for RGB from a document; an image processor 120 for receiving the color image data from the scanner unit 110 and subjecting the data to γ-correction, RGB/YMCK conversion, gray-scale processing or the like; a write processing unit 130 for emitting a laser diode (LD) 131 to execute image write-in processing; a printer unit 140 for recording a color image on recording paper using a light for writing from the LD 131; an operating unit 150 for inputting various types of mode and displaying massages or the like; a document determining unit 160 for making determination as to whether a document is a specific document such as bills or marketable securities with metallic fiber included therein or not by irradiating a microwave to a document and using a reflected portion of the irradiated microwave; and a controller 180 for controlling each of the above components. It should be noted that the specific document determining apparatus comprises the document determining unit 160 and the controller 180.

In FIG. 1, the scanner unit 110 comprises a reader sensor 111 such as a CCD sensor for reading color image data, and a read signal processing section 112 for subjecting the color image data as an analog signal outputted from the reader sensor 111 to signal processing such as conversion of the data to a digital signal or the like and outputting the signal to the image processor 120.

The printer unit 140 comprises, as shown in FIG. 1, an output loading section 141 including an image forming section (not shown in the figure) comprising a photoconductive drum, a charger, and a developing device, as well as a motor, a clutch, and a solenoid for driving those devices; a various types of sensor 142 for detecting a surface potential and a toner density of the photoconductive drum; and an I/O port 143 for controlling input/output of specified signals.

The image determining unit 160 comprises, as shown in FIG. 1, a microwave sensor 161 for irradiating a microwave to a document, detecting the reflected wave, and outputting a detection signal corresponding to a level of the reflected wave; and a signal processing section 162 for receiving the detection signal outputted from the microwave sensor 161, subjecting the received detection signal to specified signal processing, and making determination as to whether the document is a specific document such as bills or marketable securities with metallic fiber included therein or not.

Figure 2:
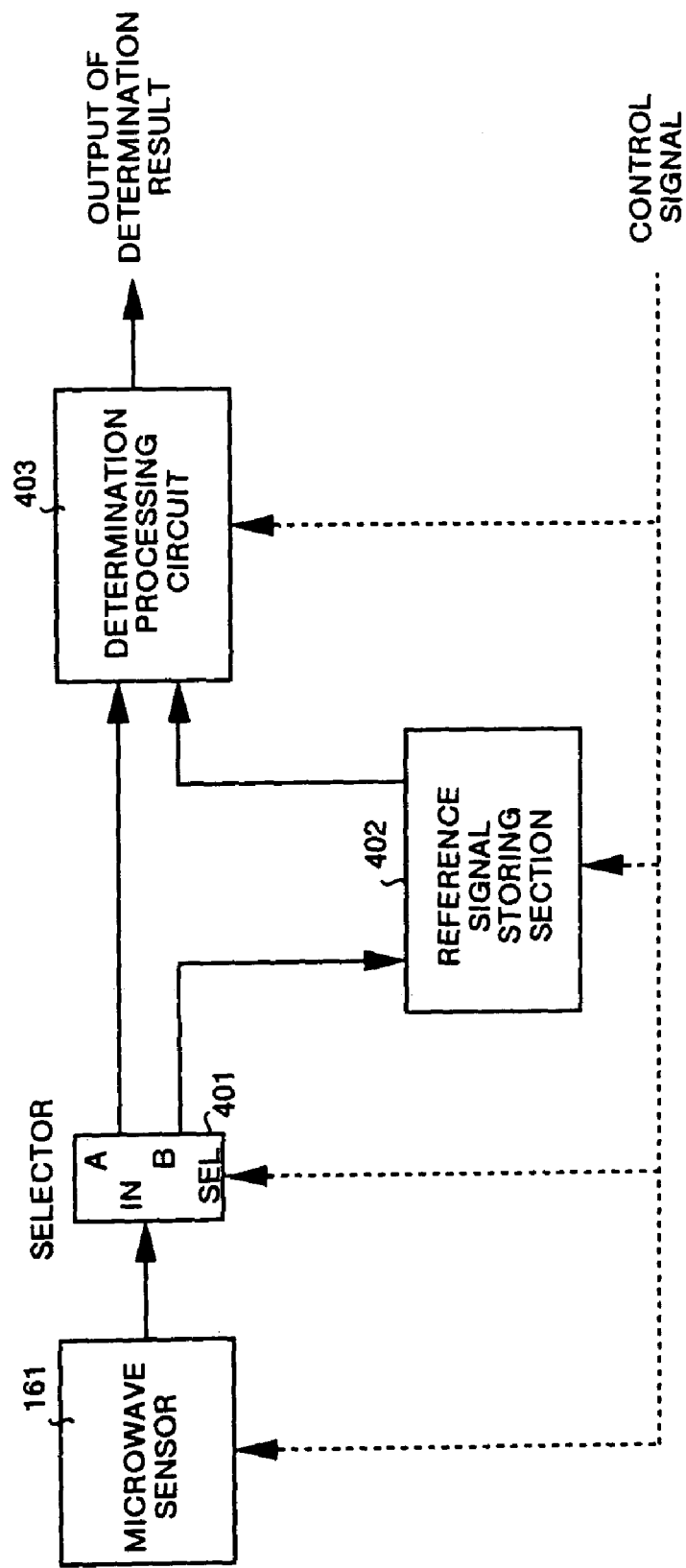
FIG. 2 is a block diagram showing a signal processing section provided in the image reading apparatus to which the specific document determining apparatus is applied shown in FIG. 1.

FIG. 2 is a block diagram showing the signal processing section 162. The signal processing section 162 comprises a reference signal storing section 402 for receiving a detection signal obtained by irradiating a microwave to a pressure plate (Refer to FIG. 3) with no document thereon for scanning, and detecting the reflected wave to be output by the microwave sensor 161, and storing therein the signal as a reference signal for making determination as to whether metallic fiber is included in the document or not; a determination processing circuit 403 for receiving the detection signal obtained by irradiating a microwave to the document for scanning and detecting the reflected wave to be output by the microwave sensor 161, as well as the reference signal stored in the reference signal storing section 402, and making determination as to whether metallic fiber is included in the document or not by comparing a level of the detection signal to the level of the reference signal; and a selector 401 used for selecting either the reference signal storing section 402 or the determination processing circuit 403 to which the detection signal outputted from the microwave sensor 161 is to be inputted.

Figure 3:
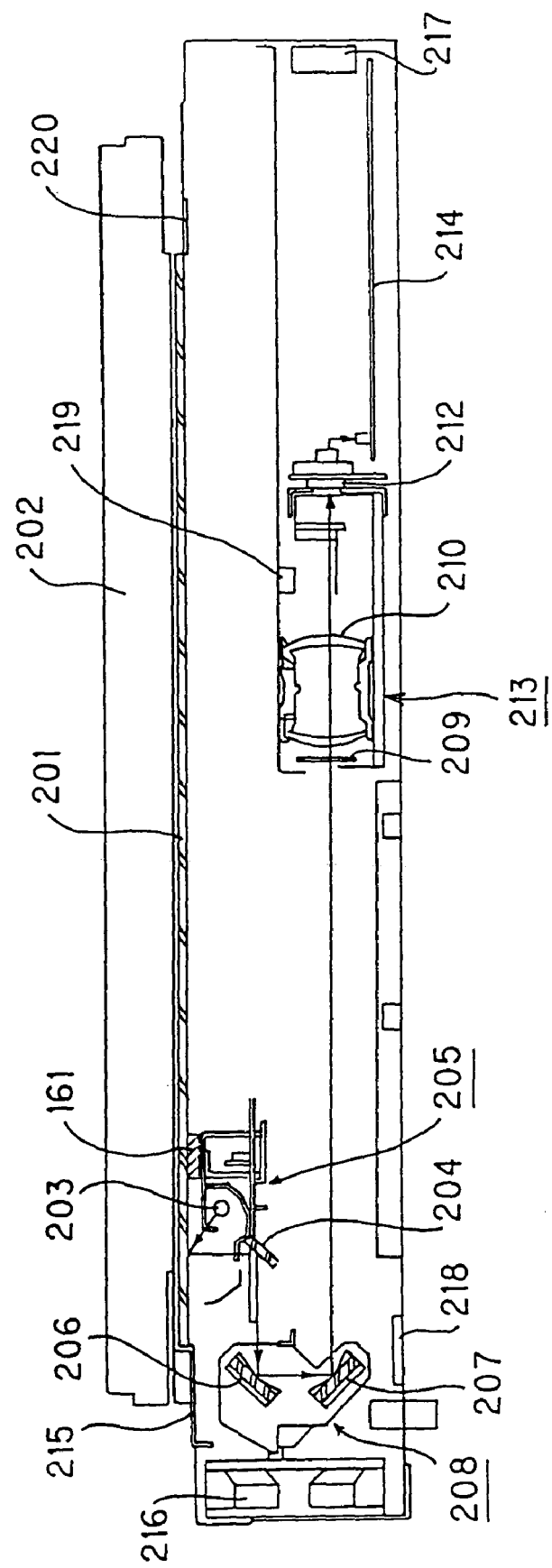
FIG. 3 is a view concretely showing a construction of a document reading system of the image reading apparatus to which the specific document determining apparatus is applied shown in FIG. 1.

FIG. 3 is a view concretely showing a construction of a document reading system of the image reading apparatus shown in FIG. 1. The document reading system shown in FIG. 3 comprises a contact glass 201 with a document placed thereon; a pressure plate 202 for pressing the document onto the contact glass 201; an exposure illuminating unit (halogen lamp) 203; a first scanner 205 integrally constructed with a first mirror 204 and the microwave sensor 161; a second scanner 208 integrally constructed with a second mirror 206 and a third mirror 207; an image reading section 213 integrally constructed with a filter 209, a lens 210, and a CCD 212; and a scanner board 214 with various types of circuit for receiving an image signal outputted from the CCD 212 and subjecting the signal to specified signal processing, namely a read signal processing section 112, the image processor 120, and the signal processing section 162 or the like mounted thereon, each of which is accommodated in a frame.

In FIG. 3, designated at the reference numeral 215 is a shading plate (a white reference plate), at 216 and 217 a cooling fan respectively, at 218 a condensation preventing heater, at 219 a document size detector, and at 220 a bar code plate respectively.

Figure 4:
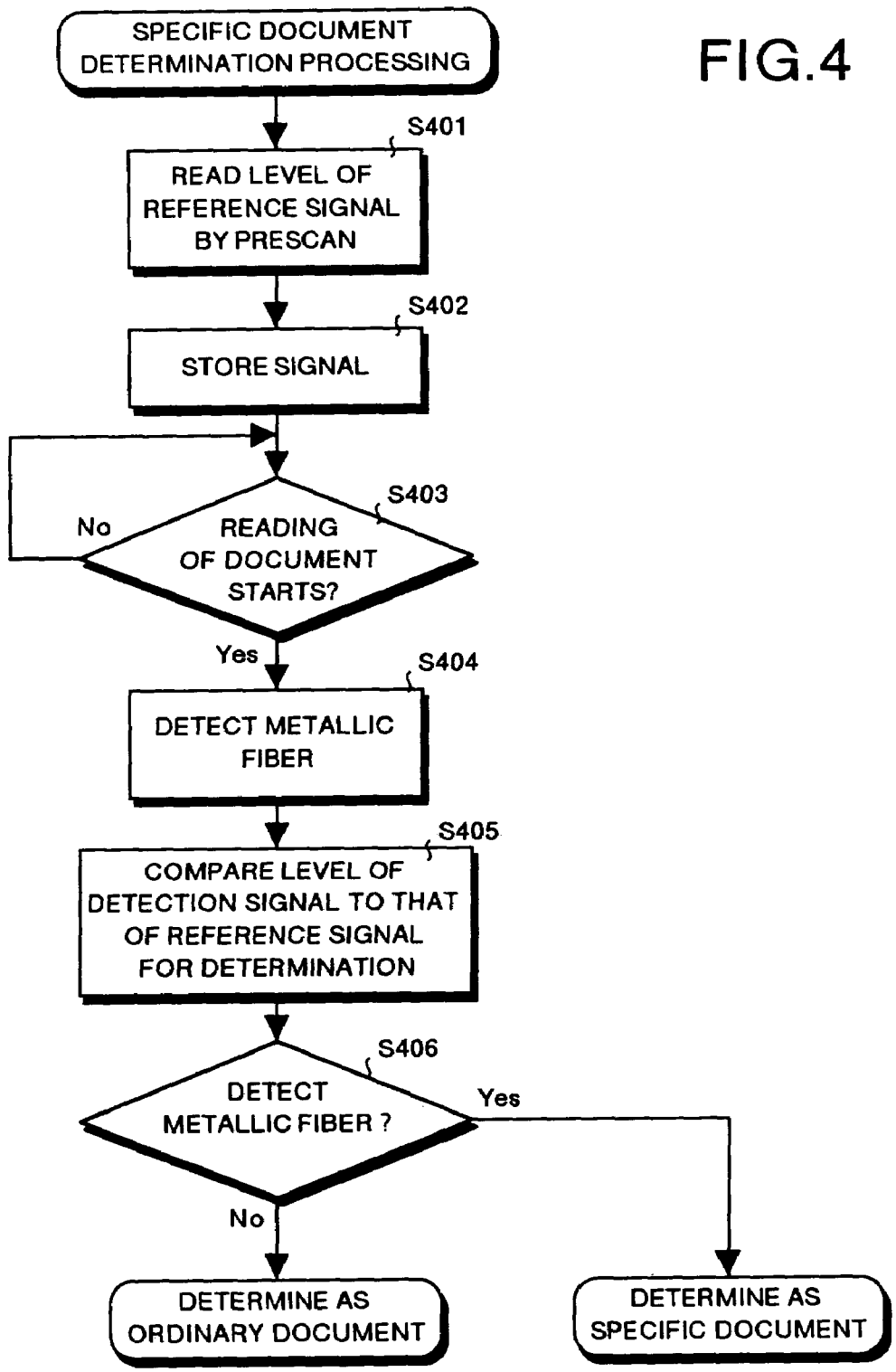
FIG. 4 is a flowchart showing a sequence of processing for determining a specific document in the image reading apparatus to which the specific document determining apparatus according to Embodiment 1 is applied.

Next description is made for operations of the image reading apparatus having the construction as described above. In the image reading apparatus having the specific document determining function according to Embodiment 1, the processing for determining a specific document is executed when color image data is read in from a document. FIG. 4 is a flowchart showing a sequence of processing for determining a specific document in the image reading apparatus according to Embodiment 1.

The microwave sensor 161 irradiates a microwave to the pressure plate 202 for scanning immediately after or at a specified timing after power is turned ON, detects a reflected portion of the irradiated microwave, and outputs a detection signal corresponding to a level of the reflected wave to the signal processing section 162 (S401). It should be noted that a timing of executing a step in step S401 is not restricted only to a timing immediately after power is turned ON or the like, but any timing may be allowable so far as the step is executed before reading of image data from the document is instructed.

The signal processing section 162 receives the detection signal outputted from the microwave sensor 161, switches the selector 401 to the reference signal storing section 402, and stores the received detection signal in the reference signal storing section 402 (S402). The detection signal stored in the reference signal storing section 402 is used later as a reference signal when determination is made as to whether metallic fiber is included in the document or not. Accordingly, the detection signal stored in the reference signal storing section 402 is referred to as a reference signal hereinafter.

When a document is placed on the contact glass 201 and an instruction for reading image data from the document is issued (S403), the processing for detecting metallic fiber included in the document is executed (S404). In step S404, the microwave sensor 161 irradiates a microwave to the document for scanning, detects a reflected portion of the irradiated microwave, and outputs a detection signal corresponding to a level of the reflected wave to the signal processing section 162.

The signal processing section 162 receives the detection signal outputted from the microwave sensor 161, switches the selector 401 to the determination processing circuit 403, inputs the received detection signal in the determination processing circuit 403, and at the same time reads out the reference signal stored in the reference signal storing section 402 to input the read out signal to the determination processing circuit 403. The determination processing circuit 403 compares the level of the detection signal to that of the reference signal (S405).

Figure 5:
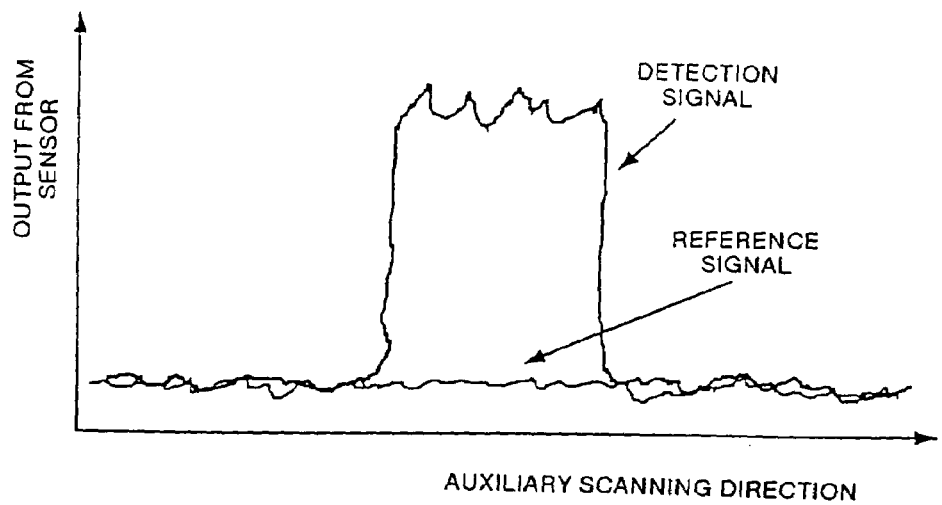
FIG. 5 is an explanatory view showing a relation between a reference signal obtained by irradiating a microwave to an ordinary pressure plate with no metal member therein and a detection signal when metallic fiber is included in a document.
Figure 6:
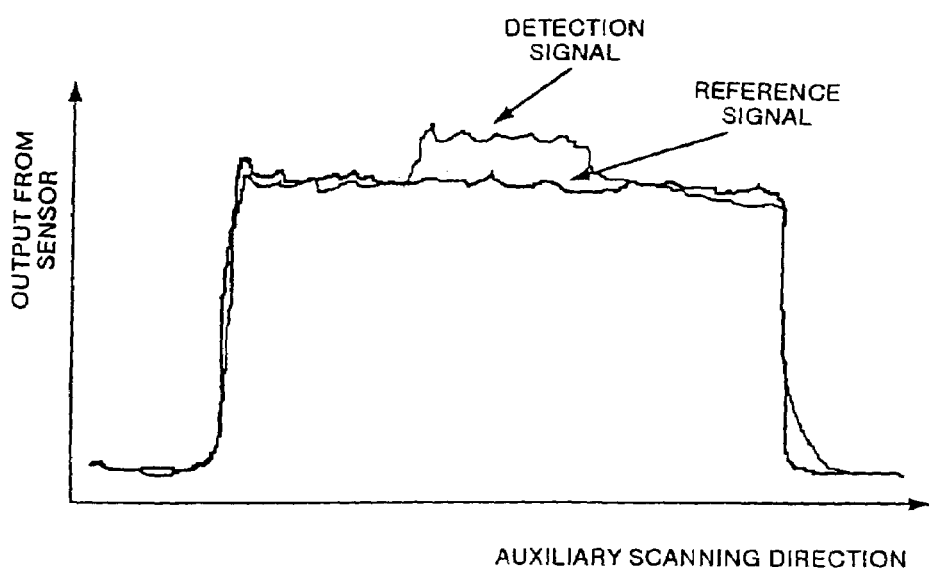
FIG. 6 is an explanatory view showing a relation between a reference signal obtained by irradiating a microwave to the pressure plate with a metal member therein and a detection signal when metallic fiber is included in a document.

Description is made herein for the determination signal and reference signal which are compared to each other in step S405 with reference to FIG. 5 and FIG. 6.

FIG. 5 is an explanatory view showing a relation between a reference signal obtained by irradiating a microwave to the ordinary pressure plate 202 with no metal member therein and a detection signal when metallic fiber is included in a document. As shown in FIG. 5, the level of the detection signal when metallic fiber is included in the document is higher as compared to the level of the reference signal. Accordingly, the reference signal obtained by irradiating a microwave to the pressure plate 202 can be used as the reference for making determination as to whether metallic fiber is included in a document or not.

FIG. 6 is an explanatory view showing a relation between a reference signal obtained by irradiating a microwave to the pressure plate 202 with a metal member therein and a detection signal when metallic fiber is included in a document. There is a small deference, as compared to FIG. 5, between the level of the reference signal and the level of the detection signal when metallic fiber is included in the document, but the level of the detection signal when metallic fiber is included in the document is higher than that of the reference signal. Accordingly, the reference signal obtained by irradiating a microwave to the pressure plate 202 can be used as the reference for making determination as to whether metallic fiber is included in a document or not even when a metallic member is used in the pressure plate 202.

Then, determination is made as to whether metallic fiber is included in a document or not according to a result of comparing the level of the detection signal to the level of the reference signal in step S405 (S406). To be described more specifically, the determination processing circuit 403 determines that metallic fiber is included in the document when it is determined that the level of the detection signal exceeds the level of the reference signal as a result of comparison between the level of the detection signal and that of the reference signal, and determines that metallic fiber is not included in the document when it is determined that the level of the detection signal does not exceed the level of the reference signal. Then a result of this determination is reported to the controller 180 from the determination processing circuit 403.

The controller 180 receives a result of the determination from the determination processing circuit 403, and determines that the document is a specific document such as bills or marketable securities with metallic fiber included therein when it is determined that metallic fiber is included in the document. On the other hand, the controller 180 determines that the document is not a specific document such as bills or marketable securities with metallic fiber included therein but an ordinary document when it is determined that metallic fiber is not included in the document by the signal processing section 162.

Then, when it is determined that the document is the specific document, the controller 180 executes the processing required for a specific document. The specific document such as bills or marketable securities is prevented from being illegally copied, for example, by stopping reading image data from the document, or subjecting image data after having been read out from the document to specific image processing differentiated from ordinary processing to form an image differentiated from the image in the document.

Also, when it is determined that a document is not a specific document, the controller 180 starts the processing for reading image data from the document. Namely, the controller makes the first scanner 205 reciprocate for scanning and illuminates the document with the exposure illuminating unit 203 in the forward direction for scanning. A light reflected by the document is reflected by the first mirror 204 to enter the second scanner 208. The reflected light entering the second scanner 208 is reflected by the second mirror 206 and the third mirror 207 to enter the image reading section 213. The reflected light entering the image reading section 213 passes through the filter 209 and the lens 210, and then enters the CCD 212. In the CCD 212, the reflected light is converted to image data as electric signals to be inputted to the read signal processing section 112.

The image data is subjected to specified processing in the read signal processing section 112 and in the image processor 120, and outputted from the write processing unit 130 as a laser beam. The printer unit 140 forms a color image using the laser beam outputted from the write processing unit 130 and transfers the formed color image onto the recording paper.

As described above, with the image reading apparatus according to Embodiment 1, a reference signal for making determination as to whether metallic fiber is included in a document or not is obtained by irradiating a microwave to and scanning the pressure plate 202 with no document thereon, so that a reference signal appropriate to a current environment of the apparatus can be obtained and determination can always be made with constantly high accuracy as to whether a document is a specific document such as bills or marketable securities with metallic fiber included therein or not even if a level of the detection signal outputted from the microwave sensor is changed, for example, when the pressure plate is constructed with a metallic member, when the attached condition of the pressure plate is changed, or when the use environment of the apparatus is changed.

Figure 7:
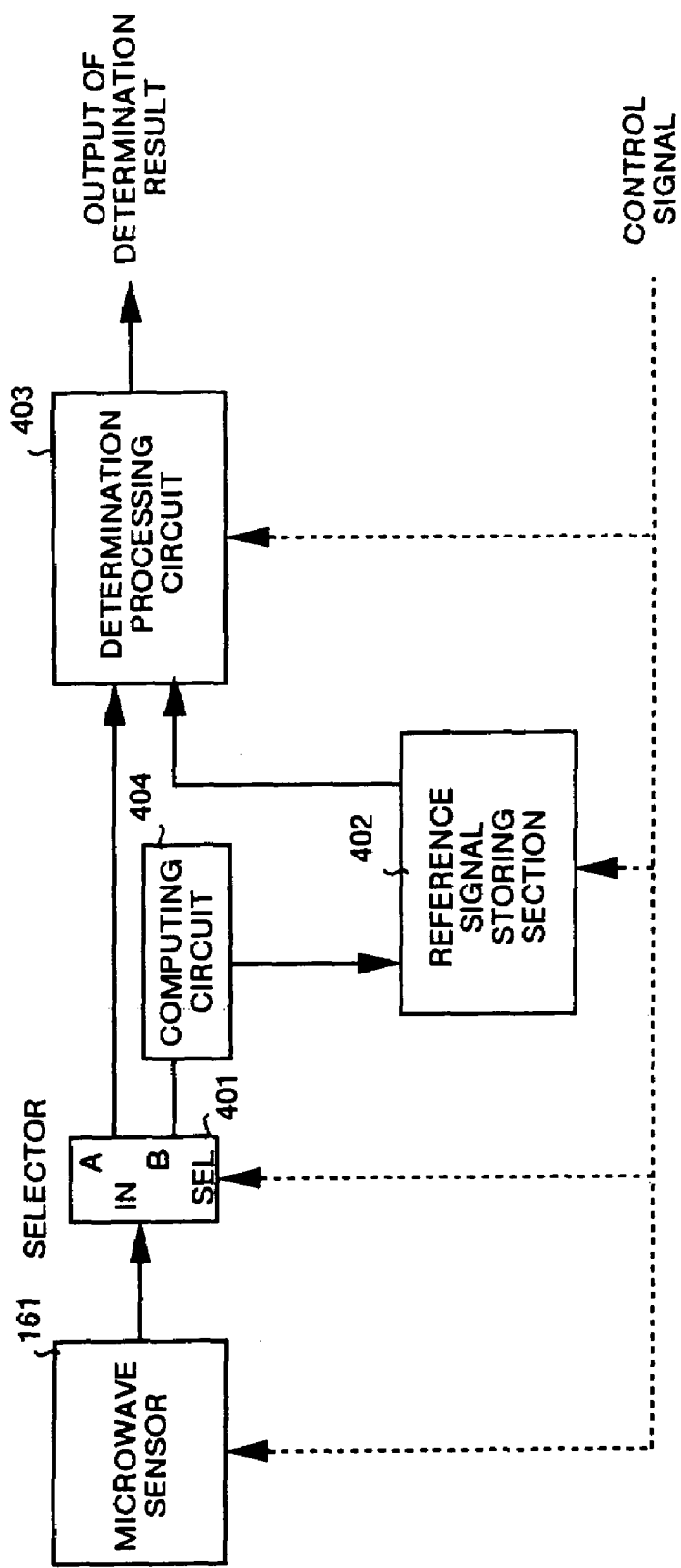
FIG. 7 is a block diagram showing the signal processing section of the image reading apparatus to which a specific document determining apparatus according to Embodiment 2 is applied.

FIG. 7 is a block diagram showing the signal processing section 162 of an image reading apparatus to which a specific document determining apparatus according to Embodiment 2 is applied. It should be noted that the construction of the image reading apparatus to which the specific document determining apparatus according to Embodiment 2 is applied is the same on the whole as that to which the specific document determining apparatus according to Embodiment 1 is applied, so that description thereof is omitted herein.

The signal processing section 162 of the image reading apparatus to which the specific document determining apparatus according to Embodiment 2 is applied has a computing circuit 404 for subjecting the detection signal (the first detection signal) obtained by irradiating a microwave to the pressure plate 202 for scanning to the averaging processing to obtain an average value signal.

Figure 8:
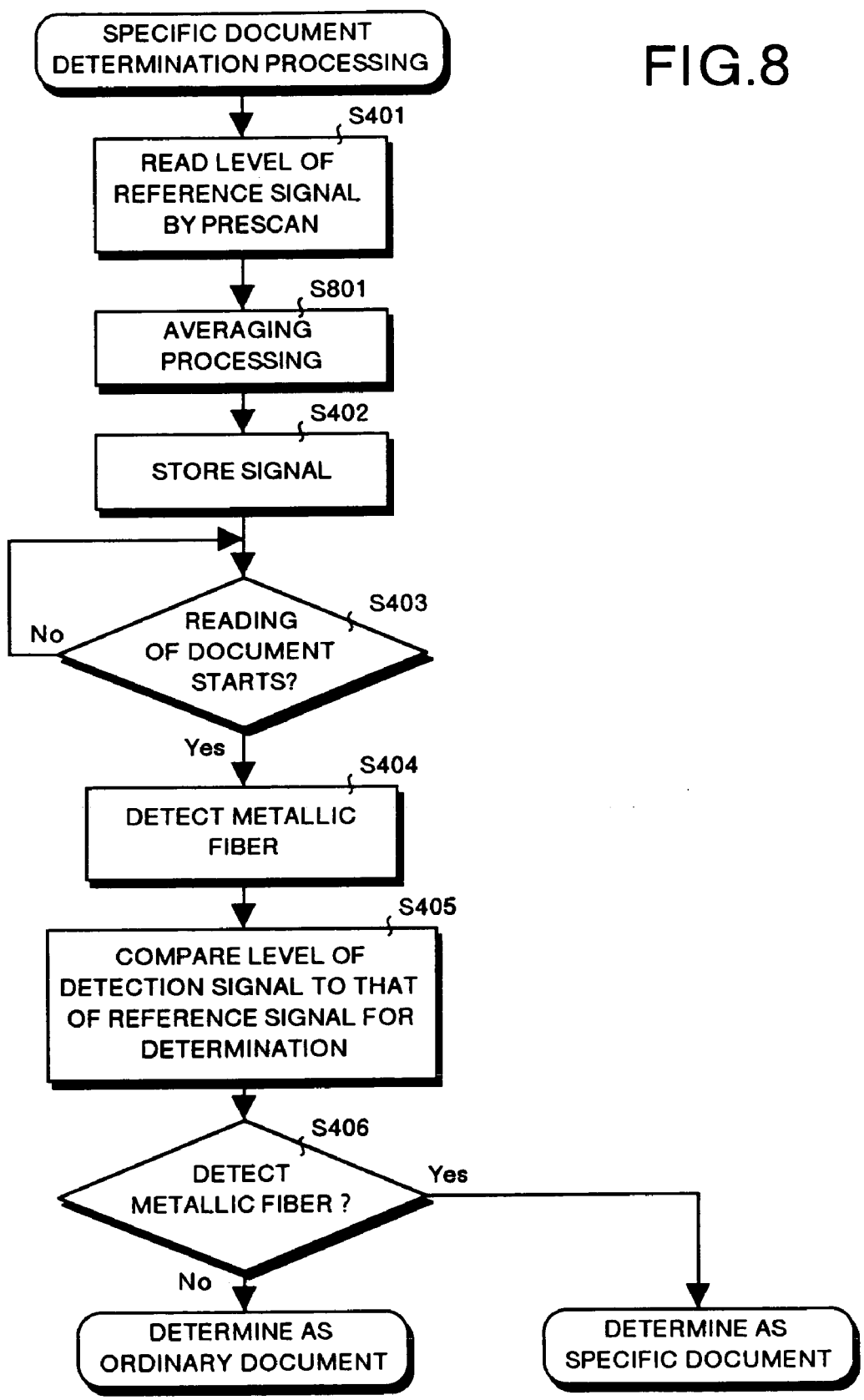
FIG. 8 is a flowchart showing a sequence of processing for determining a specific document in the image reading apparatus to which the specific document determining apparatus according to Embodiment 2 is applied.

Next description is made for operations of the image reading apparatus to which the specific document determining apparatus according to Embodiment 2 is applied. FIG. 8 is a flowchart showing a sequence of processing for determining a specific document in the image reading apparatus to which the specific document determining apparatus according to Embodiment 2 is applied. It should be noted that, in the sequence of determining a specific document shown in FIG. 8, processing from step S401 to step S406 is the same as that in FIG. 4 described in Embodiment 1, so that only different points therefrom are explained hereinafter.

In step 401, the microwave sensor 161 irradiates a microwave to the pressure plate 202 for scanning immediately after or at a specified timing after power is turned ON, detects a reflected portion of the irradiated microwave, and outputs a detection signal corresponding to a level of the reflected wave to the signal processing section 162.

The signal processing section 162 receives the detection signal outputted from the microwave sensor 161, switches the selector 401 to the reference signal storing section 402, and inputs the detection signal in the computing circuit 404. The computing circuit 404 generates a reference signal by subjecting the received detection signal to the averaging processing to obtain an average value signal (S801). Then, the computing circuit 404 outputs the generated reference signal to the reference signal storing section 402, and the reference signal storing section 402 receives and stores the reference signal therein (S402). The reference signal stored in the reference signal storing section 402 is used as a reference signal for making determination as to whether metallic fiber is included in a document or not in step S405.

As described above, with the image reading apparatus to which the specific document determining apparatus according to Embodiment 2 is applied, the detection signal obtained by irradiating a microwave to the pressure plate 202 with no document thereon for scanning is subjected to the averaging processing to obtain an average value signal, and the obtained signal is used as a reference signal for making determination as to whether metallic fiber is included in a document or not, so that the processing for comparison between the level of the reference signal and that of the detection signal can easily be performed, and at the same time an amount of data for the reference signal can be reduced. Accordingly, the amount of required memory in the reference signal storing section 402 can also be reduced.

An image reading apparatus to which a specific document determining apparatus according to Embodiment 3 is applied has the computing circuit 404 for subjecting the detection signal (the first detection signal) obtained by irradiating a microwave to the pressure plate 202 for scanning to sampling processing to obtain a maximum value signal provided in the signal processing section 162 thereof. It should be noted that the construction of the image reading apparatus to which the specific document determining apparatus according to Embodiment 3 is applied is the same as that to which the specific document determining apparatus according to either of Embodiment 1 and Embodiment 2 is applied, so that description thereof is omitted herein.

Figure 9:
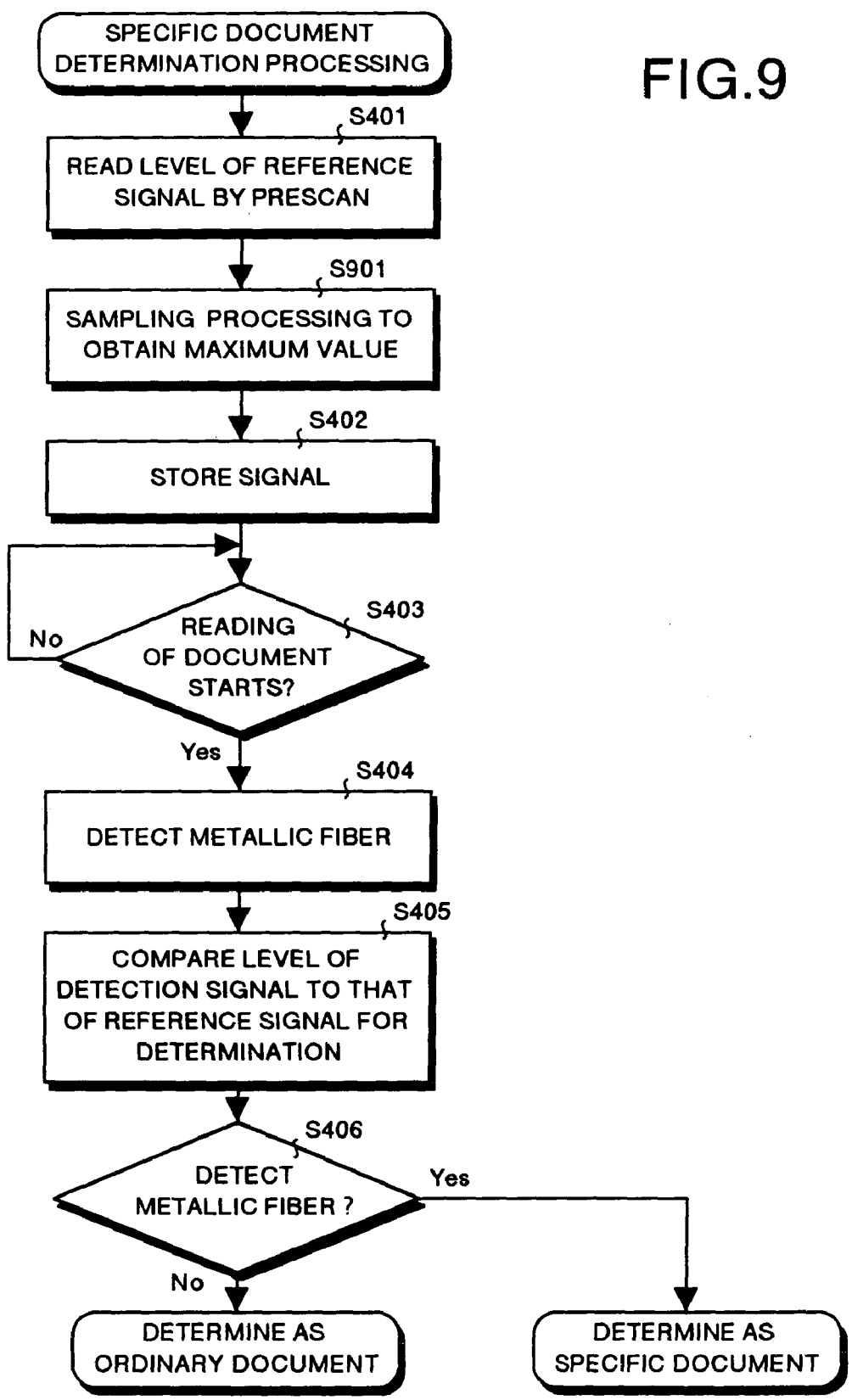
FIG. 9 is a flowchart showing a sequence of processing for determining a specific document in the image reading apparatus to which a specific document determining apparatus according to Embodiment 3 is applied.

Next description is made for operations of the image reading apparatus to which the specific document determining apparatus according to Embodiment 3 is applied. FIG. 9 is a flowchart showing a sequence of processing for determining a specific document in the image reading apparatus to which the specific document determining apparatus according to Embodiment 3 is applied. It should be noted that, in the sequence of determining a specific document shown in FIG. 9, processing from step S401 to step S406 is the same as that in FIG. 4 described in Embodiment 1, so that only different points therefrom are explained hereinafter.

In step 401, the microwave sensor 161 irradiates a microwave to the pressure plate 202 for scanning immediately after or at a specified timing after power is turned ON, detects a reflected portion of the irradiated microwave, and outputs a detection signal corresponding to a level of the reflected wave to the signal processing section 162.

The signal processing section 162 receives the detection signal outputted from the microwave sensor 161, switches the selector 401 to the reference signal storing section 402, and inputs the detection signal in the computing circuit 404. The computing circuit 404 generates a reference signal by subjecting the received detection signal to the sampling processing to obtain a maximum value signal (S901). Then, the computing circuit 404 outputs the generated reference signal to the reference signal storing section 402, and the reference signal storing section 402 receives and stores the reference signal therein (S402). The reference signal stored in the reference signal storing section 402 is used as a reference signal for making determination as to whether metallic fiber is included in a document or not in step S405.

As described above, with the image reading apparatus to which the specific document determining apparatus according to Embodiment 3 is applied, the detection signal obtained by irradiating a microwave to the pressure plate 202 with no document thereon for scanning is subjected to the sampling processing to obtain a maximum value signal, and the obtained signal is used as a reference signal for making determination as to whether metallic fiber is included in a document or not, so that processing for comparison between the level of the reference signal and that of the detection signal can easily be performed, and at the same time an amount of data for the reference signal can be reduced. Accordingly, the amount of required memory in the reference signal storing section 402 can also be reduced.

An image reading apparatus to which a specific document determining apparatus according to Embodiment 4 is applied has the computing circuit 404 for subjecting the detection signal (the first detection signal) obtained by irradiating a microwave to the pressure plate 202 for scanning to sampling processing to obtain a minimum value signal provided in the signal processing section 162 thereof. It should be noted that the construction of the image reading apparatus to which the specific document determining apparatus according to Embodiment 4 is applied is the same as that to which the specific document determining apparatus according to either Embodiment 1 and Embodiment 2 is applied, so that description thereof is omitted herein.

Figure 10:
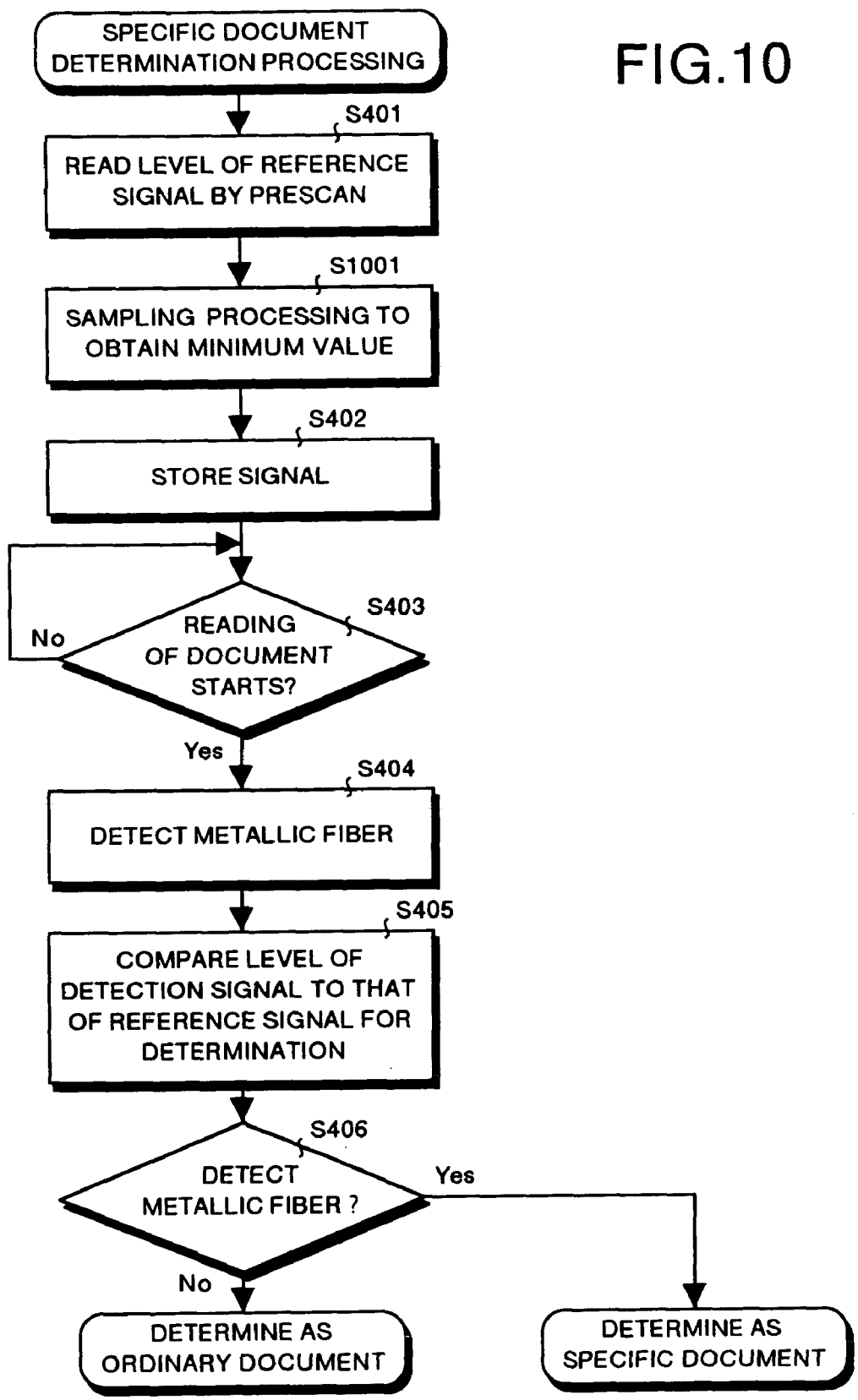
FIG. 10 is a flowchart showing a sequence of processing for determining a specific document in the image reading apparatus to which a specific document determining apparatus according to Embodiment 4 is applied.

Next description is made for operations of the image reading apparatus to which the specific document determining apparatus according to Embodiment 4 is applied. FIG. 10 is a flowchart showing a sequence of processing for determining a specific document in the image reading apparatus to which the specific document determining apparatus according to Embodiment 4 is applied. It should be noted that, in the sequence of determining a specific document shown in FIG. 10, processing from step S401 to step S406 is the same as that in FIG. 4 described in Embodiment 1, so that only different points therefrom are explained hereinafter.

In step 401, the microwave sensor 161 irradiates a microwave to the pressure plate 202 for scanning immediately after or at a specified timing after power is turned ON, detects a reflected portion of the irradiated microwave, and outputs a detection signal corresponding to a level of the reflected wave to the signal processing section 162 (S401).

The signal processing section 162 receives the detection signal outputted from the microwave sensor 161, switches the selector 401 to the reference signal storing section 402, and inputs the detection signal in the computing circuit 404. The computing circuit 404 generates a reference signal by subjecting the received detection signal to the sampling processing to obtain a minimum value signal (S1001). Then, the computing circuit 404 outputs the generated reference signal to the reference signal storing section 402, and the reference signal storing section 402 receives and stores the reference signal therein (S402). The reference signal stored in the reference signal storing section 402 is used as a reference signal for making determination as to whether metallic fiber is included in a document or not in step S405.

As described above, with the image reading apparatus to which the specific document determining apparatus according to Embodiment 4 is applied, the detection signal obtained by irradiating a microwave to the pressure plate 202 with no document thereon for scanning is subjected to the sampling processing to obtain a minimum value signal, and the obtained signal is used as a reference signal for making determination as to whether metallic fiber is included in a document or not, so that processing for comparison between the level of the reference signal and that of the detection signal can easily be performed, and at the same time an amount of data for the reference signal can be reduced. Accordingly, the amount of required memory in the reference signal storing section 402 can also be reduced.

An image reading apparatus to which a specific document determining apparatus according to Embodiment 5 is applied detects, by irradiating a microwave to the white reference plate 215 provided at a position adjacent to the contact glass 201 for scanning by the microwave sensor 161, a reflected portion of the irradiated microwave to output a detection signal, and uses the detection signal as a reference signal for making determination as to whether metallic fiber is included in a document or not. It should be noted that the construction of the image reading apparatus to which the specific document determining apparatus according to Embodiment 5 is applied is the same as that to which the specific document determining apparatus according to Embodiment 1 is applied, so that description thereof is omitted herein.

Figure 11:
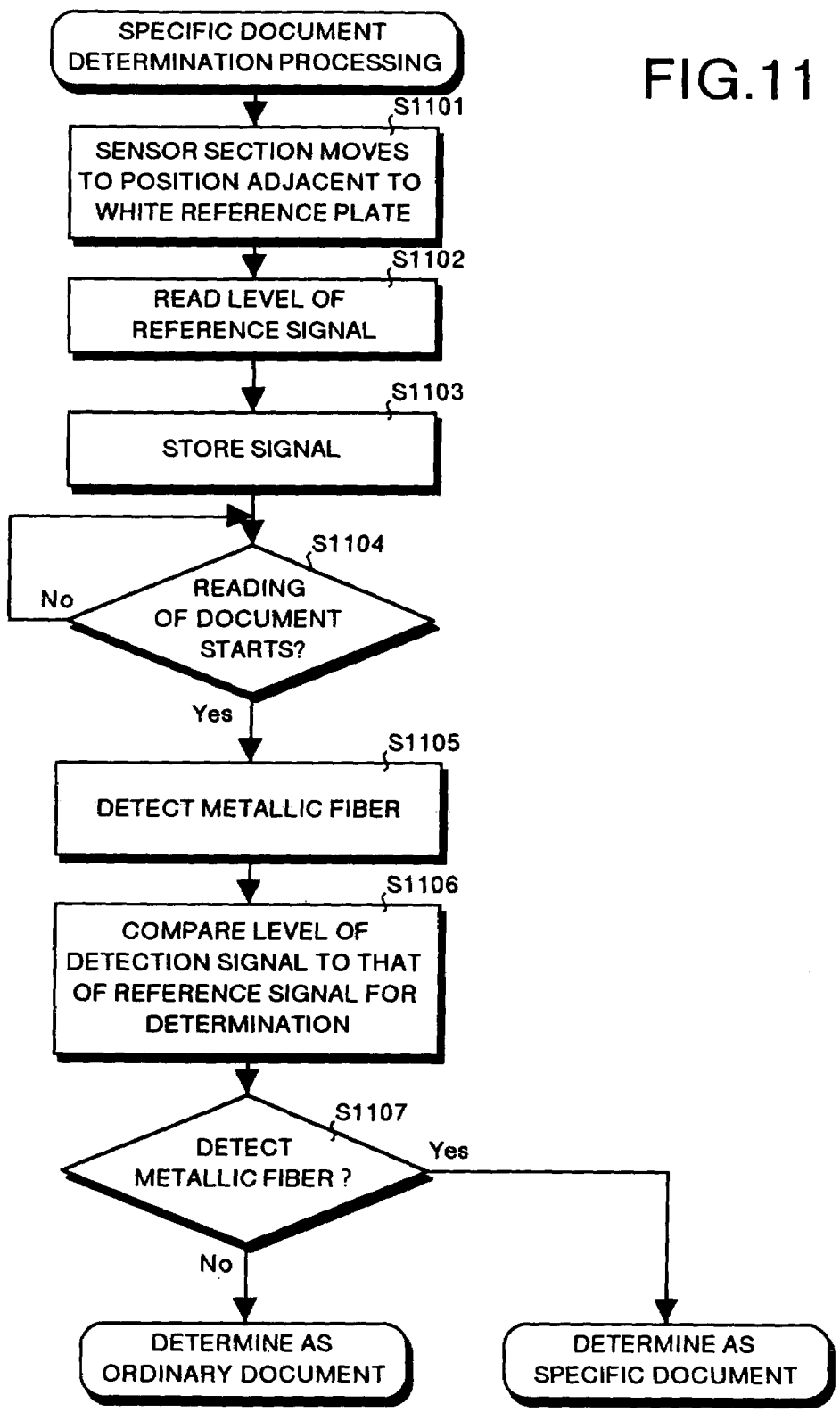
FIG. 11 is a flowchart showing a sequence of processing for determining a specific document in the image reading apparatus to which a specific document determining apparatus according to Embodiment 5 is applied.

Next description is made for operations of the image reading apparatus to which the specific document determining apparatus according to Embodiment 5 is applied. In the image reading apparatus having the specific document determining function according to Embodiment 5, the processing for determining a specific document is executed when image data is read out from a document. FIG. 11 is a flowchart showing a sequence of processing for determining a specific document in the image reading apparatus to which the specific document determining apparatus according to Embodiment 5 is applied.

The microwave sensor 161 moves to a position adjacent to the white reference plate 215 immediately after or at a specified timing after power is turned ON (S1101). Then, the microwave sensor 161 irradiates a microwave to the white reference plate 215 for scanning, detects a reflected portion of the irradiated microwave, and outputs a detection signal corresponding to a level of the reflected wave to the signal processing section 162 (S1102). It should be noted that a timing of executing steps in step S1101 and step S1102 is not restricted only to a timing immediately after power is turned ON or the like, but any timing may be allowable so far as the step is executed before reading of image data from a document is instructed.

The signal processing section 162 receives the detection signal outputted from the microwave sensor 161, switches the selector 401 to the reference signal storing section 402, and stores the received detection signal in the reference signal storing section 402 (S1103). The reference signal stored in the reference signal storing section 402 is used later as a reference signal for making determination as to whether metallic fiber is included in a document or not. Accordingly, the detection signal stored in the reference signal storing section 402 is referred to as a reference signal hereinafter.

When a document is placed on the contact glass 201 and an instruction for reading image data from the document is issued (S1104), the processing for detecting metallic fiber included in the document is executed (S1105). In step S1105, the microwave sensor 161 irradiates a microwave to the document for scanning, detects a reflected portion of the irradiated microwave, and outputs a detection signal corresponding to a level of the reflected wave to the signal processing section 162.

The signal processing section 162 receives the detection signal outputted from the microwave sensor 161, switches the selector 401 to the determination processing circuit 403, inputs the received detection signal in the determination processing circuit 403, and at the same time reads out the reference signal stored in the reference signal storing section 402, and inputs the read out signal to the determination processing circuit 403. The determination processing circuit 403 compares the level of the detection signal to that of the reference signal (S1106). It should be noted that a relation between the reference signal and the detection signal is the same as that shown in FIG. 6.

The determination processing circuit 403 determines that metallic fiber is included in the document when it is determined that the level of the detection signal exceeds the level of the reference signal as a result of comparison between the level of the detection signal and that of the reference signal, and determines that metallic fiber is not included in the document when it is determined that the level of the detection signal does not exceed the level of the reference signal (S1107). Then a result of this determination is reported to the controller 180 from the determination processing circuit 403.

The controller 180 receives a result of the determination from the determination processing circuit 403, and makes determination that a document is a specific document such as bills or marketable securities with metallic fiber included therein when it is determined that metallic fiber is included in the document. On the other hand, the controller 180 makes determination that a document is not a specific document such as bills or marketable securities with metallic fiber included therein but an ordinary document when it is determined that metallic fiber is not included in the document in the signal processing section 162.

Then, when it is determined that a document is a specific document, the controller 180 executes the processing required for a specific document. The specific document such as bills or marketable securities is prevented from being illegally copied, for example, by stopping reading image data from the document, or subjecting image data after having been read from the document to specific image processing differentiated from ordinary processing to form an image differentiated from the image in the document.

On the other hand, when it is determined that a document is not a specific document, the controller 180 starts the processing for reading image data from the document. It should be noted that the operations for reading image data from a document is the same as that described in Embodiment 1, so that description thereof is omitted herein.

As described above, with the image reading apparatus according to Embodiment 5, a reference signal for making determination as to whether metallic fiber is included in a document or not is obtained by irradiating a microwave to the white reference plate 215 for scanning, so that any white reference plate generally used in an image reading apparatus can be used and also a reference signal can easily be obtained.

It should be noted that, in Embodiment 5, a white reference plate is used for obtaining a reference signal used for making determination as to whether metallic fiber is included in a document or not, but any metallic plate other than the white reference plate may be used.

As shown in FIG. 3, the contact glass 201 is positioned in a space between a document and the microwave sensor 161. Therefore, a glass plate is inserted between the white reference plate 215 (metallic plate) and the microwave sensor 161, which allows a reference signal for making determination as to whether metallic fiber is included in a document or not to be obtained under the same conditions as those under which a detection signal is obtained from a reflected portion for the microwave irradiated to a document for scanning.

An image reading apparatus to which a specific document determining apparatus according to Embodiment 6 is applied has the computing circuit 404 for subjecting the detection signal (the first detection signal) obtained by irradiating a microwave to the white reference plate 215 for scanning to averaging processing to obtain an average value signal provided in the signal processing section 162 thereof. It should be noted that the construction of the image reading apparatus to which the specific document determining apparatus according to Embodiment 6 is applied is the same as that to which the specific document determining apparatus according to any of Embodiment 1, Embodiment 2 and Embodiment 3 is applied, so that description thereof is omitted herein.

Figure 12:
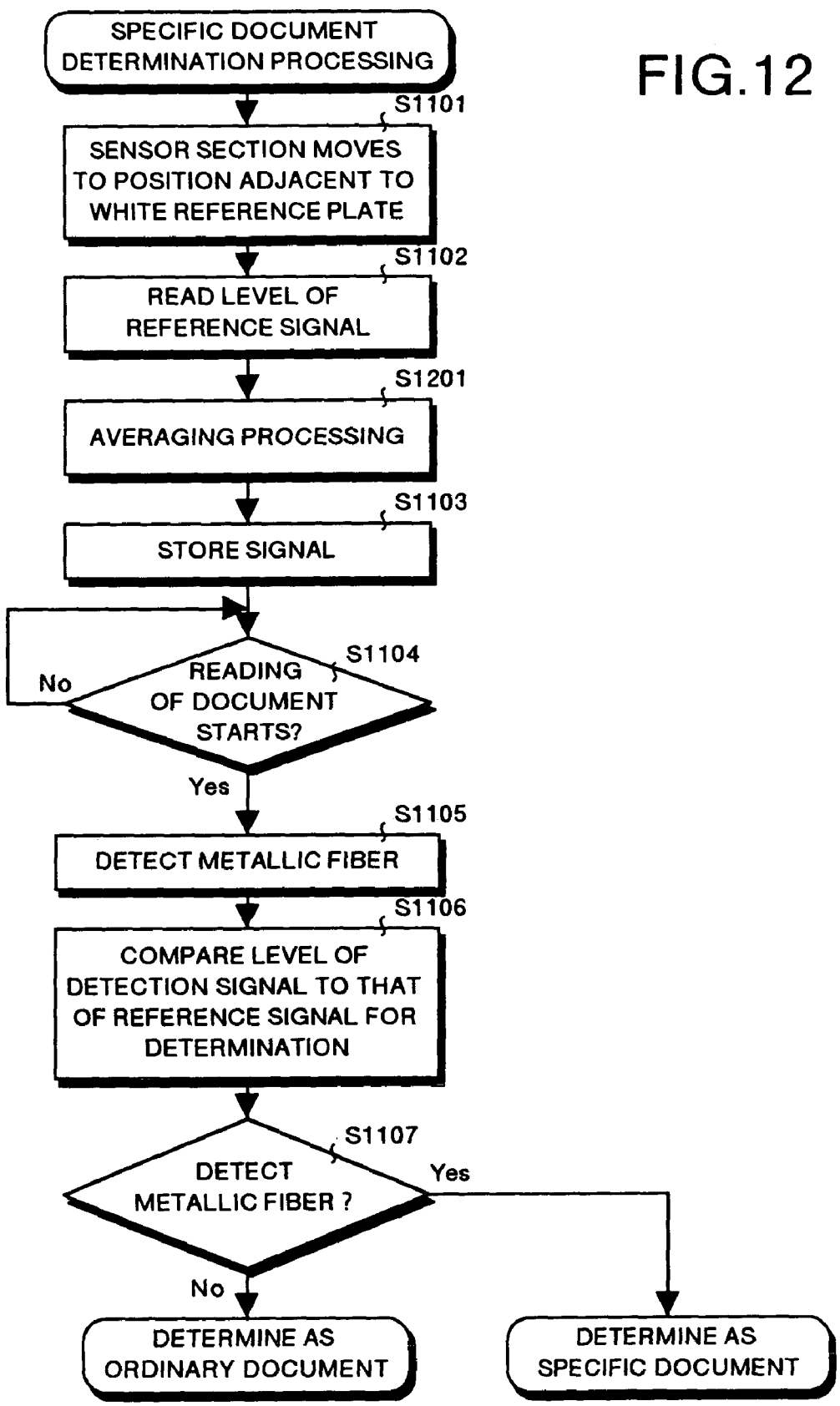
FIG. 12 is a flowchart showing a sequence of processing for determining a specific document in the image reading apparatus to which a specific document determining apparatus according to Embodiment 6 is applied.

Next description is made for operations of the image reading apparatus to which the specific document determining apparatus according to Embodiment 6 is applied. FIG. 12 is a flowchart showing a sequence of processing for determining a specific document in the image reading apparatus to which the specific document determining apparatus according to Embodiment 6 is applied. It should be noted that, in the sequence of determining a specific document shown in FIG. 12, processing from step S1101 to step S1107 is the same as that in FIG. 11 described in Embodiment 5, so that only different points therefrom are explained hereinafter.

In step 1102, the microwave sensor 161 irradiates a microwave to the white reference plate 215 for scanning, detects a reflected portion of the irradiated microwave, and outputs a detection signal corresponding to a level of the reflected wave to the signal processing section 162.

The signal processing section 162 receives the detection signal outputted from the microwave sensor 161, switches the selector 401 to the reference signal storing section 402, and inputs the detection signal in the computing circuit 404. The computing circuit 404 generates a reference signal by subjecting the received detection signal to the averaging processing to obtain an average value signal (S1201). Then, the computing circuit 404 outputs the generated reference signal to the reference signal storing section 402, and the reference signal storing section 402 receives and stores the reference signal therein (S1103). The reference signal stored in the reference signal storing section 402 is used as a reference signal for making determination as to whether metallic fiber is included in a document or not in step S1106.

As described above, with the image reading apparatus to which the specific document determining apparatus according to Embodiment 6 is applied, the detection signal obtained by irradiating a microwave to the white reference plate 215 for scanning is subjected to the averaging processing to obtain an average value signal, and the obtained signal is used as a reference signal for making determination as to whether metallic fiber is included in a document or not, so that processing for comparison between the level of the reference signal and that of the detection signal can easily be performed, and at the same time an amount of data for the reference signal can be reduced. Accordingly, the amount of required memory in the reference signal storing section 402 can also be reduced.

An image reading apparatus to which a specific document determining apparatus according to Embodiment 7 is applied has the computing circuit 404 for subjecting the detection signal (the first detection signal) obtained by irradiating a microwave to the white reference plate 215 for scanning to sampling processing to obtain a maximum value signal provided in the signal processing section 162 thereof. It should be noted that the construction of the image reading apparatus to which the specific document determining apparatus according to Embodiment 7 is applied is the same as that to which the specific document determining apparatus according to any of Embodiment 1, Embodiment 2 and Embodiment 3 is applied, so that description thereof is omitted herein.

Figure 13:
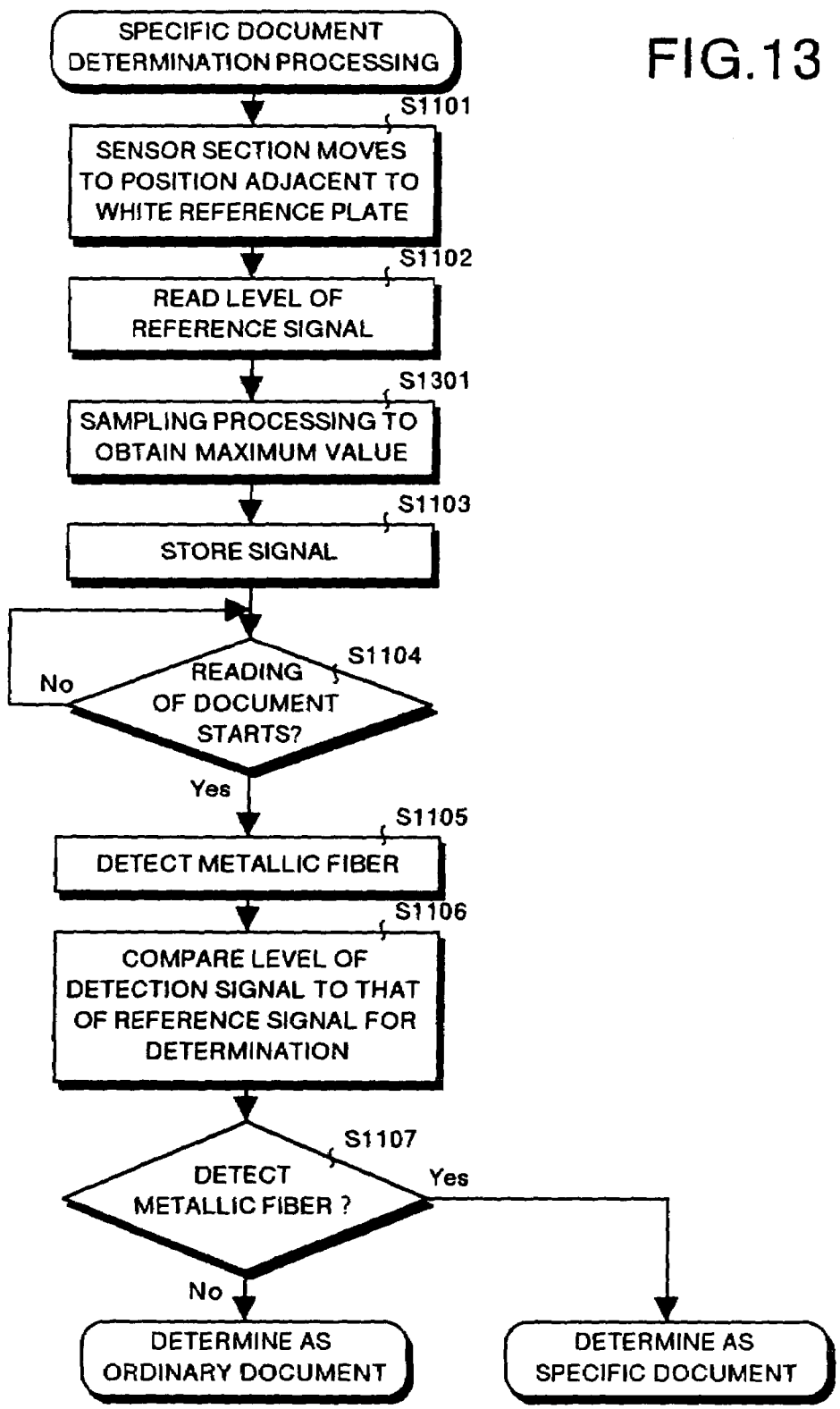
FIG. 13 is a flowchart showing a sequence of processing for determining a specific document in the image reading apparatus to which a specific document determining apparatus according to Embodiment 7 is applied.

Next description is made for operations of the image reading apparatus to which the specific document determining apparatus according to Embodiment 7 is applied. FIG. 13 is a flowchart showing a sequence of processing for determining a specific document in the image reading apparatus to which the specific document determining apparatus according to Embodiment 7 is applied. It should be noted that, in the sequence of determining a specific document shown in FIG. 13, processing from step S1101 to step S1107 is the same as that in FIG. 11 described in Embodiment 5, so that only different points therefrom are explained hereinafter.

In step 1102, the microwave sensor 161 irradiates a microwave to the white reference plate 215 for scanning, detects a reflected portion of the irradiated microwave, and outputs a detection signal corresponding to a level of the reflected wave to the signal processing section 162.

The signal processing section 162 receives the detection signal outputted from the microwave sensor 161, switches the selector 401 to the reference signal storing section 402, and inputs the detection signal in the computing circuit 404. The computing circuit 404 generates a reference signal by subjecting the received detection signal to the sampling processing to obtain a maximum value signal (S1301). Then, the computing circuit 404 outputs the generated reference signal to the reference signal storing section 402, and the reference signal storing section 402 receives and stores the reference signal therein (S1103). The reference signal stored in the reference signal storing section 402 is used as a reference signal for making determination as to whether metallic fiber is included in a document or not in step S1106.

As described above, with the image reading apparatus to which the specific document determining apparatus according to Embodiment 7 is applied, the detection signal obtained by irradiating a microwave to the white reference plate 215 for scanning is subjected to the sampling processing to obtain a maximum value signal, and the obtained signal is used as a reference signal for making determination as to whether metallic fiber is included in a document or not, so that processing for comparison between the level of the reference signal and that of the detection signal can easily be performed, and at the same time an amount of data for the reference signal can be reduced. Accordingly, the amount of required memory in the reference signal storing section 402 can also be reduced.

An image reading apparatus to which a specific document determining apparatus according to Embodiment 8 is applied has the computing circuit 404 for generating a reference signal by subjecting the detection signal (the first detection signal) obtained by irradiating a microwave to the white reference plate 215 for scanning to sampling processing to obtain a minimum value signal provided in the signal processing section 162 thereof. It should be noted that the construction of the image reading apparatus to which the specific document determining apparatus according to Embodiment 8 is applied is the same as that to which the specific document determining apparatus according to any of Embodiment 1, Embodiment 2 and Embodiment 3 is applied, so that description thereof is omitted herein.

Figure 14:
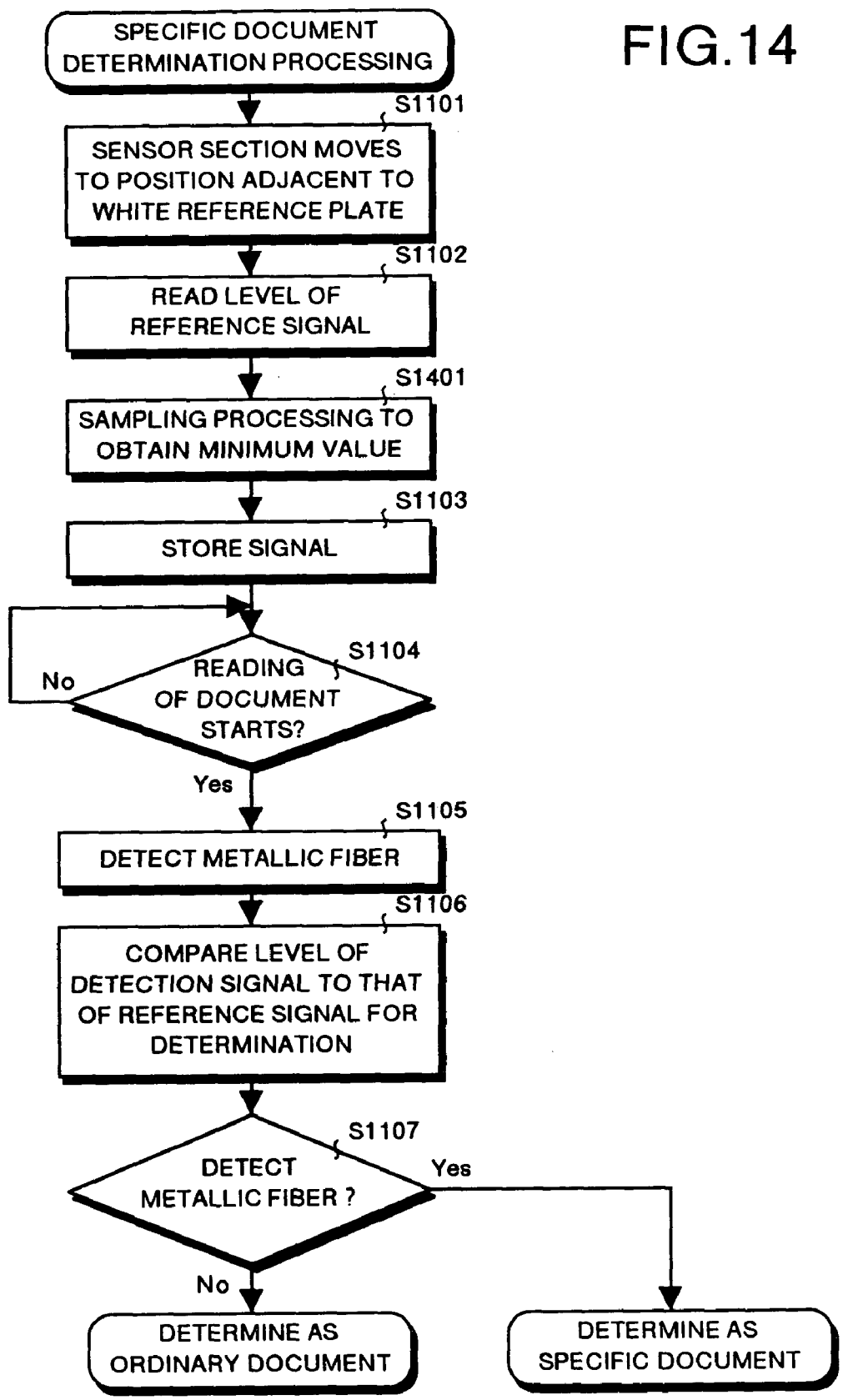
FIG. 14 is a flowchart showing a sequence of processing for determining a specific document in the image reading apparatus to which a specific document determining apparatus according to Embodiment 8 is applied.

Next description is made for operations of the image reading apparatus to which the specific document determining apparatus according to Embodiment 8 is applied. FIG. 14 is a flowchart showing a sequence of processing for determining a specific document in the image reading apparatus to which the specific document determining apparatus according to Embodiment 8 is applied. It should be noted that, in the sequence of determining a specific document shown in FIG. 14, processing from step S1101 to step S1107 is the same as that in FIG. 11 described in Embodiment 5, so that only different points therefrom are explained hereinafter.

In step 1102, the microwave sensor 161 irradiates a microwave to the white reference plate 215 for scanning, detects a reflected portion of the irradiated microwave, and outputs a detection signal corresponding to a level of the reflected wave to the signal processing section 162.

The signal processing section 162 receives the detection signal outputted from the microwave sensor 161, switches the selector 401 to the reference signal storing section 402, and inputs the detection signal in the computing circuit 404. The computing circuit 404 generates a reference signal by subjecting the received detection signal to the sampling processing to obtain a minimum value signal (S1401). Then, the computing circuit 404 outputs the generated reference signal to the reference signal storing section 402, and the reference signal storing section 402 receives and stores the reference signal therein (S1103). The reference signal stored in the reference signal storing section 402 is used as a reference signal for making determination as to whether metallic fiber is included in a document or not in step S1106.

As described above, with the image reading apparatus to which the specific document determining apparatus according to Embodiment 8 is applied, the detection signal obtained by irradiating a microwave to the white reference plate 215 for scanning is subjected to the sampling processing to obtain a minimum value signal, and the obtained signal is used as a reference signal for making determination as to whether metallic fiber is included in a document or not, so that processing for comparison between the level of the reference signal and that of the detection signal can easily be performed, and at the same time an amount of data for the reference signal can be reduced. Accordingly, the amount of required memory in the reference signal storing section 402 can also be reduced.

An image reading apparatus to which a specific document determining apparatus according to Embodiment 9 is applied comprises steps of detecting any metallic components existing in a region for scanning a document (an environment for determination); storing positional information for the metallic components; irradiating a microwave to and scanning the document; detecting a reflected portion of the irradiated microwave for scanning, outputting a detection signal for the reflected wave; making determination as to whether the detection signal is a detection signal for a reflected wave reflected by the metallic components or not by using the stored positional information of the metallic components when making determination as to whether metallic fiber is included in the document or not; making determination as to whether metallic fiber is included in the document or not by comparing a level of the detection signal to a level of a specified reference signal when it is determined that the detection signal is not a detection signal for a reflected wave reflected by the metallic components; determining that the document is the specific document when it is determined that metallic fiber is included in the document; repeatedly executing scanning for the document, determination as to whether the detection signal is a detection signal for a reflected wave reflected by the metallic components or not, and determination as to whether metallic fiber is included in the document or not when it is determined that the detection signal is a detection signal reflected by metallic components and when it is determined that metallic fiber is not included in the document; determining that the document is the specific document when it is determined that metallic fiber is included in the document; and determining that the document is not the specific document when scanning for the document is terminated and it is determined that metallic fiber is not included in the document. It should be noted that the construction of the image reading apparatus to which the specific document determining apparatus according to Embodiment 9 is applied is the same as that to which the specific document determining apparatus according to Embodiment 1 is applied, so that description thereof is omitted herein.

Next description is made for operations of the image reading apparatus to which the specific document determining apparatus according to Embodiment 9 is applied in the order of (1) Processing for determining a metallic section, and (2) Processing for determining a specific document.

(1) Processing for Determining a Metallic Section

Figure 15:
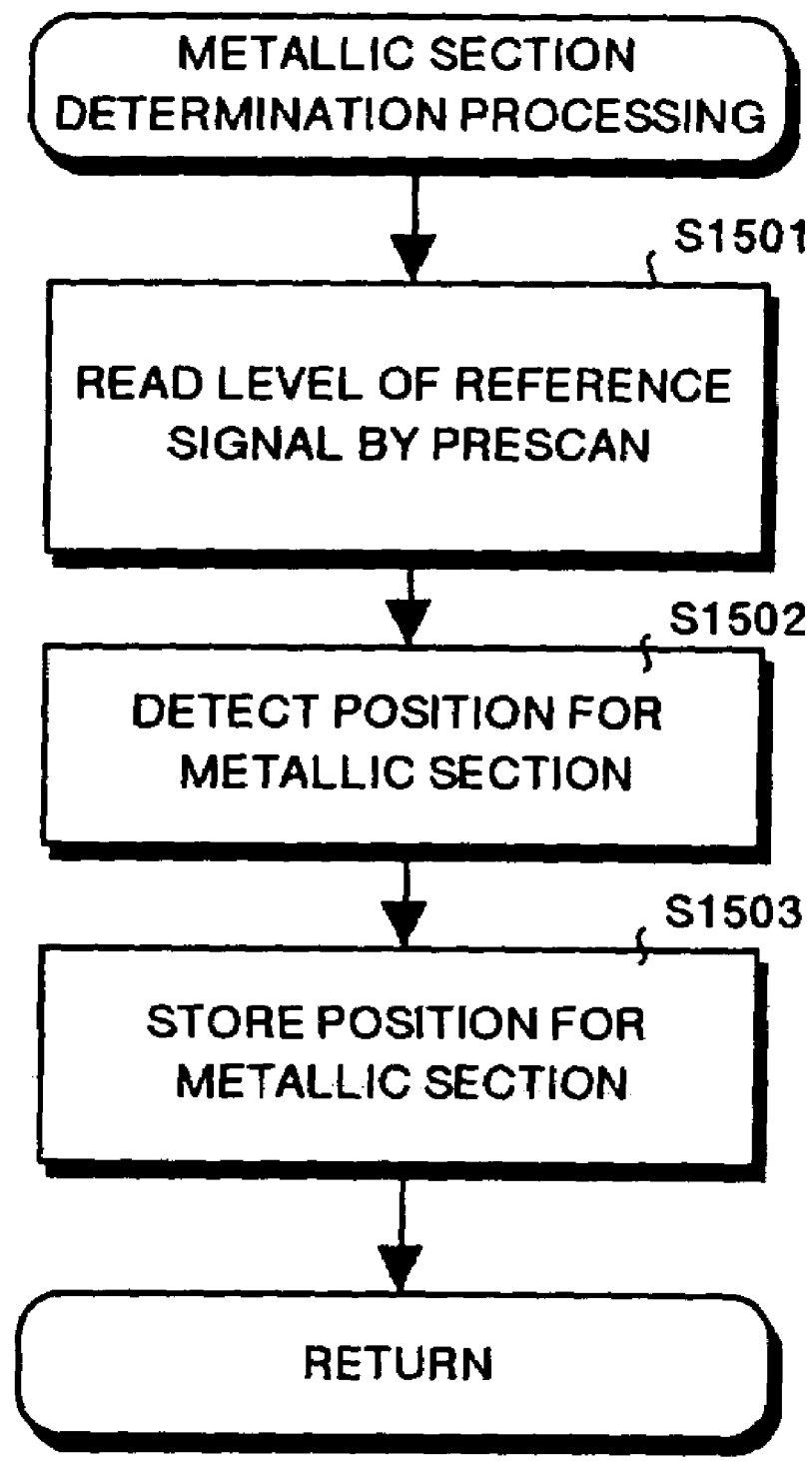
FIG. 15 is a flowchart showing a sequence of processing for determining a metallic section in the image reading apparatus to which a specific document determining apparatus according to Embodiment 9 is applied.

FIG. 15 is a flowchart showing a sequence of processing for determining a metallic section in the image reading apparatus to which the specific document determining apparatus according to Embodiment 9 is applied. The microwave sensor 161 irradiates, immediately after or at a specified timing after power is turned ON, a microwave to and scans the region for scanning a document, detects a reflected portion of the irradiated microwave, and outputs a detection signal corresponding to a level of the reflected wave to the signal processing section 162 (S1501).

Figure 16:
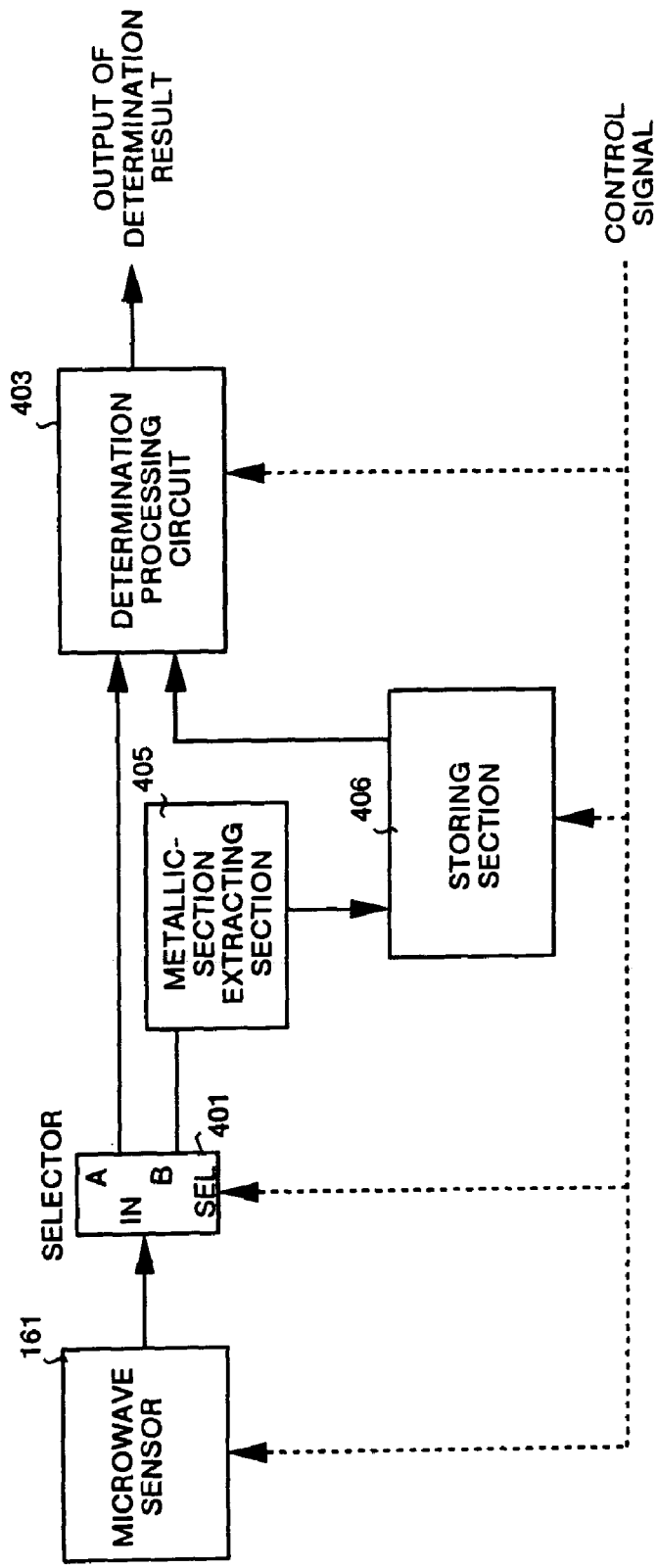
FIG. 16 is a block diagram showing a signal processing section provided in the image reading apparatus to which the specific document determining apparatus according to Embodiment 9 is applied.

The signal processing section 162 receives the detection signal outputted from the microwave sensor 161, as shown in FIG. 16, switches the selector 401 to the storing section 406, inputs the received detection signal in the metallic-section extracting section 405, and detects a position for a metallic section (e.g. ADF) existing in the region for scanning a document from the detection signal (S1502). The positional information for the metallic section detected by the metallic-section extracting section 405 is stored in the storing section 406 (S1503).

Figure 17:
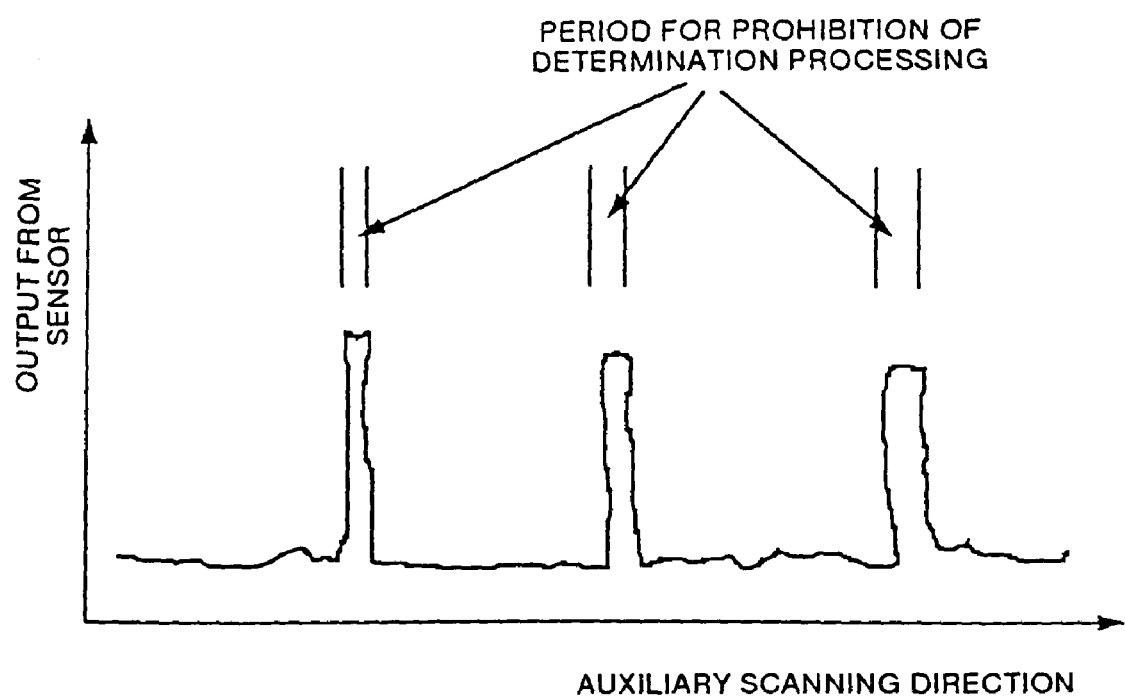
FIG. 17 is an explanatory view showing one example of detection signals outputted from the microwave sensor by executing the processing for determining a metallic section shown FIG. 16.

FIG. 17 is an explanatory view showing one example of detection signals outputted from the microwave sensor 161 by executing the processing for determining a metallic section. As shown in FIG. 17, three peaks appear in the detection signal outputted from the microwave sensor 161. Those three peaks indicate that a metallic section such as an ADF exists in the region for scanning a document. In Embodiment 9, determination is not made as to whether metallic fiber is included in a document or not using a detection signal for a reflected wave reflected by the region where those peaks have appeared in the processing for determining a specific document.

It should be noted that, as described in Embodiments 1 to 8, the detection signal obtained in the processing for determining a metallic section can be used as a reference signal for making determination as to whether metallic fiber exists in a document or not. In this case, this detection signal may be subjected to computing processing such as averaging processing.

(2) Processing for Determining a Specific Document

Figure 18:
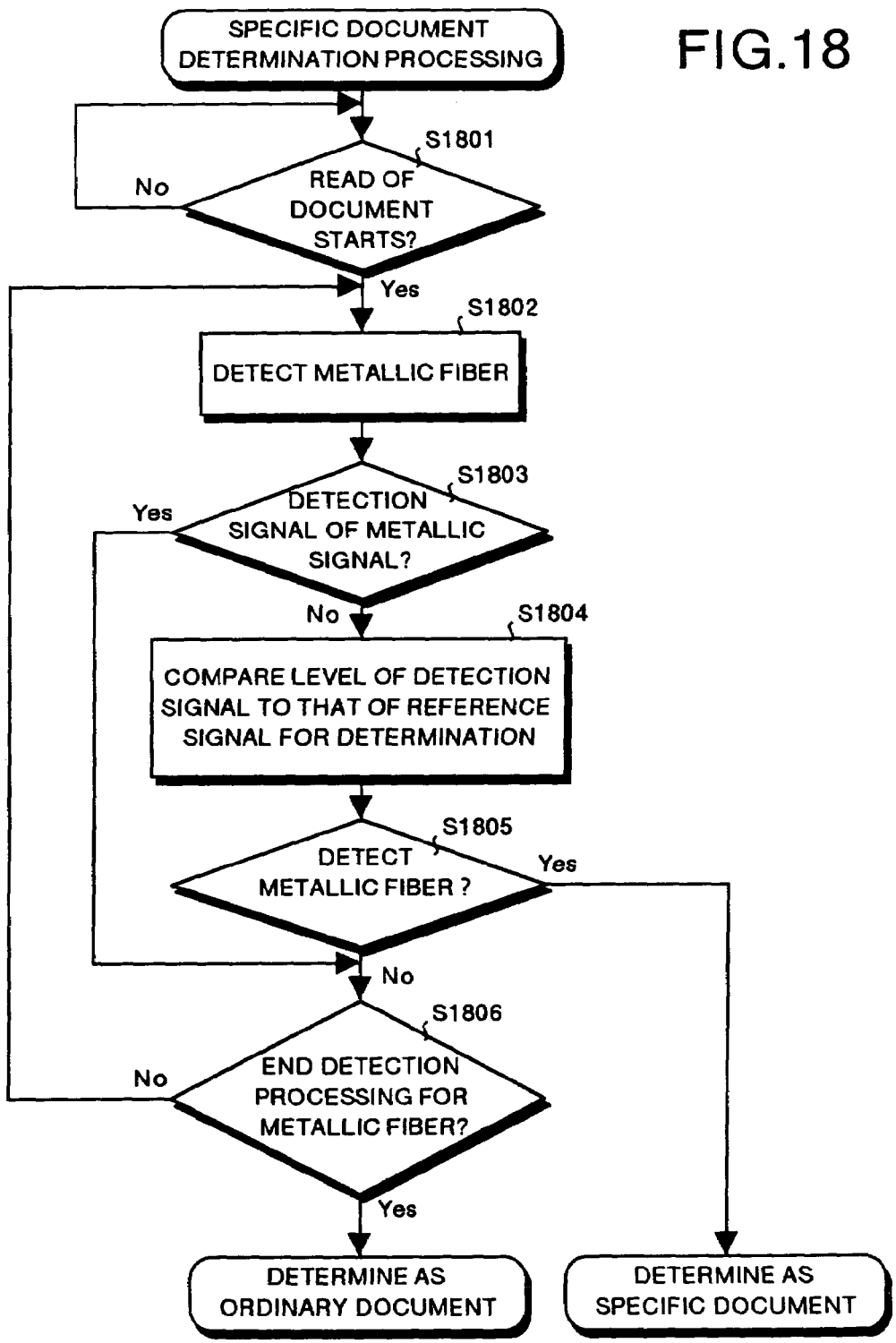
FIG. 18 is a flowchart showing a sequence of processing for determining a specific document in the image reading apparatus to which the specific document determining apparatus according to Embodiment 9 is applied.

In the image reading apparatus having the specific document determining function according to Embodiment 9, the processing for determining a specific document is executed when image data is read out from a document. FIG. 18 is a flowchart showing a sequence of processing for determining a specific document in the image reading apparatus to which the specific document determining apparatus according to Embodiment 9 is applied.

When a document is placed on the contact glass 201 and an instruction for reading image data from the document is issued (S1801), the processing for detecting metallic fiber included in the document is executed (S1802). In step S1802, the microwave sensor 161 irradiates a microwave to the document for scanning, detects a reflected portion of the irradiated microwave, and outputs a detection signal corresponding to a level of the reflected wave to the signal processing section 162.

The signal processing section 162 receives the detection signal outputted from the microwave sensor 161, switches the selector 401 to the determination processing circuit 403, inputs the received detection signal in the determination processing circuit 403, and at the same time reads out positional information for the metallic section stored in the storing section 406, and inputs the read out information to the determination processing circuit 403. The determination processing circuit 403 makes determination as to whether the detection signal is a signal obtained from a reflected wave reflected by the metallic section or not by using positional information for the metallic section (S1803).

When it is determined in step S1803 that the detection signal is a signal obtained from a reflected wave reflected by the metallic section, the processing returns to step S1802, and scanning for the document is continued by the microwave sensor 161 and a detection signal is outputted.

On the other hand, when it is determined in step S1803 that the detection signal is not a signal obtained from a reflected wave reflected by the metallic section, the comparison between a level of the detection signal and the level of the reference signal previously stored in the storing section 406 is performed in the determination processing circuit 403 (S1804).

In step S1804, it is determined that metallic fiber is included in the document when the level of the detection signal exceeds the level of the reference signal, while it is determined that metallic fiber is not included in the document when the level of the detection signal does not exceed the level of the reference signal (S1805).

When it is determined in step S1805 that metallic fiber is included in the document, a result of determination is reported from the determination processing circuit 403 to the controller 180, and the controller 180 determines that the document is the specific document such as bills or marketable securities with metallic fiber included therein.

On the other hand, when it is determined in step S1805 that metallic fiber is not included in the document, the processing returns to step S1802, and scanning for the document is continued by the microwave sensor 161 and a detection signal is outputted.

When it is determined that metallic fiber is not included in the document as a result of executing the processing from step S1802 to step S1805 over the whole region of the document, the processing for determining a specific document is ended (S1806). In this case, it is determined that the document is not a specific document but an ordinary document.

Then, when it is determined that the document is a specific document, the controller 180 executes the processing required for a specific document. The specific document such as bills or marketable securities is prevented from being illegally copied, for example, by stopping the reading image data from the document, or subjecting image data after having been read from the document to specific image processing differentiated from ordinary processing to form an image differentiated from the image in the document.

On the other hand, when it is determined that the document is not a specific document, the controller 180 starts the processing for reading image data from the document. It should be noted that the operation for reading image data is the same as that described in Embodiment 1, so that description thereof is omitted herein.

As described above, with the image reading apparatus according to Embodiment 9, as a metallic section existing in the region for scanning a document is previously recognized, it is possible to prevent erroneous determination due to influence of the metallic section in the apparatus even if any metallic section exists in the region for scanning a document due to the construction of an apparatus because a detection signal for a reflected wave reflected by the metallic section is not used for making determination as to whether metallic fiber is included in a document or not.

Figure 19:
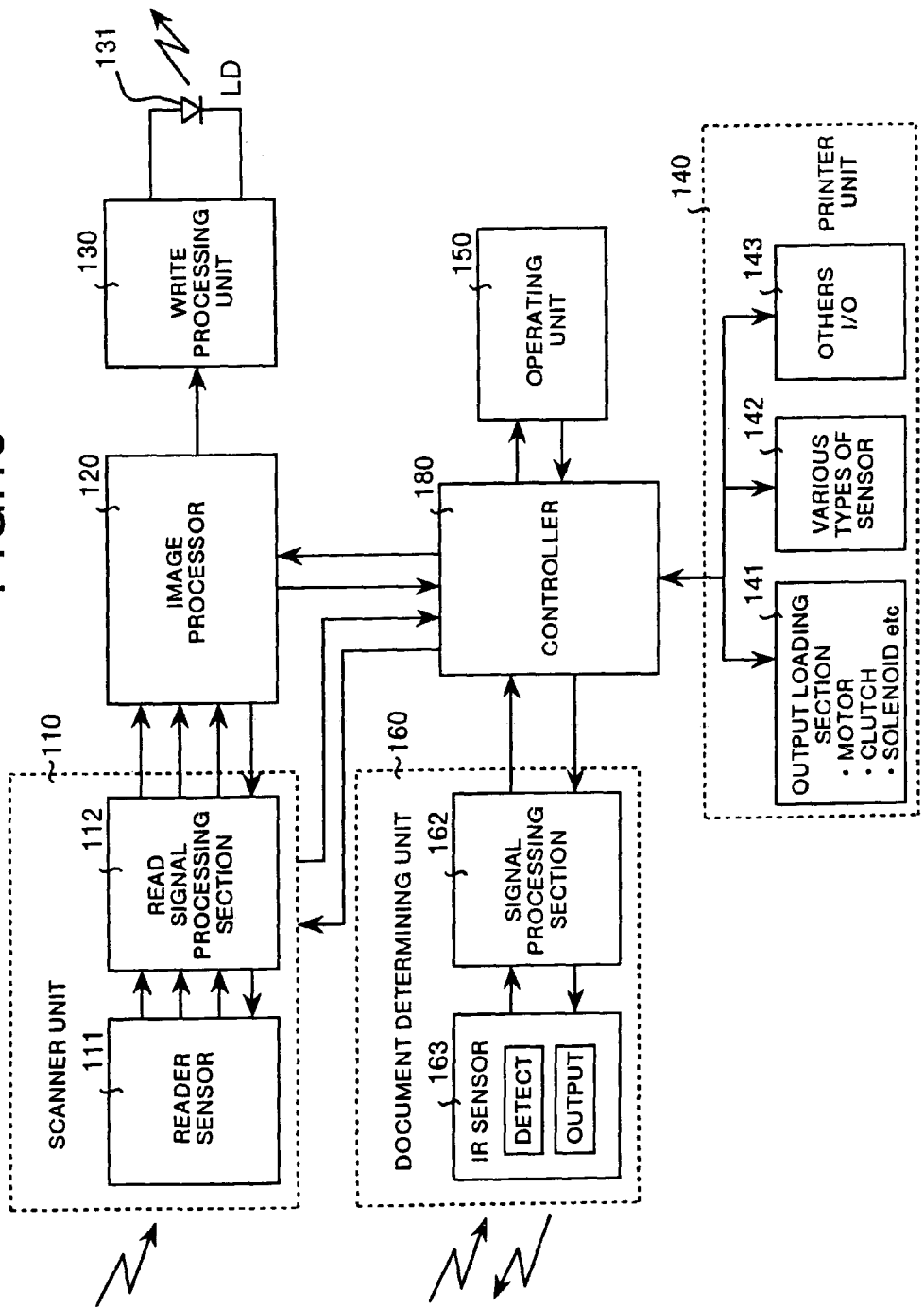
FIG. 19 is a block diagram showing an example of a modified image reading apparatus to which the specific document determining apparatus according to Embodiment 9 is applied.

It should be noted that, in Embodiment 9, the microwave sensor 161 is used in the processing for determining a metallic section as well as in the processing for determining a specific document, but as shown in FIG. 19, the sensor may be replaced with an IR (infrared rays) sensor 163.

An image reading apparatus to which a specific document determining apparatus according to Embodiment 10 is applied detects, when detecting a position of metallic components existing in the region for scanning a document in Embodiment 9, a position of metallic components existing a region of a document reading section by using previously inputted positional information for the metallic components.

Figure 20:
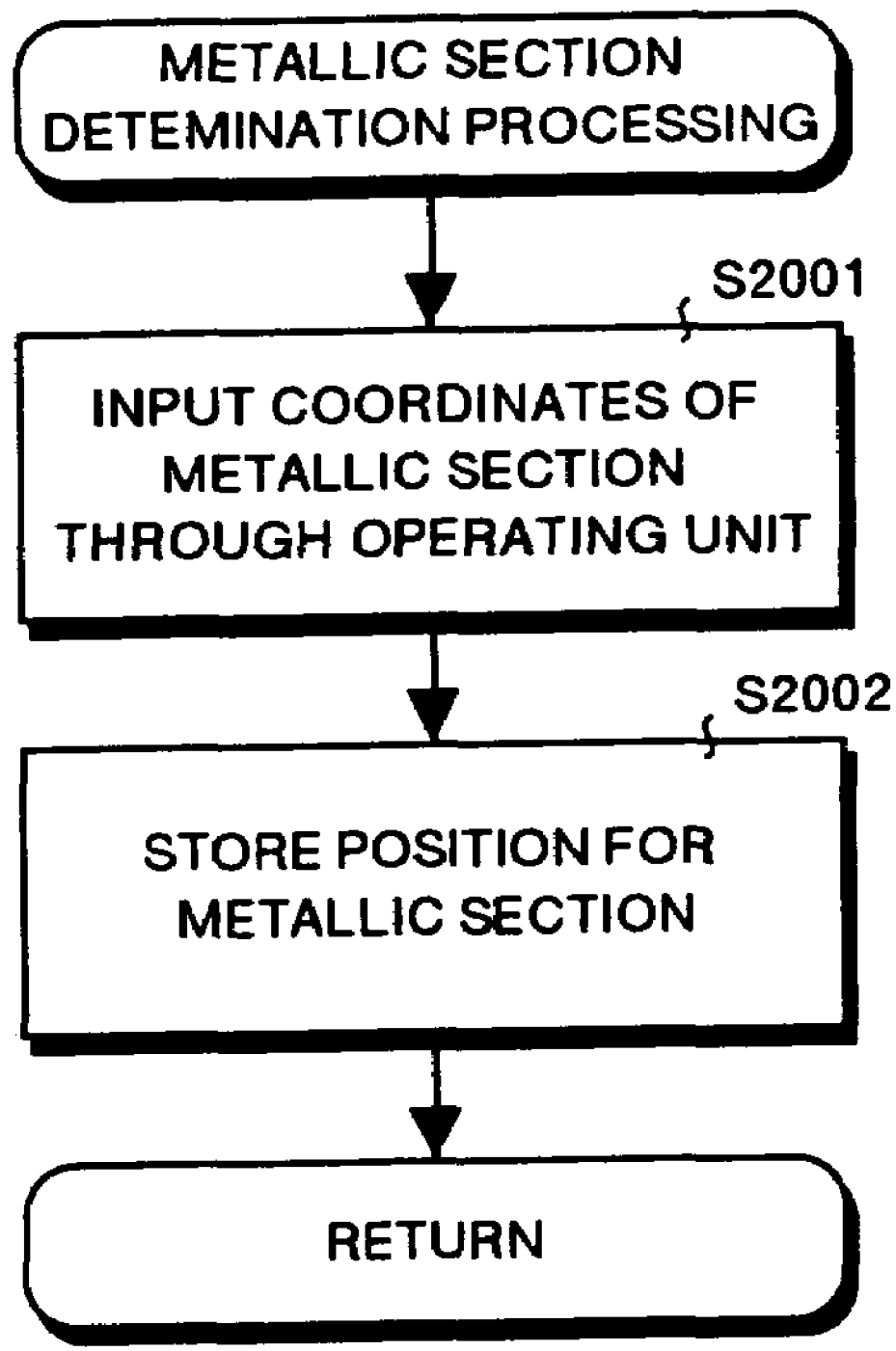
FIG. 20 is a flowchart showing a sequence of processing for determining a metallic section in the image reading apparatus to which a specific document determining apparatus according to Embodiment 10 is applied.

FIG. 20 is a flowchart showing a sequence of processing for determining a metallic section in the image reading apparatus to which the specific document determining apparatus according to Embodiment 10 is applied. After power is turned ON, a user inputs coordinates (positional information) of a metallic section (e.g. ADF) existing in the region for scanning a document through the operating unit 150 (S2001).

The inputted coordinates of the metallic section are stored in the storing section 406 of the signal processing section 162 (S2002).

It should be noted that the processing for determining a specific document executed by the image reading apparatus to which the specific document determining apparatus according to Embodiment 10 is applied is the same as that executed by the image reading apparatus to which the specific document determining apparatus according to Embodiment 9 is applied, so that description is omitted herein.

As described above, with the image reading apparatus to which the specific document determining apparatus according to Embodiment 10 is applied, a position of metallic components existing in the region for scanning a document is detected by using the previously inputted positional information for metallic components, so that, when existence of the metallic section in the region for scanning a document is previously known, the apparatus can easily recognize a position of the metallic section, which allows erroneous determination due to influence of the metallic section in the apparatus to be prevented.

It should be noted that each of the methods of determining a specific document described in Embodiments 1 to 10 can be programmed to enable storage thereof in a computer-readable recording medium such as a floppy disk, a hard disk, a CD-ROM, and DVD.

As described above, with the specific document determining apparatus according to the present invention, the apparatus comprises a detector which irradiates a microwave to and scans a specified area of the specific document determining apparatus before the document is placed on the document base, detects a reflected portion of the irradiated microwave, outputs a first detection signal, then irradiates a microwave to and scans the document after the document is placed on the document base and is covered with a pressure plate, detects a reflected portion of the irradiated microwave, and outputs a second detection signal; a first determining unit for making determination as to whether metallic fiber is included in the document or not by using the first detection signal as a reference and comparing a level of the reference signal to a level of the second detection signal; and a second determining unit for making determination according to a result of determination by the first determining unit as to whether the document is the specific document or not, so that a reference signal appropriate to a current environment of the apparatus can be obtained and determination can always be made with constantly high accuracy as to whether a document is a specific document such as bills or marketable securities with metallic fiber included therein or not even if a level of the detection signal outputted from the microwave sensor is changed, for example, when the pressure plate is constructed with a metallic member, when the attached condition of the pressure plate is changed, or when the use environment of the apparatus is changed.

Also, with the specific document determining apparatus according to the present invention, the detector irradiates a microwave to and scan the pressure plate and detects a reflected portion of the irradiated microwave when irradiating a microwave to and scanning a specific area within the specific document determining apparatus and detecting a reflected portion of the irradiated microwave, so that a reference signal appropriate to a current environment of the apparatus can be obtained and determination can always be made with constantly high accuracy as to whether a document is a specific document such as bills or marketable securities with metallic fiber included therein or not even if a level of the detection signal outputted from the microwave sensor is changed, for example, when the pressure plate is constructed with a metallic member, when the attached condition of the pressure plate is changed, or when the use environment of the apparatus is changed.

With the specific document determining apparatus according to the present invention, the detector irradiates a microwave to and scans a metallic plate provided at a position adjacent to the document base and detects a reflected portion of the irradiated microwave when irradiating a microwave to and scanning a specific area within the specific document determining apparatus and detecting a reflected portion of the irradiated microwave, so that a reference signal used as the reference for making determination as to whether metallic fiber is included in a document or not can be obtained with a simple construction.

With the specific document determining apparatus according to the present invention, the apparatus further comprises a computing unit for subjecting the first detection signal outputted from the detector to computing processing, so that determination can easily be made as to whether metallic fiber is included in a document or not, and an amount of data for a reference signal can also be reduced.

With the specific document determining apparatus according to the present invention, the computing unit subjects a first detection signal to computing processing by subjecting the first detection signal to averaging processing to obtain an average value signal when the first detection signal is to be subjected to computing processing, so that determination can easily be made as to whether metallic fiber is included in a document or not, and an amount of data for a reference signal can also be reduced.

With the specific document determining apparatus according to the present invention, the computing unit subjects a first detection signal to computing processing by subjecting the first detection signal to sampling processing to obtain a maximum value signal when the first detection signal is to be subjected to computing processing, so that determination can easily be made as to whether metallic fiber is included in a document or not, and an amount of data for a reference signal can also be reduced.

With the specific document determining apparatus according to the present invention, the computing unit subjects a first detection signal to computing processing by subjecting the first detection signal to sampling processing to obtain a minimum value signal when the first detection signal is to be subjected to computing processing, so that determination can easily be made as to whether metallic fiber is included in a document or not, and an amount of data for a reference signal can also be reduced.

With the specific document determining apparatus according to the present invention, the metallic plate provided at a position adjacent to the document base is a white reference plate, so that, when the specific document determining apparatus is applied to an image reading apparatus, any white reference plate generally used in the image reading apparatus can be used and also a reference signal can easily be obtained.

With the specific document determining apparatus according to the present invention, the apparatus further comprises a glass plate at a position adjacent to the metallic plate, and the detector irradiates a microwave to and scans the metallic plate via the glass plate and detects a reflected wave thereof via the glass plate, so that a reference signal used as the reference for making determination as to whether metallic fiber is included in a document or not can be obtained under the same conditions as those under which a microwave is irradiated to the document for scanning and the reflected wave is detected.

With the image reading apparatus according to the present invention, a specific document determining unit comprises the specific document determining apparatus as described above, so that determination can always be made with constantly high accuracy as to whether a document is a specific document such as bills or marketable securities with metallic fiber included therein or not, which allows the specific document such as bills or marketable securities to be prevented from being illegally copied.

With specific document determining method according to the present invention, the method comprises a first step of detecting any metallic components existing in an environment for determination to make determination as to whether a document is a specific document or not and storing positional information for the metallic components; a second step of irradiating a microwave to and scanning the document and detecting a reflected portion of the irradiated microwave for scanning to output a detection signal for the reflected wave; a third step of making determination as to whether the detection signal is a detection signal for a reflected wave reflected by the metallic components or not by using the positional information of the metallic components stored in the first step when making determination as to whether metallic fiber is included in the document or not; a fourth step of making determination as to whether metallic fiber is included in the document or not by comparing a level of the detection signal to a level of a specified reference signal when it is determined in the third step that the detection signal is not a detection signal for a reflected wave reflected by the metallic components; a fifth step of determining that the document is the specific document when it is determined in the fourth step that metallic fiber is included in the document; a sixth step of repeatedly executing scanning for the document, determination as to whether the detection signal is a detection signal for a reflected wave reflected by the metallic components or not, and determination as to whether metallic fiber is included in the document or not when it is determined in the third step that the detection signal is a detection signal for the reflected wave reflected by metallic components and when it is determined in the fourth step that metallic fiber is not included in the document; a seventh step of determining that the document is the specific document when it is determined in the sixth step that metallic fiber is included in the document; and an eighth step of determining that the document is not the specific document when scanning for the document is terminated and it is determined in the sixth step that metallic fiber is not included in the document, so that erroneous determination due to influence of the metallic components in the apparatus can be prevented.

With the specific document determining method according to the present invention, in the first step, when metallic components existing in the environment for determination are detected, a microwave is irradiated to the environment for determination for scanning in a state where the document is not in the environment, a reflected portion of the irradiated microwave is detected, and the detected reflected wave is used to detect the metallic components existing in the environment for determination, so that metallic components existing in the region for operating a document can automatically be detected, and erroneous determination due to influence of the metallic components in the apparatus can also be prevented.

With the specific document determining method according to the present invention, the method comprises a first step of detecting metallic components existing in an environment for determination to make determination as to whether a document is a specific document or not and storing positional information for the metallic components; a second step of irradiating an infrared ray to the document for scanning, detecting a reflected wave of the irradiated infrared ray for scanning and outputting a detection signal for the reflected wave; a third step of determining whether the detection signal is a detection signal for a reflected wave reflected by the metallic components or not by using the positional information for the metallic components stored in the first step when determining whether metallic fiber is included in the document or not; a fourth step of making determination as to whether metallic fiber is included in the document or not by comparing a level of the detection signal to a level of a specified reference signal when it is determined in the third step that the detection signal is not a detection signal for a reflected signal reflected by the metallic components; a fifth step of determining that the document is the specific document when it is determined in the fourth step that metallic fiber is included in the document; a sixth step of repeatedly executing scanning for the document, determination as to whether the detection signal is a detection signal for a reflected wave reflected by the metallic components or not, and determination as to whether metallic fiber is included in the document or not when it is determined in the third step that the detection signal is a detection signal for a reflected wave reflected by the metallic components and also when it is determined in the fourth step that metallic fiber is not included in the document; a seventh step of determining that the document is the specific document when it is determined in the sixth step that metallic fiber is included in the document; and an eighth step of determining that the document is not the specific document when scanning is terminated and it is determined in the sixth step that metallic fiber is not included in the document, so that erroneous determination due to influence of the metallic components in the apparatus can be prevented.

With the specific document determining method according to the present invention, in the first step, when detecting metallic components existing in the environment for determination, the infrared ray is irradiated into the environment for determination for scanning in a state where the document is not present, a reflected wave of the irradiated infrared ray is detected, and the metallic components existing in the environment for determination are detected by using the detected reflected wave, so that metallic components existing in the region for operating a document can automatically be detected, and erroneous determination due to influence of the metallic components in the apparatus can also be prevented.

With the specific document determining method according to the present invention, in the first step, when detecting metallic components existing in the environment for determination, metallic components existing in the environment for determination are detected by using the positional information for the metallic components previously inputted therein, so that, when existence of any metallic section in the region of a document reading section is previously known, the apparatus can easily recognize a position of the metallic section and erroneous determination due to influence of the metallic components in the apparatus can also be prevented.

With the specific document determining method according to the present invention, in the fourth step and the sixth step, when making determination as to whether metallic fiber is included in the document or not, determination is made as to whether metallic fiber is included in the document or not by comparing a level of the reflected wave used for detecting the metallic components in the first step to a level of the detection signal, so that a reference signal appropriate to a current environment of the apparatus can be obtained and determination can always be made with constantly high accuracy as to whether a document is a specific document such as bills or marketable securities with metallic fiber included therein or not even if the level of the detection signal outputted from the microwave sensor is changed, for example, when the pressure plate is constructed with a metallic member, when the attached condition of the pressure plate is changed, or when the use environment of the apparatus is changed.

Further, with the computer-readable recording medium, the medium stores therein a program for execution of the method as described above, so that the program itself used for the specific document determining method can appropriately be protected.

Figure 21:
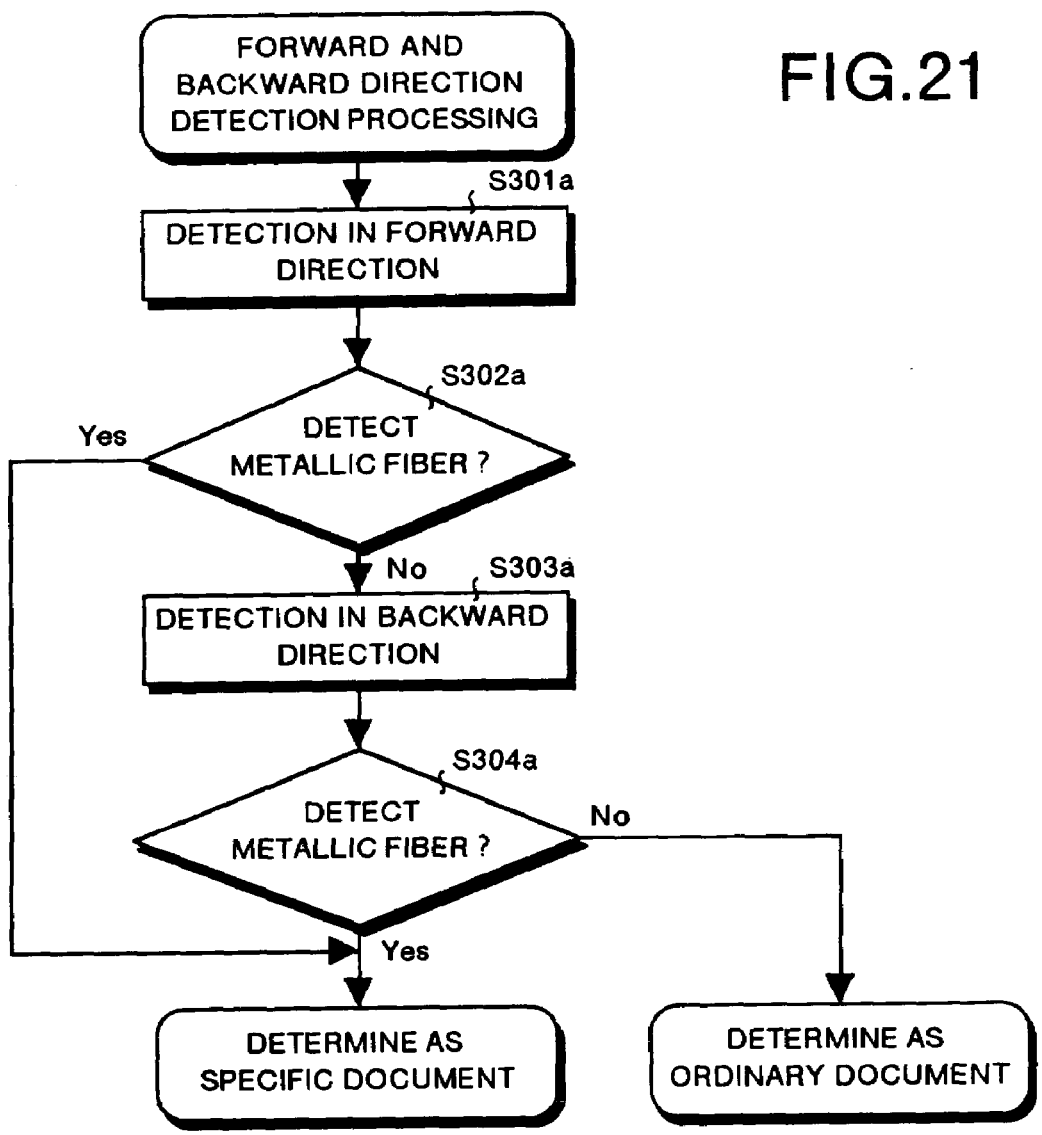
FIG. 21 is a flowchart showing a sequence of determining a specific document by a specific document determining apparatus according to Embodiment 11.

FIG. 1 is a block diagram showing a specific document determining apparatus (image reading apparatus) according to Embodiment 11, and FIG. 2 is a view concretely showing a construction of a document reading system of the specific document determining apparatus shown in FIG. 1. Detailed description thereof has already been made, so that it is omitted herein. Next description is made for the processing of determining a specific document executed by the specific document determining apparatus having the construction as described above. FIG. 21 is a flowchart showing a sequence of determining a specific document in the specific document determining apparatus according to Embodiment 11.

The processing for determining a specific document is executed simultaneously when prescan is executed. At first, when the first scanner 205 reciprocates for prescan over a document placed on the contact glass 201, in the forward direction for prescan, the microwave sensor 161 provided in the first scanner 205 irradiates a microwave to and scans a document, detects a reflected portion of the irradiated microwave, and outputs a detection signal for the portion detected in the forward direction for prescan corresponding to a level of the reflected wave to the signal processing section 162 (S301*a*).

The signal processing section 162 receives the detection signal obtained in the forward direction for scanning and makes determination as to whether metallic fiber is included in the document or not by using the received detection signal in the forward direction for scanning (S302*a*). In step S302*a*, when it is determined that metallic fiber is included in the document, a result of determination is reported to the controller 180, and the controller 180 determines that the document is a specific document such as bills or marketable securities with metallic fiber included therein.

On the other hand, when it is determined in step S302*a* that the metallic fiber is not included in the document, a result of determination is reported to the controller 180. Then, the controller 180 makes the microwave sensor 161 and the signal processing section 162 execute again the processing for determining a specific document in the backward direction for prescan (S303*a*).

Namely, the microwave sensor 161 irradiates a microwave to and scans a document also in the backward direction for scanning like in the forward direction, detects a reflected portion of the irradiated microwave, and outputs a detection signal obtained in the backward direction for scanning corresponding to a level of the reflected wave to the signal processing section 162.

Then, the signal processing section 162 receives the detection signal obtained in the backward direction for scanning and makes determination as to whether metallic fiber is included in the document or not by using the received detection signal in the backward direction for scanning (S304*a*).

In step S304*a*, when it is determined that metallic fiber is included in the document, a result of determination is reported to the controller 180, and the controller 180 determines that the document is a specific document such as bills or marketable securities with metallic fiber included therein. On the other hand, when it is determined in step S304*a* that the metallic fiber is not included in the document, a result of determination is reported to the controller 180, and the controller 180 determines that the document is not a specific document but an ordinary document.

As described above, with the specific document determining method and the specific document determining apparatus according to Embodiment 11, not only the processing for determining a specific document is executed in the forward direction for scanning by the first scanner 205 but also the same processing is executed again in the backward direction for scanning, so that it is possible to prevent influence of a difference between the direction of irradiating a microwave and that of reflecting the microwave to a result of determination, which allows accuracy in determination of a specific document to be improved. For example, when a metallic plate is used for the surface of the pressure plate 202, it is generally difficult to make determination of a specific document with high accuracy because of influence of a reflected wave from this metallic plate, but the influence of a reflected wave from the metallic plate may sometimes be reduced depending on an orientation of finishing touch provided onto the metallic surface. In the specific document determining method and the specific document determining apparatus according to Embodiment 11, determination is made as to whether metallic fiber is included in the document or not by using two detection signals in the forward and the backward directions for scanning, which allows processing for determining a specific document to be performed with high accuracy by making use of properties of the metallic plate. Also, when it is determined in the first determination processing for a specific document that the document is a specific document, the processing required thereafter is not executed, so that controlling can be simplified and speeding up of the processing for determination can be achieved.

It should be noted that, in the specific document determining apparatus according to Embodiment 11, the signal processing section 162 makes determination as to whether metallic fiber is included in the document or not by using a detection signal from the microwave sensor 161 and the controller 180 makes determination as to whether the document is a specific document or not according to a result of determination in the signal processing section 162, but all of the processing for determination may be performed by the signal processing section 162. Also, a timing of processing for determining a specific document is set to the time of prescan in Embodiment 11, but the timing is not restricted to the above timing.

In a specific document determining method and a specific document determining apparatus according to Embodiment 12, the first scanner 205 executes the processing for detecting metallic fiber in the forward direction when reciprocating for prescan over a document placed on the contact glass 201 to make determination as to whether metallic fiber is included in the document or not by using the detection signal obtained by the detection processing, and executes again the processing for detecting metallic fiber in the backward direction for prescan when it is determined that metallic fiber is included in the document to make determination as to whether metallic fiber is included in the document or not by using the detection signal obtained by the detection processing, and determines that the document is a specific document when it is determined that metallic fiber is included in the document. It should be noted that the specific document determining apparatus according to Embodiment 12 has the same construction as that of the specific document determining apparatus described in Embodiment 1, so that description thereof is omitted herein.

Figure 22:
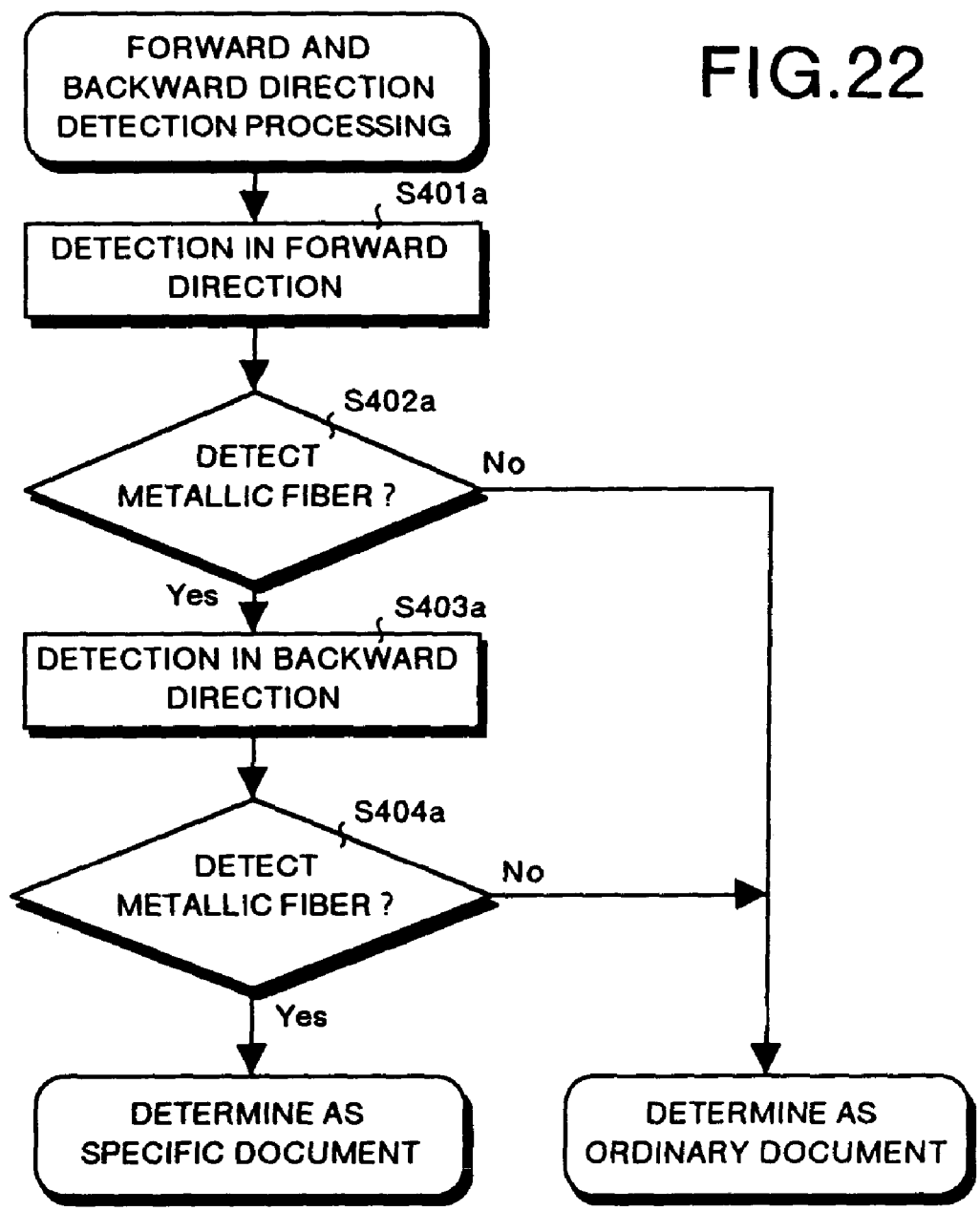
FIG. 22 is a flowchart showing a sequence of determining a specific document by a specific document determining apparatus according to Embodiment 12.

Next description is made for processing of determining a specific document by the specific document determining apparatus according to Embodiment 12. FIG. 22 is a flowchart showing a sequence of processing for determining a specific document in the specific document determining apparatus according to Embodiment 12.

The processing for determining a specific document is executed simultaneously when prescan is executed. At first, when the first scanner 205 reciprocates for prescan over a document placed on the contact glass 201, in the forward direction of the reciprocating movements for prescan, the microwave sensor 161 provided in the first scanner 205 irradiates a microwave to and scans a document, detects a reflected portion of the irradiated microwave, and outputs a detection signal obtained in the forward direction for prescan corresponding to a level of the reflected wave to the signal processing section 162 (S401a).

The signal processing section 162 receives the detection signal obtained in the forward direction for prescan and makes determination as to whether metallic fiber is included in the document or not by using the received detection signal in the forward direction for prescan (S402a). In step 402a, when it is determined that metallic fiber is not included in the document, a result of determination is reported to the controller 180, and the controller 180 determines that the document is not a specific document such as bills or marketable securities with metallic fiber included therein but an ordinary document.

On the other hand, when it is determined in step S402a that the metallic fiber is included in the document, a result of determination is reported to the controller 180. Then, the controller 180 makes the microwave sensor 161 and the signal processing section 162 execute again the processing for determining a specific document in the backward direction for prescan (S403a).

Namely, the microwave sensor 161 irradiates a microwave to and scans a document also in the backward direction for prescan like in the forward direction, detects a reflected portion of the irradiated microwave, and outputs a detection signal obtained in the backward direction for prescan corresponding to a level of the reflected wave to the signal processing section 162.

Then, the signal processing section 162 receives the detection signal obtained in the backward direction for scanning and makes determination as to whether metallic fiber is included in the document or not by using the received detection signal in the backward direction for prescan (S404a).

In step S404a, when it is determined that metallic fiber is included in the document, a result of determination is reported to the controller 180, and the controller 180 determines that the document is a specific document such as bills or marketable securities with metallic fiber included therein. On the other hand, when it is determined in step S404a that the metallic fiber is not included in the document, a result of determination is reported to the controller 180, and the controller 180 determines that the document is not a specific document but an ordinary document.

As described above, with the specific document determining method and the specific document determining apparatus according to Embodiment 12, not only the processing for determining a specific document is executed in the forward direction for scanning by the first scanner 205 but also the same processing is executed again in the backward direction for scanning, so that it is possible to prevent influence of a difference between the direction of irradiating a microwave and that of reflecting the microwave to a result of determination, which allows accuracy in determination of a specific document to be improved. For example, when a metallic plate is used for the surface of the pressure plate 202, it is generally difficult to make determination of a specific document with high accuracy because of influence of a reflected wave from this metallic plate, but the influence of a reflected wave from the metallic plate may sometimes be reduced depending on a direction of finishing the metallic surface. In the specific document determining method and the specific document determining apparatus according to Embodiment 12, determination is made as to whether metallic fiber is included in the document or not by using two detection signals in the forward and the backward directions for scanning, which allows processing for determining a specific document to be performed with high accuracy by making use of properties of the metallic plate. Also, when it is determined in the first determination processing for a specific document that the document is not a specific document, the processing required thereafter is not executed, so that controlling can be simplified and speeding up of the processing for determination can be achieved.

It should be noted that, in the specific document determining apparatus according to Embodiment 12, the signal processing section 162 makes determination as to whether metallic fiber is included in a document or not by using a detection signal from the microwave sensor 161 and the controller 180 makes determination as to whether the document is a specific document or not according to a result of determination in the signal processing section 162, but all of the processing for determination may be performed by the signal processing section 162. Also, a timing of processing for determining a specific document is set to the time of prescan in Embodiment 12, but the timing is not restricted to the above timing.

In a specific document determining method and a specific document determining apparatus according to Embodiment 13, the first scanner 205 executes the processing for detecting metallic fiber in both the forward direction and the backward direction when reciprocating for prescan over a document placed on the contact glass 201 to make determination as to whether metallic fiber is included in the document or not by comparing the detection signal in the forward direction to the detection signal in the backward direction each obtained by the detection processing, and determines that the document is a specific document such as bills or marketable securities with metallic fiber included therein when it is determined that metallic fiber is included in the document. It should be noted that the specific document determining apparatus according to Embodiment 13 has the same construction as that of the specific document determining apparatus described in Embodiment 1, so that description thereof is omitted herein.

Figure 23:
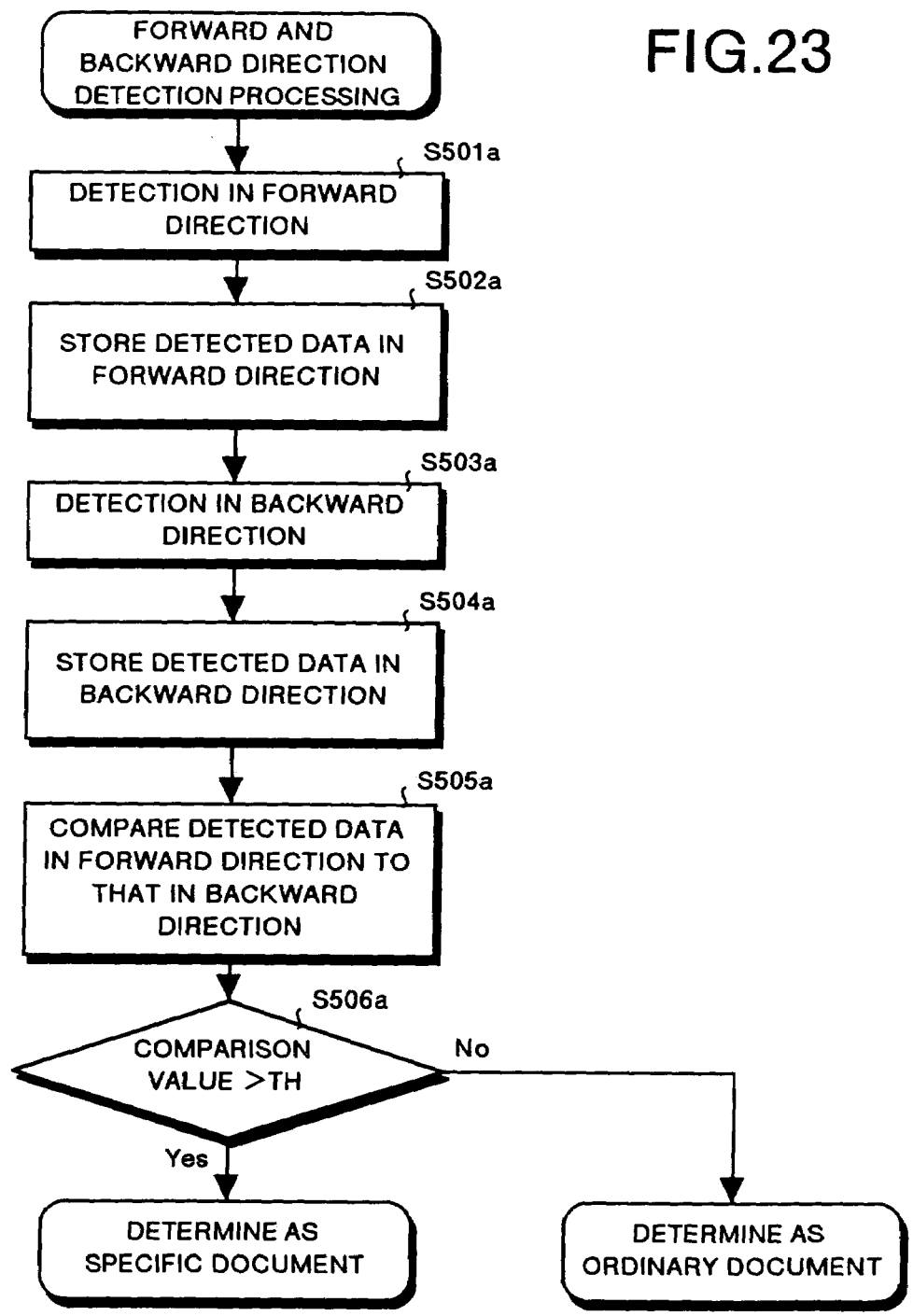
FIG. 23 is a flowchart showing a sequence of determining a specific document by a specific document determining apparatus according to Embodiment 13.

Next description is made for processing of determining a specific document by the specific document determining apparatus according to Embodiment 13. FIG. 23 is a flowchart showing a sequence of processing for determining a specific document in the specific document determining apparatus according to Embodiment 13.

The processing for determining a specific document is executed simultaneously when prescan is executed. At first, when the first scanner 205 reciprocates for prescan over a document placed on the contact glass 201, in the forward direction for prescan, the microwave sensor 161 provided in the first scanner 205 irradiates a microwave to and scans a document, detects a reflected portion of the irradiated microwave, and outputs a detection signal obtained in the forward direction for scanning corresponding to a level of the reflected wave to the signal processing section 162 (S501a).

The signal processing section 162 receives the detection signal obtained in the forward direction for scanning and makes the signal storing section 170 store the received detection signal obtained in the forward direction for prescan (S502a).

Then, the microwave sensor 161 irradiates a microwave to and scans a document also in the backward direction for prescan like in the forward direction, detects a reflected portion of the irradiated microwave, and outputs a detection signal obtained in the backward direction for prescan corresponding to a level of the reflected wave to the signal processing section 162 (S503a).

The signal processing section 162 receives the detection signal obtained in the backward direction for prescan and makes the signal storing section 170 store the received detection signal obtained in the backward direction for prescan (S504a).

The signal processing section 162 reads out the detection signals obtained in the forward direction as well as in the backward direction for prescan from the signal storing section 170 to obtain a comparison value by comparing both of the signals to each other (S505a). Namely, a difference signal between the detection signal in the forward direction and the detection signal in the backward direction for prescan is obtained. Then, the signal processing section 162 compares the comparison value (difference signal) obtained by the processing for comparison to the preset threshold value (S506a).

In step S506a, it is determined that metallic fiber is included in the document when it is determined that the comparison value is larger than the threshold value, and a result of determination is reported to the controller 180. The controller 180 determines that the document is a specific document such as bills or marketable securities with metallic fiber included therein according to a result of determination. On the other hand, it is determined that metallic fiber is not included in the document when it is determined that the comparison value is smaller than the threshold value, and a result of determination is reported to the controller 180. The controller 180 determines that the document is an ordinary document according to a result of determination.

As described above, with the specific document determining method and the specific document determining apparatus according to Embodiment 13, determination is made as to whether the document is a specific document or not by comparing the detection signals to each other obtained in both the forward and backward directions for prescan, so that noise elements can be removed from the signals during the processing for the comparison and the comparison value with a high SN ratio can be obtained. As noise elements, there is influence to detection signal due to vibration of the reading apparatus and influence by external noises and so on.

It should be noted that, in the specific document determining apparatus according to Embodiment 13, the signal processing section 162 makes determination as to whether metallic fiber is included in a document or not by using a detection signal from the microwave sensor 161 and the controller 180 makes determination as to whether the document is a specific document or not according to a result of determination in the signal processing section 162, but all of the processing for determination may be performed by the signal processing section 162. Also, a timing of processing for determining a specific document is set to the time of prescan in Embodiment 13, but the timing is not restricted to the above timing.

In a specific document determining method and a specific document determining apparatus according to Embodiment 14, the first scanner 205 executes the processing for detecting metallic fiber in both the forward direction and the backward direction when reciprocating for prescan over a document placed on the contact glass 201 to make determination as to whether metallic fiber is included in the document or not by subjecting the detection signals in the forward and backward directions each obtained by the detection processing to averaging processing, and determines that the document is a specific document such as bills or marketable securities with metallic fiber included therein when it is determined that metallic fiber is included in the document. It should be noted that the specific document determining apparatus according to Embodiment 14 has the same construction as that of the specific document determining apparatus described in Embodiment 1, so that description thereof is omitted herein.

Figure 24:
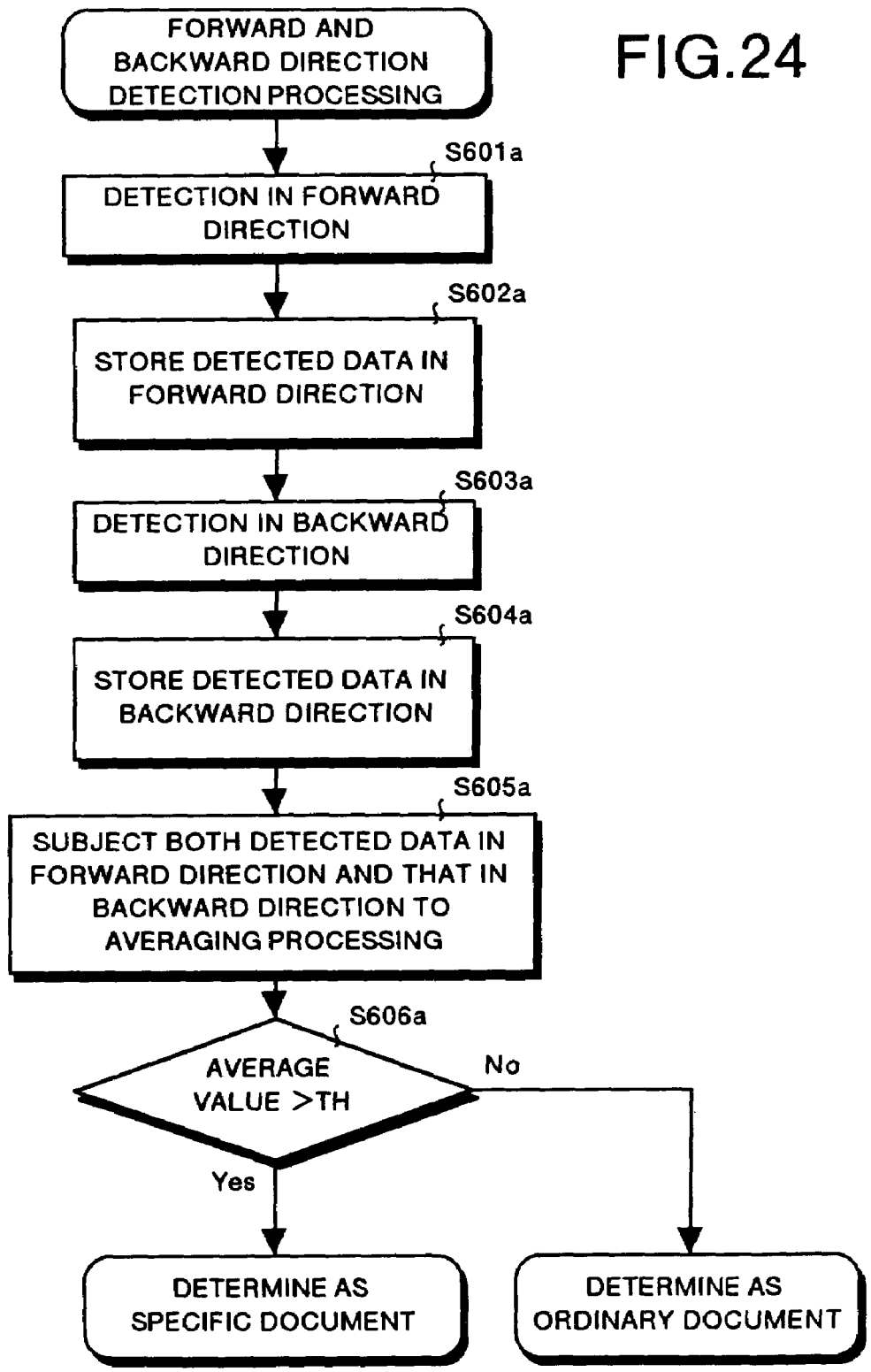
FIG. 24 is a flowchart showing a sequence of determining a specific document by a specific document determining apparatus according to Embodiment 14.

Next description is made for processing of determining a specific document by the specific document determining apparatus according to Embodiment 14. FIG. 24 is a flowchart showing a sequence of processing for determining a specific document in the specific document determining apparatus according to Embodiment 14.

The processing for determining a specific document is executed simultaneously when prescan is executed. At first, when the first scanner 205 reciprocates for prescan over a document placed on the contact glass 201, in the forward direction for prescan, the microwave sensor 161 provided in the first scanner 205 irradiates a microwave to and scans a document, detects a reflected portion of the irradiated microwave, and outputs a detection signal obtained in the forward direction for prescan corresponding to a level of the reflected wave to the signal processing section 162 (S601a).

The signal processing section 162 receives the detection signal obtained in the forward direction for prescan and makes the signal storing section 170 store the received detection signal obtained in the forward direction for prescan (S602a).

Then, the microwave sensor 161 irradiates a microwave to and scans a document also in the backward direction for prescan like in the forward direction, detects a reflected portion of the irradiated microwave, and outputs a detection signal obtained in the backward direction for prescan corresponding to a level of the reflected wave to the signal processing section 162 (S603a).

The signal processing section 162 receives the detection signal obtained in the backward direction for prescan and makes the signal storing section 170 store the received detection signal obtained in the backward direction for prescan (S604a).

The signal processing section 162 reads out the detection signals obtained in the forward direction as well as in the backward direction for prescan from the signal storing section 170 to obtain an average value by subjecting both of the signals to averaging processing (S605a). Then, the signal processing section 162 compares the average value obtained by the processing for averaging to the preset threshold value (S606a).

In step S606a, it is determined that metallic fiber is included in the document when it is determined that the average value is larger than the threshold value, and a result of determination is reported to the controller 180. The controller 180 determines that the document is a specific document such as bills or marketable securities with metallic fiber included therein according to a result of determination. On the other hand, it is determined that metallic fiber is not included in the document when it is determined that the average value is smaller than the threshold value, and a result of determination is reported to the controller 180. The controller 180 determines that the document is an ordinary document according to a result of determination.

As described above, with the specific document determining method and the specific document determining apparatus according to Embodiment 14, determination is made as to whether the document is a specific document or not by subjecting the detection signals obtained in both the forward and backward directions for prescan to averaging processing, so that influence of interference elements such as each direction of irradiation and reflection of a microwave, temperature, vibrations, and external noises can be removed from the signals, which allows accuracy in determination of a specific document to be improved.

It should be noted that, in the specific document determining apparatus according to Embodiment 14, the signal processing section 162 makes determination as to whether metallic fiber is included in a document or not by using a detection signal from the microwave sensor 161 and the controller 180 makes determination as to whether the document is a specific document or not according to a result of determination in the signal processing section 162, but all of the processing for determination may be performed by the signal processing section 162. Also, a timing of processing for determining a specific document is set to the time of prescan in Embodiment 14, but the timing is not restricted to the above timing.

In a specific document determining method and a specific document determining apparatus (an image reading apparatus) according to Embodiment 15, the first scanner 205 executes the processing for detecting metallic fiber in the forward direction when reciprocating for prescan over a document placed on the contact glass 201 to make determination as to whether metallic fiber is included in the document or not by using the detection signal obtained by the detection processing, and executes again the processing for detecting metallic fiber in the backward direction for prescan when it is determined that metallic fiber is not included in the document to make determination as to whether the document is a specific document or not by using the detection signal obtained in the processing for detection, and further, the exposure illuminating unit 203 is lit up also in the backward direction for prescan like in the forward direction to execute the processing for determining a specific document under the same conditions. It should be noted that the specific document determining apparatus according to Embodiment 15 has the same construction as that of the specific document determining apparatus described in Embodiment 1, so that description thereof is omitted herein.

Figure 25:
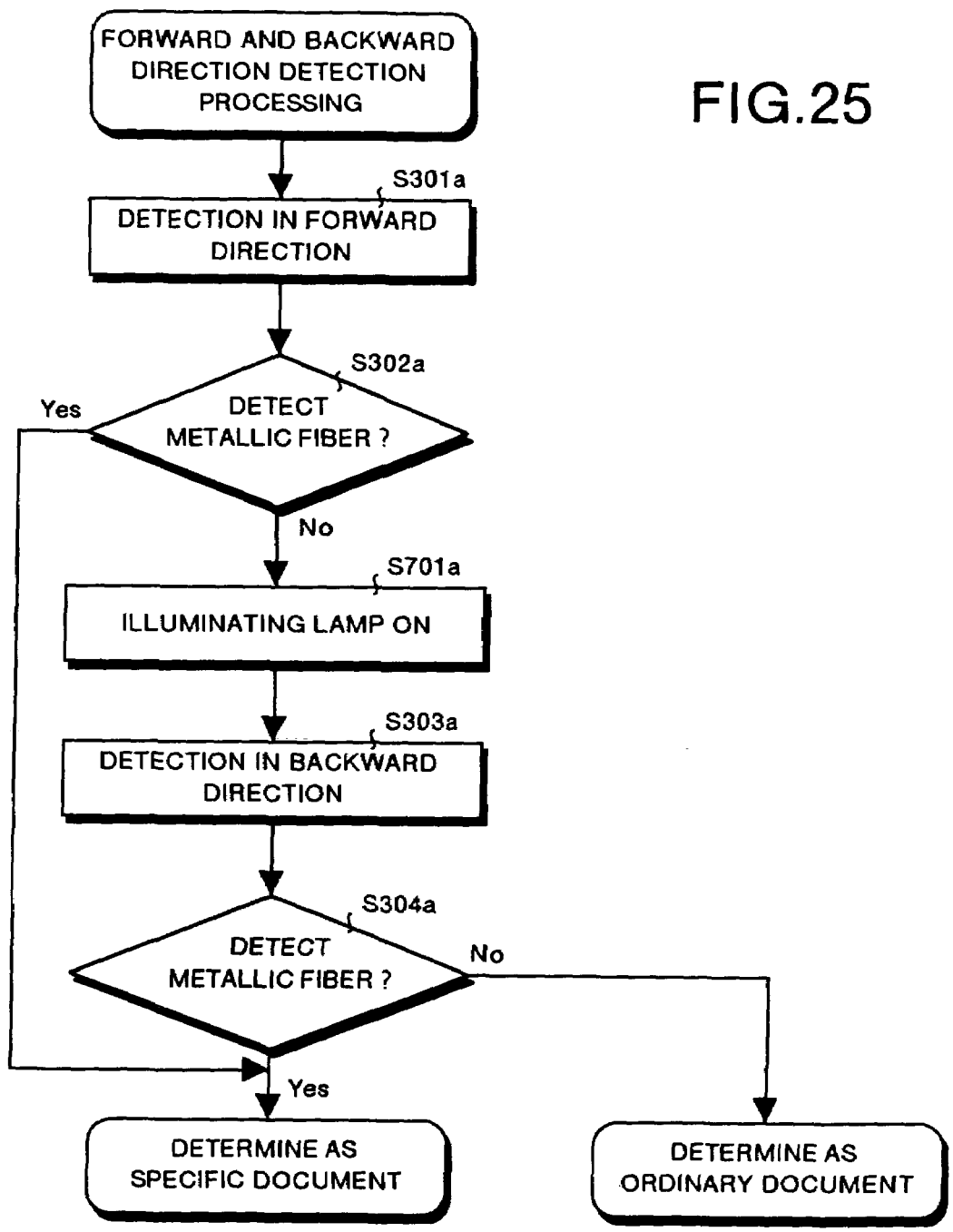
FIG. 25 is a flowchart showing a sequence of determining a specific document by a specific document determining apparatus according to Embodiment 15.

Next description is made for processing of determining a specific document by the specific document determining apparatus according to Embodiment 15. FIG. 25 is a flowchart showing a sequence of processing for determining a specific document in the specific document determining apparatus according to Embodiment 15. It should be noted that, in the sequence of determining a specific document shown in FIG. 25, processing from step S301a to step S304a is the same as that in FIG. 21 described in Embodiment 11, so that only different points therefrom are explained hereinafter.

The prescan is generally executed by lighting up the exposure illuminating unit 203 in the forward direction when the first scanner 205 reciprocates over a document placed on the contact glass 201. Accordingly, in the backward direction for prescan, the first scanner 205 is moved with the exposure illuminating unit 203 turned OFF. However, when determining a specific document by using detection signals obtained in both the forward direction and the backward direction for prescan, with the above condition, the exposure illuminating unit 203 is lit up in the forward direction for prescan but it is turned off in the backward direction for prescan, which does resultantly differentiate a detection signal obtained in the forward direction for prescan from that obtained in the backward direction for prescan because of influences of the temperature difference due to illumination or the like.

For this reason, in the specific document determining apparatus according to Embodiment 15, when it is determined in step S302a that metallic fiber is not included in the document, the controller 180 lights up the exposure illuminating unit 203 also in the backward direction for prescan (S701a), so that the processing for determining a specific document is executed with the exposure illuminating unit 203 lit up in the backward direction like in the forward direction for prescan.

As described above, with the specific document determining method and the specific document determining apparatus according to Embodiment 15, the exposure illuminating unit 203 is designed to be lit up also in the backward direction when the first scanner 205 reciprocates for prescan over a document placed on the contact glass 201, so that influence of the temperature difference or the like generated in detection signals between a case with illumination and a case without illumination can be removed from the signals, which allows accuracy in determination of a specific document to be improved.

It should be noted that, in Embodiment 15, the exposure illuminating unit 203 is designed to be lit up when the processing for determining a specific document is executed, but, conversely, the processing for determining a specific document may be executed with the exposure illuminating unit 203 being turned off. Description has been made only for the exposure illuminating unit 203 in Embodiment 15, but it is desirable to previously decide whether the condensation preventing heater 218 or the like should be turned ON or OFF when the processing for determining a specific document is executed.

In a specific document determining method and a specific document determining apparatus (an image reading apparatus) according to Embodiment 16, the first scanner 205 executes the processing for detecting metallic fiber in the forward direction when reciprocating for prescan over a document placed on the contact glass 201 to make determination as to whether metallic fiber is included in the document or not by using the detection signal obtained by the detection processing, and executes again the processing for detecting metallic fiber in the backward direction for prescan when it is determined that metallic fiber is included in the document to make determination as to whether the document is a specific document or not by using the detection signal obtained in the processing for detection, and further, the exposure illuminating unit 203 is lit up also in the backward direction for prescan like in the forward direction to execute the processing for determining a specific document under the same conditions. It should be noted that the specific document determining apparatus according to Embodiment 16 has the same construction as that of the specific document determining apparatus described in Embodiment 1, so that description thereof is omitted herein.

Figure 26:
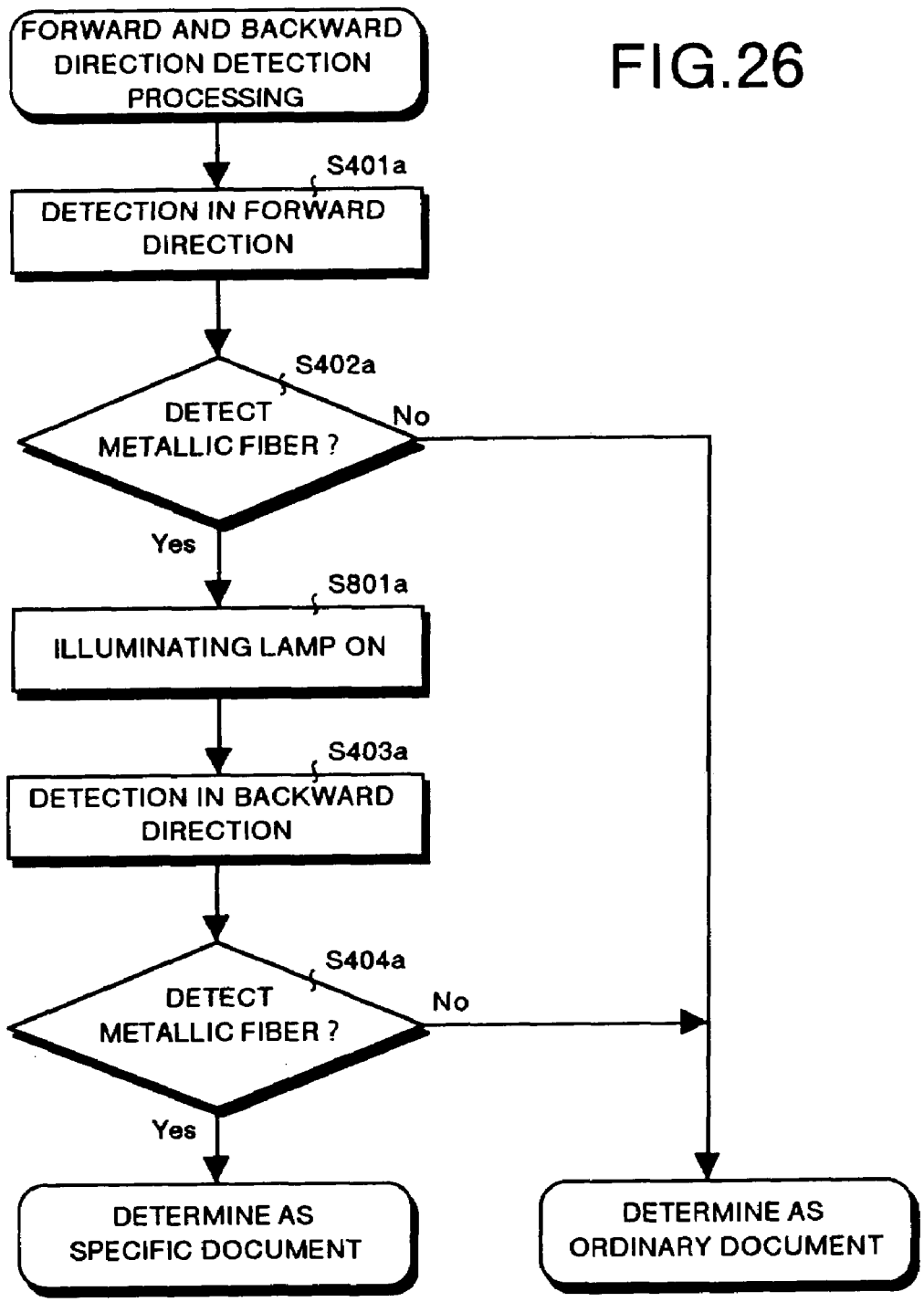
FIG. 26 is a flowchart showing a sequence of determining a specific document by a specific document determining apparatus according to Embodiment 16.

Next description is made for processing of determining a specific document by the specific document determining apparatus according to Embodiment 16. FIG. 26 is a flowchart showing a sequence of processing for determining a specific document in the specific document determining apparatus according to Embodiment 16. It should be noted that, in the sequence of determining a specific document shown in FIG. 26, processing from step S401a to step S404a is the same as that in FIG. 22 described in Embodiment 12, so that only different points therefrom are explained hereinafter.

The prescan is generally executed by lighting up the exposure illuminating unit 203 in the forward direction when the first scanner 205 reciprocates over a document placed on the contact glass 201. Accordingly, in the backward direction for prescan, the first scanner 205 is moved with the exposure illuminating unit 203 turned OFF. However, when determining a specific document by using detection signals obtained in both the forward direction and the backward direction for prescan, with the above condition, the exposure illuminating unit 203 is lit up in the forward direction for prescan but it is turned off in the backward direction for prescan, which does resultantly differentiate a detection signal obtained in the forward direction for prescan from that obtained in the backward direction for prescan because of influences of the temperature difference due to illumination or the like.

For this reason, in the specific document determining apparatus according to Embodiment 16, when it is determined in step S402a that metallic fiber is included in the document, the controller 180 lights up the exposure illuminating unit 203 also in the backward direction for prescan (S801a), so that the processing for determining a specific document is executed with the exposure illuminating unit 203 lit up in the backward direction like in the forward direction for prescan.

As described above, with the specific document determining method and the specific document determining apparatus according to Embodiment 16, the exposure illuminating unit 203 is designed to be lit up also in the backward direction when the first scanner 205 reciprocates for prescan over a document placed on the contact glass 201, so that influence of the temperature difference or the like generated in detection signals between a case with illumination and a case without illumination can be removed from the signals, which allows accuracy in determination of a specific document to be improved.

It should be noted that, in Embodiment 16, the exposure illuminating unit 203 is designed to be lit up when the processing for determining a specific document is executed, but, conversely, the processing for determining a specific document may be executed with the exposure illuminating unit 203 being turned off. Description has been made only for the exposure illuminating unit 203 in Embodiment 16, but it is desirable to previously decide whether the condensation preventing heater 218 or the like should be turned ON or OFF when the processing for determining a specific document is executed.

In a specific document determining method and a specific document determining apparatus (an image reading apparatus) according to Embodiment 17, the first scanner 205 executes the processing for detecting metallic fiber in both the forward direction and the backward direction when reciprocating for prescan over a document placed on the contact glass 201 to make determination as to whether the document is a specific document such as bills or marketable securities with metallic fiber included therein or not by comparing the detection signal in the forward direction to that in the backward direction each obtained by the detection processing, and further, the exposure illuminating unit 203 is lit up also in the backward direction for prescan like in the forward direction to execute the processing for determining a specific document under the same conditions. It should be noted that the specific document determining apparatus according to Embodiment 17 has the same construction as that of the specific document determining apparatus described in Embodiment 1, so that description thereof is omitted herein.

Figure 27:
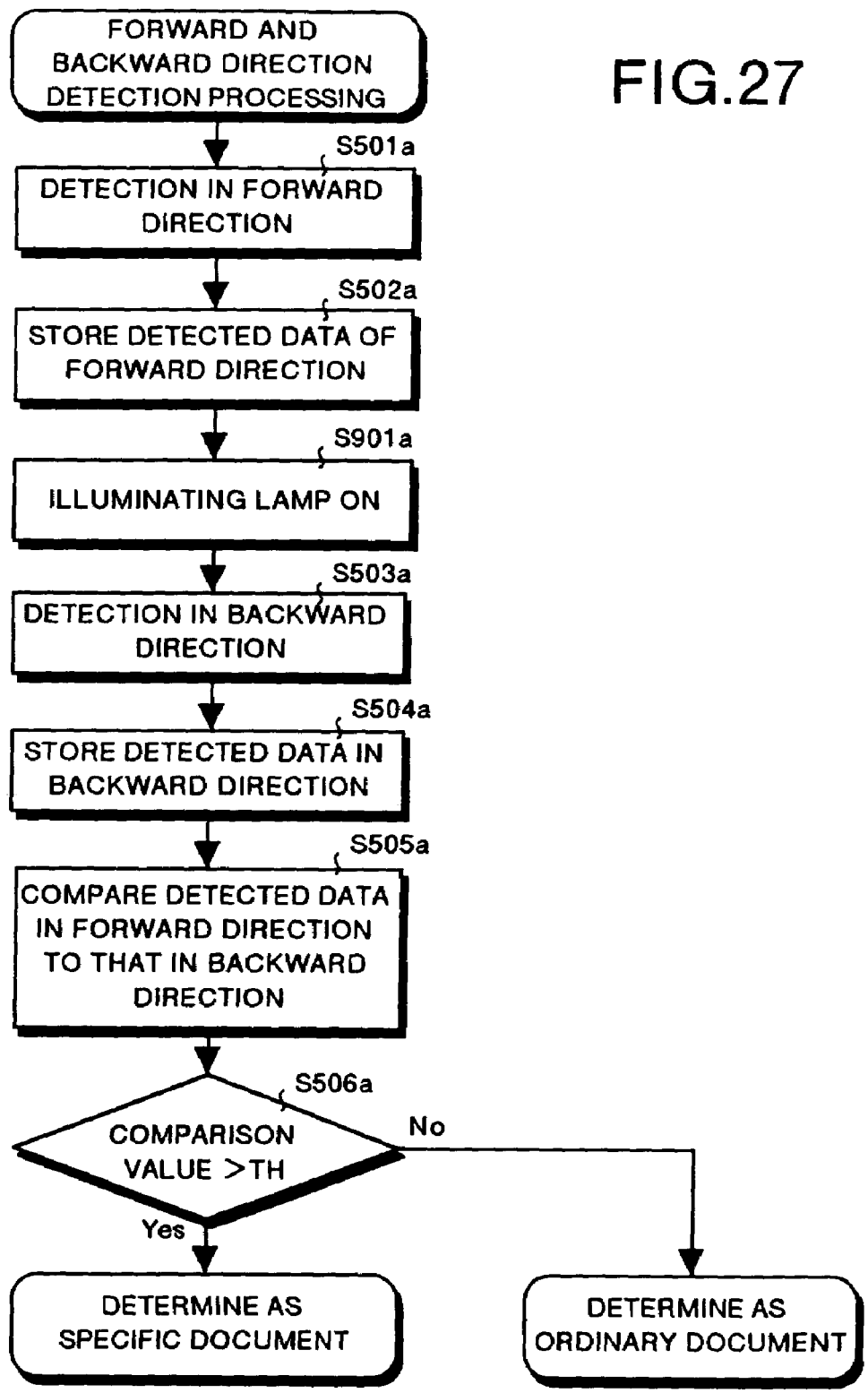
FIG. 27 is a flowchart showing a sequence of determining a specific document by a specific document determining apparatus according to Embodiment 17.

Next description is made for processing of determining a specific document by the specific document determining apparatus according to Embodiment 17. FIG. 27 is a flowchart showing a sequence of processing for determining a specific document in the specific document determining apparatus according to Embodiment 17. It should be noted that, in the sequence of determining a specific document shown in FIG. 27, processing from step S501a to step S506a is the same as that in FIG. 23 described in Embodiment 13, so that only different points therefrom are explained hereinafter.

The prescan is generally executed by lighting up the exposure illuminating unit 203 in the forward direction when the first scanner 205 reciprocates over a document placed on the contact glass 201. Accordingly, in the backward direction for prescan, the first scanner 205 is moved with the exposure illuminating unit 203 turned OFF. However, when determining a specific document by using detection signals obtained in both the forward direction and the backward direction for prescan, with the above condition, the exposure illuminating unit 203 is lit up in the forward direction for prescan but it is turned off in the backward direction for prescan, which does resultantly differentiate a detection signal obtained in the forward direction for prescan from that obtained in the backward direction for prescan because of influences of the temperature difference due to illumination or the like.

For this reason, in the specific document determining apparatus according to Embodiment 17, after the signal processing section 162 makes the signal storing section 170 store therein a detection signal obtained in the forward direction for prescan in step S502a, the controller 180 lights up the exposure illuminating unit 203 also in the backward direction for prescan (S901a), so that the processing for determining a specific document is executed with the exposure illuminating unit 203 lit up in the backward direction like in the forward direction for prescan.

As described above, with the specific document determining method and the specific document determining apparatus according to Embodiment 17, the exposure illuminating unit 203 is designed to be lit up also in the backward direction when the first scanner 205 reciprocates for prescan over a document placed on the contact glass 201, so that influence of the temperature difference or the like generated in detection signals between a case with illumination and a case without illumination can be removed from the signals, which allows accuracy in determination of a specific document to be improved.

It should be noted that, in Embodiment 17, the exposure illuminating unit 203 is designed to be lit up when the processing for determining a specific document is executed, but, conversely, the processing for determining a specific document may be executed with the exposure illuminating unit 203 being turned off. Description has been made only for the exposure illuminating unit 203 in Embodiment 17, but it is desirable to previously decide whether the condensation preventing heater 218 or the like should be turned ON or OFF when the processing for determining a specific document is executed.

In a specific document determining method and a specific document determining apparatus (an image reading apparatus) according to Embodiment 18, the first scanner 205 executes the processing for detecting metallic fiber in both the forward direction and the backward direction when reciprocating for prescan over a document placed on the contact glass 201 to make determination as to whether the document is a specific document such as bills or marketable securities with metallic fiber included therein or not by subjecting the detection signals in the forward and the backward directions each obtained by the detection processing to averaging processing, and further, the exposure illuminating unit 203 is lit up also in the backward direction for prescan like in the forward direction to execute the processing for determining a specific document under the same conditions. It should be noted that the specific document determining apparatus according to Embodiment 18 has the same construction as that of the specific document determining apparatus described in Embodiment 1, so that description thereof is omitted herein.

Figure 28:
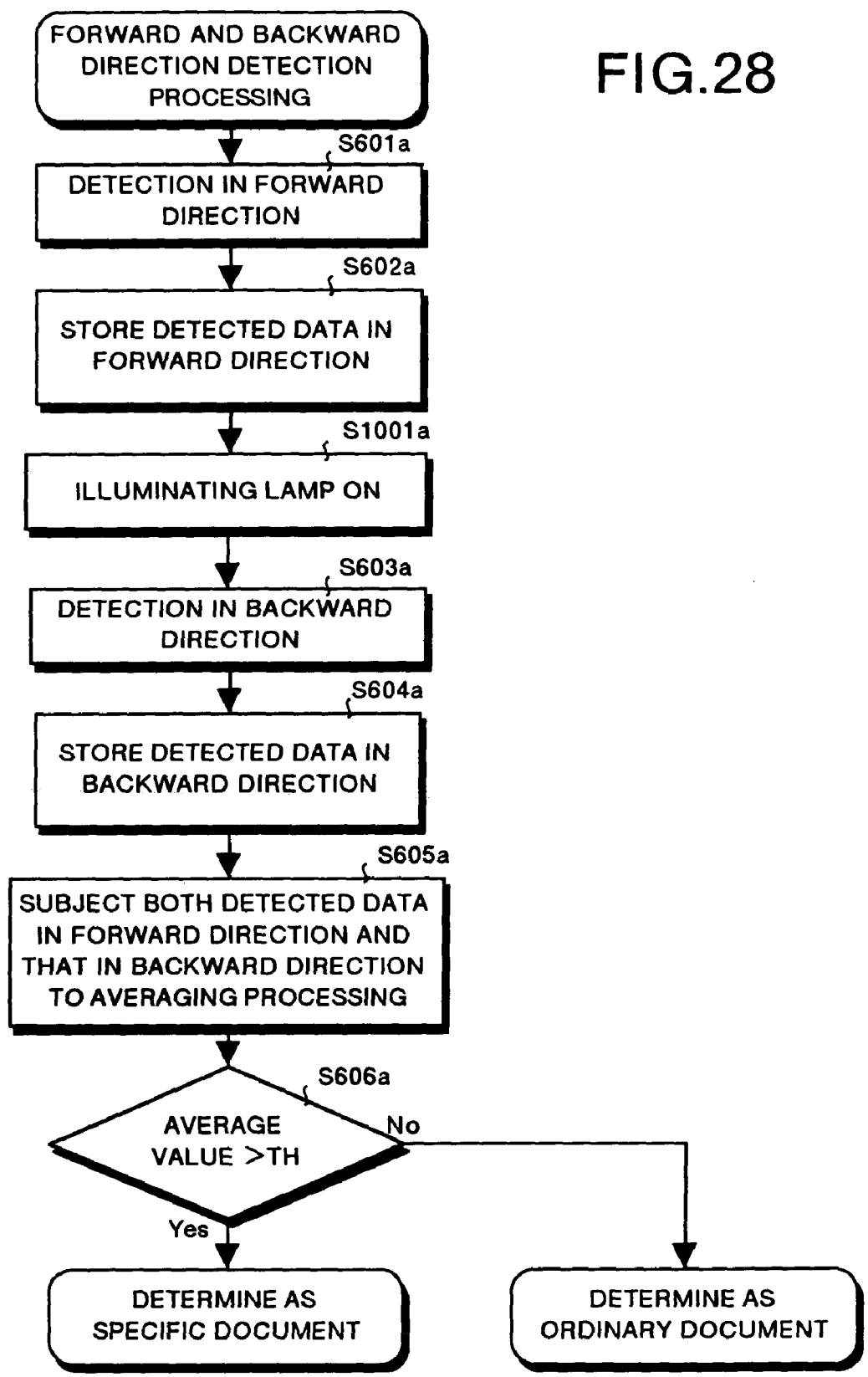
FIG. 28 is a flowchart showing a sequence of determining a specific document by a specific document determining apparatus according to Embodiment 18.

Next description is made for processing of determining a specific document by the specific document determining apparatus according to Embodiment 18. FIG. 28 is a flowchart showing a sequence of processing for determining a specific document in the specific document determining apparatus according to Embodiment 18. It should be noted that, in the sequence of determining a specific document shown in FIG. 28, processing from step S601a to step S606a is the same as that in FIG. 24 described in Embodiment 14, so that only different points therefrom are explained hereinafter.

The prescan is generally executed by lighting up the exposure illuminating unit 203 in the forward direction when the first scanner 205 reciprocates over a document placed on the contact glass 201. Accordingly, in the backward direction for prescan, the first scanner 205 is moved with the exposure illuminating unit 203 turned OFF. However, when determining a specific document by using detection signals obtained in both the forward direction and the backward direction for prescan, with the above condition, the exposure illuminating unit 203 is lit up in the forward direction for prescan but it is turned off in the backward direction for prescan, which does resultantly differentiate a detection signal obtained in the forward direction for prescan from that obtained in the backward direction for prescan because of influences of the temperature difference due to illumination or the like.

For this reason, in the specific document determining apparatus according to Embodiment 18, after the signal processing section 162 makes the signal storing section 170 store therein a detection signal obtained in the forward direction for prescan in step S602a, the controller 180 lights up the exposure illuminating unit 203 also in the backward direction for prescan (S1001a), so that the processing for determining a specific document is executed with the exposure illuminating unit 203 lit up in the backward direction like in the forward direction for prescan.

As described above, with the specific document determining method and the specific document determining apparatus according to Embodiment 18, the exposure illuminating unit 203 is designed to be lit up also in the backward direction when the first scanner 205 reciprocates for prescan over a document placed on the contact glass 201, so that influence of the temperature difference or the like generated in detection signals between a case with illumination and a case without illumination can be removed from the signals, which allows accuracy in determination of a specific document to be improved.

It should be noted that, in Embodiment 18, the exposure illuminating unit 203 is designed to be lit up when the processing for determining a specific document is executed, but, conversely, the processing for determining a specific document may be executed with the exposure illuminating unit 203 being turned off. Description has been made only for the exposure illuminating unit 203 in Embodiment 18, but it is desirable to previously decide whether the condensation preventing heater 218 or the like should be turned ON or OFF when the processing for determining a specific document is executed.

A specific document determining method and a specific document determining apparatus according to Embodiment 19 comprise steps of making the first scanner 205 execute reciprocating movements several times in a state where a copying operation is suspended, and executing the processing for detecting metallic fiber in the forward direction (and/or backward direction) for scanning of the reciprocating movements to make determination as to whether the document is a specific document such as bills or marketable securities with metallic fiber included therein or not by making total determination thereof using several detection signals obtained in the processing for detection for several times. It should be noted that the specific document determining apparatus according to Embodiment 19 has the same construction as that of the specific document determining apparatus described in Embodiment 1, so that description thereof is omitted herein.

Figure 29:
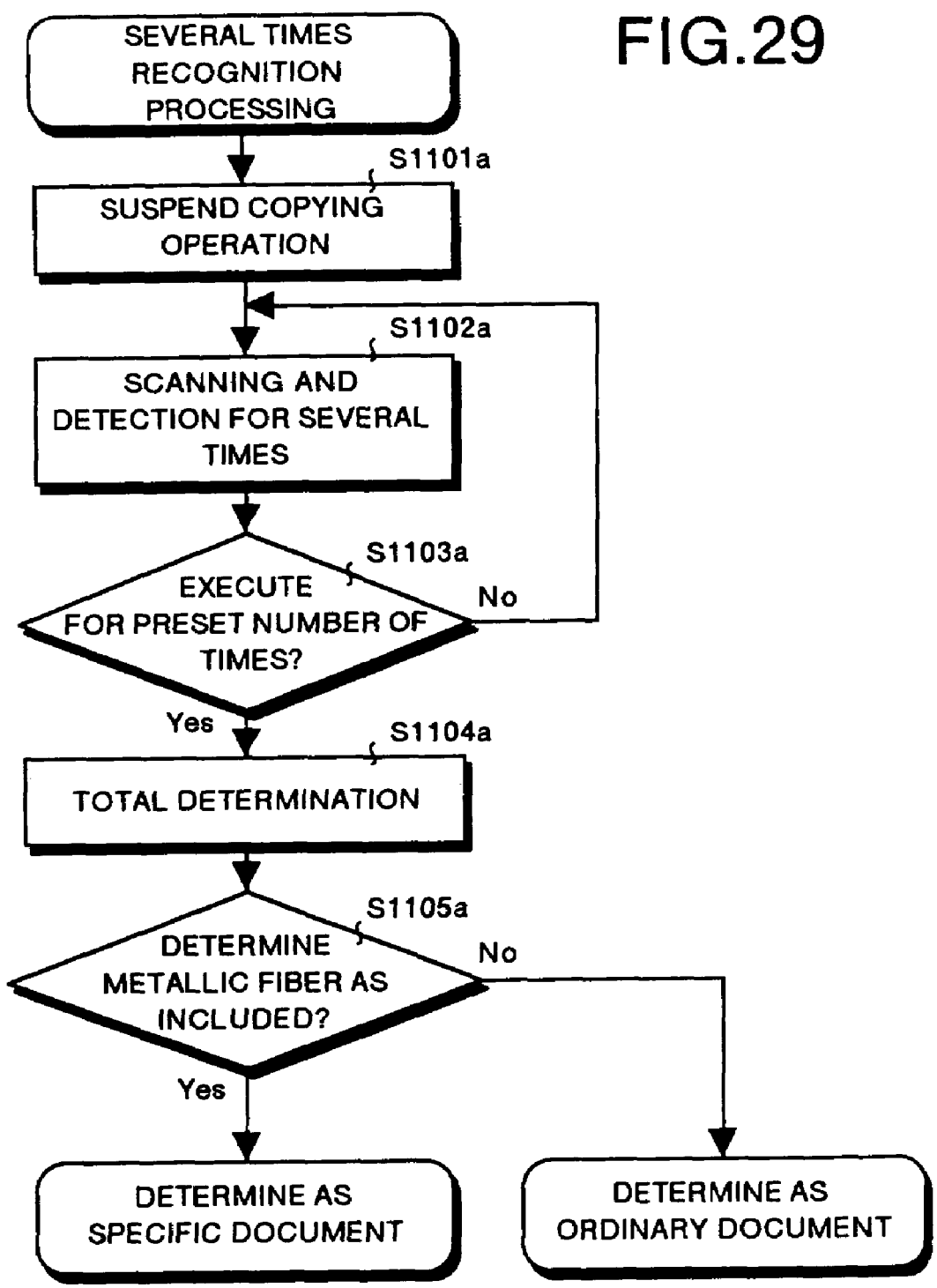
FIG. 29 is a flowchart showing a sequence of determining a specific document by a specific document determining apparatus according to Embodiment 19.

Next description is made for processing of determining a specific document by the specific document determining apparatus according to Embodiment 19. FIG. 29 is a flowchart showing a sequence of processing for determining a specific document in the specific document determining apparatus according to Embodiment 19.

The processing for determining a specific document is executed before the document is read out. At first the controller 180 makes the scanner unit 110 suspend a copying operation (S1101*a*).

Then, the controller 180 provides control to the first scanner 205 to reciprocate over the document, and in the forward direction for scanning, the microwave sensor 161 provided in the first scanner 205 irradiates a microwave to and scans the document, detects a reflected portion of the irradiated microwave, and outputs a detection signal for the portion obtained in the forward direction for scanning corresponding to a level of the reflected wave to the signal processing section 162 (S1102*a*). The processing is executed for a preset number of times, and several detection signals are outputted from the microwave sensor 161 to the signal processing section 162 (S1103*a*). It should be noted that the processing for detecting metallic fiber is executed by the microwave sensor 161 in the forward direction for scanning herein, but the processing may be executed only in the backward direction or in both the forward and backward directions for scanning.

The signal processing section 162 receives the several detection signals outputted from the microwave sensor 161 and executes the processing for total determination to the received several detection signals (S1104*a*). Then, the signal processing section 162 makes determination as to whether metallic fiber is included in the document or not by using a result of total determination (S1105*a*). It should be noted that the averaging processing described in Embodiment 14 may be subjected to the signals as the processing for total determination executed in step S1104*a* and step S1105*a*.

In step S1105*a*, when it is determined that metallic fiber is included in the document, a result of determination is reported to the controller 180, and the controller 180 determines that the document is a specific document such as bills or marketable securities with metallic fiber included therein. On the other hand, when it is determined that the metallic fiber is not included in the document, a result of determination is reported to the controller 180 and the controller 180 determines that the document is not a specific document but an ordinary document.

As described above, with the specific document determining method and the specific document determining apparatus according to Embodiment 19, the microwave sensor 161 executes the detecting operation several times to make total determination of the document by using several detection signals, so that accuracy in determination of a specific document can be improved. Further, the microwave sensor 161 executes the detecting operation several times, so that it is possible to remove a sporadic noise and influences generated when metallic fiber rises in temperature due to radiation heat from a lamp or the like on a reflected wave from the signals.

It should be noted that, in the specific document determining apparatus according to Embodiment 19, the signal processing section 162 makes determination as to whether metallic fiber is included in the document or not by using detection signals from the microwave sensor 161 and the controller 180 makes determination as to whether the document is a specific document or not according to a result of determination in the signal processing section 162, but all of the processing for determination may be performed by the signal processing section 162.

A specific document determining method and a specific document determining apparatus according to Embodiment 20 comprises steps of executing the processing for detecting metallic fiber in the forward direction when the first scanner 205 reciprocates over a document plated on the contact glass 201 for prescan to make determination as to whether metallic fiber is included in the document or not by using the detection signal obtained in the processing for detection, making the first scanner 205 perform reciprocating movements over the document several times in a state where a copying operation is suspended when it is determined that metallic fiber is included in the document, and executing the processing for detecting metallic fiber in the forward direction (and/or backward direction) for scanning of the reciprocating movements to make determination as to whether the document is a specific document or not by making total determination of the several detection signals obtained in the processing for detection several times. It should be noted that the specific document determining apparatus according to Embodiment 20 has the same construction as that of the specific document determining apparatus described in Embodiment 1, so that description thereof is omitted herein.

Figure 30:
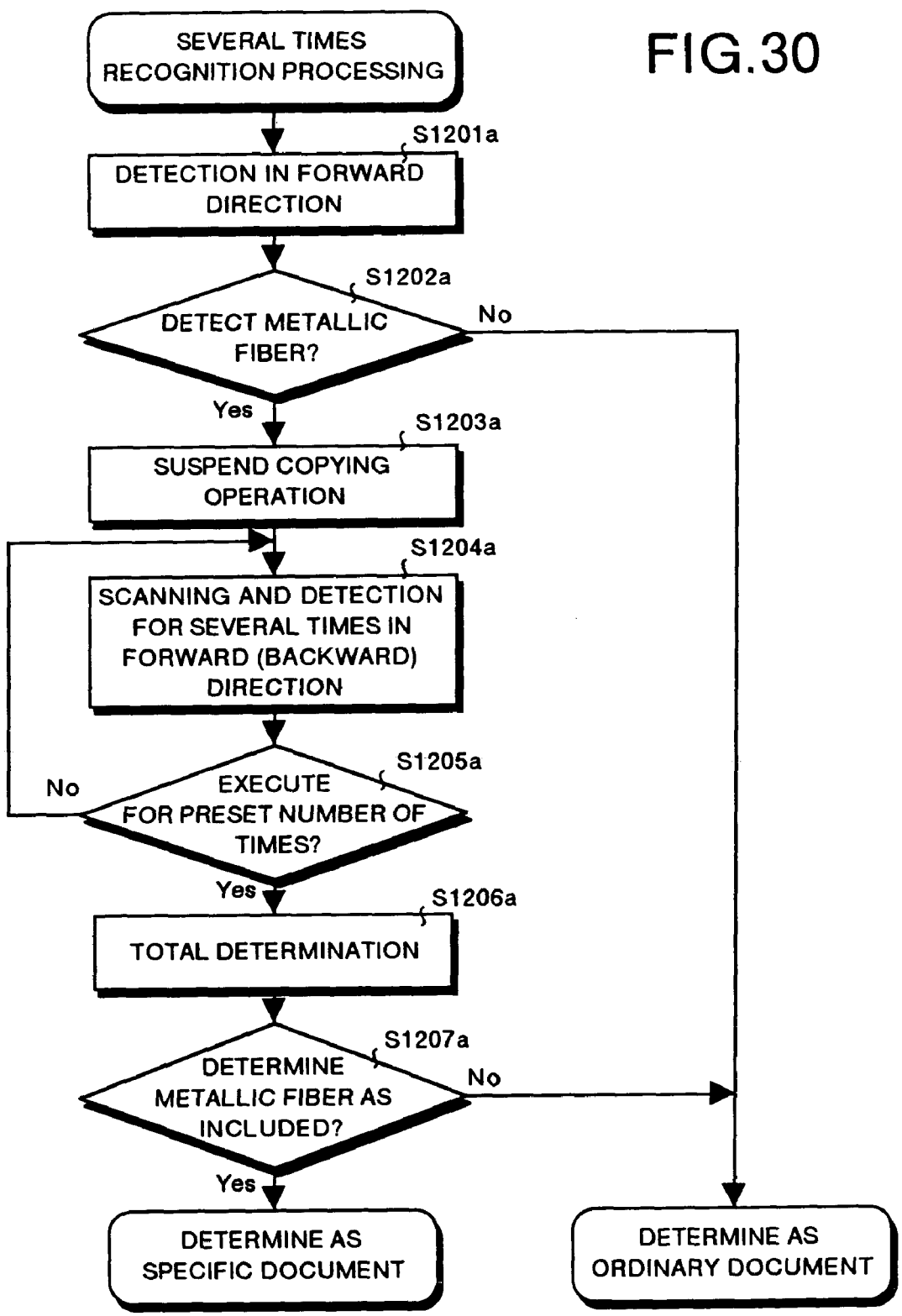
FIG. 30 is a flowchart showing a sequence of determining a specific document by a specific document determining apparatus according to Embodiment 20.

Next description is made for processing of determining a specific document by the specific document determining apparatus according to Embodiment 20. FIG. 30 is a flowchart showing a sequence of processing for determining a specific document in the specific document determining apparatus according to Embodiment 20.

The processing for determining a specific document is, at first, executed simultaneously when prescan is executed. In the forward direction (or backward direction) when the first scanner 205 reciprocates over the document placed on the contact glass 201 for prescan, the microwave sensor 161 provided in the first scanner 205 irradiates a microwave to and scans the document, detects a reflected portion of the irradiated microwave, and outputs a detection signal for the portion obtained in the forward direction for prescan corresponding to a level of the reflected wave to the signal processing section 162 (S1201*a*).

The signal processing section 162 receives the detection signal obtained in the forward direction for prescan to make determination as to whether metallic fiber is included in the document or not by using the received detection signal obtained in the forward direction for prescan (S1202*a*). When it is determined in step S1202*a* that metallic fiber is not included in the document, a result of determination is reported to the controller 180, and the controller 180 determines that the document is not a specific document such as bills or marketable securities with metallic fiber included therein but an ordinary document.

On the other hand, when it is determined in step S1202*a* that metallic fiber is included in the document, a result of determination is reported to the controller 180. Then the controller 180 makes the scanner unit 110 suspend the copying operation (S1203*a*).

Then, the controller 180 provides control to the first scanner 205 to reciprocate over the document, and in the forward direction for scanning, the microwave sensor 161 irradiates a microwave to and scans the document, detects a reflected portion of the irradiated microwave, and outputs a detection signal for the portion obtained in the forward direction for scanning corresponding to a level of the reflected wave to the signal processing section 162 (S1204*a*). Then, the processing is executed for a preset number of times, and several detection signals are outputted from the microwave sensor 161 to the signal processing section 162 (S1205*a*). It should be noted that the processing for detection is executed by the microwave sensor 161 in the forward direction for prescan herein, but the processing may be executed only in the backward direction or in both the forward and backward directions for prescan.

The signal processing section 162 receives the several detection signals outputted from the microwave sensor 161 and executes the processing for total determination to the received several detection signals (S1206*a*). Then, the signal processing section 162 makes determination as to whether metallic fiber is included in the document or not by using a result of total determination (S1207*a*). It should be noted that the averaging processing described in Embodiment 14 may be subjected to the signals as the processing for total determination executed In step S1104*a* and step S1105*a*.

In step S1207*a*, when it is determined that metallic fiber is included in the document, a result of determination is reported to the controller 180, and the controller 180 determines that the document is a specific document such as bills or marketable securities with metallic fiber included therein. On the other hand, when it is determined that the metallic fiber is not included in the document, a result of determination is reported to the controller 180 and the controller 180 determines that the document is not a specific document but an ordinary document.

As described above, with the specific document determining method and the specific document determining apparatus according to Embodiment 20, when it is determined in one processing for determining a specific document that the document is a specific document, the microwave sensor 161 executes the detecting operation several times to make total determination of the document by using several detection signals, so that accuracy in determination of a specific document can be improved. Also, when it is determined in one processing for determining a specific document that the document is not a specific document, the processing thereafter is not executed, so that it is possible to simplify controlling and to execute high-speed processing of determination. Further, the microwave sensor 161 executes the operation of detection several times, so that it is possible to remove a sporadic noise and influences generated when metallic fiber rises in temperature due to radiation heat from a lamp or the like on a reflected wave from the signals.

It should be noted that, in the specific document determining apparatus according to Embodiment 20, the signal processing section 162 makes determination as to whether metallic fiber is included in the document or not by using detection signals from the microwave sensor 161 and the controller 180 makes determination as to whether the document is a specific document or not according to a result of determination in the signal processing section 162, but all of the processing for determination may be performed by the signal processing section 162. Also, a timing of processing for determining a specific document is set to the time of prescan in Embodiment 20, but the timing is not restricted to the above timing.

Each of the methods of determining a specific document described in Embodiments 11 to 20 can be programmed to enable storage thereof in a computer-readable recording medium such as a floppy disk, a hard disk, a CD-ROM, and DVD.

As described above, with the specific document determining method according to the present invention, the method comprises a first step of irradiating a microwave to the document in both the forward and backward directions for scanning, detecting a reflected portion thereof, and outputting a detection signal when irradiating a microwave to and scanning the document and detecting a reflected portion of the irradiated microwave; a second step of making determination as to whether metallic fiber is included in the document or not by using detection signals for reflected waves in both the forward and backward directions for scanning detected in the first step; and a third step for making determination, according to a result of determination in the second step, as to whether the document is the specific document or not, so that interference elements such as each direction of irradiation and reflection of a microwave, temperature, signals, and external noises can be removed from detection signals, which allows processing for determination of a specific document with high accuracy to be executed.

With the specific document determining method according to the present invention, the method comprises a first step of executing the scanning and detection of a reflected wave several times and outputting detection signals for reflected waves detected several times when irradiating a microwave to and scanning the document and detecting a reflected portion of the irradiated microwave; a second step of making determination as to whether metallic fiber is included in the document or not by using detection signals for reflected waves detected several times in the first step; and a third step of making determination as to whether the document is the specific document or not according to a result of determination in the second step, so that interference elements such as each direction of irradiation and reflection of a microwave, temperature, signals, and external noises can be removed from detection signals, which allows processing for determination of a specific document with high accuracy to be executed.

With the specific document determining method according to the present invention, the method comprises a first step of irradiating a microwave to and scanning the document, detecting a reflected portion of the irradiated microwave, and outputting a detected signal; a second step of making determination as to whether metallic fiber is included in the document or not by using a detection signal for the reflected wave detected in the first step; and a third step of determining that the document is not the specific document when it is determined in the second step that metallic fiber is not included in the document; a fourth step of executing the scanning and detection of the reflected wave several times and outputting detection signals for reflected waves detected several times when it is determined in the second step that metallic fiber is included in the document; a fifth step of making determination as to whether metallic fiber is included in the document or not by using the detection signals for the reflected waves detected several times in the fourth step; and a sixth step of making determination as to whether the document is the specific document or not according to a result of determination in the fifth step, so that interference elements such as each direction of irradiation and reflection of a microwave, temperature, signals, and external noises can be removed from detection signals, which allows processing for determination of a specific document with high accuracy to be executed.

With the specific document determining method according to the present invention, when determining whether metallic fiber is included in the document or not, a difference signal for detection signals for reflected waves in the forward and backward directions for scanning is obtained, and determination is made as to whether metallic fiber is included in the document or not by comparing the difference signal to a prespecified threshold value, so that interference elements such as each direction of irradiation and reflection of a microwave, temperature, signals, and external noises can be removed from detection signals, which allows processing for determination of a specific document with high accuracy to be executed.

With the specific document determining method according to the present invention, when making determination as to whether metallic fiber is included in the document or not, an average value signal is obtained by averaging detection signals for reflected waves detected several times and determination is made as to whether metallic fiber is included in the document or not by comparing the average value signal to a prespecified threshold value, so that interference elements such as each direction of irradiation and reflection of a microwave, temperature, signals, and external noises can be removed from detection signals, which allows processing for determination of a specific document with high accuracy to be executed.

With the specific document determining method according to the present invention, the method comprises a first step of irradiating a microwave to the document in the forward direction for scanning, detecting the reflected wave, and outputting a detection signal when irradiating a microwave to and scanning the document and detecting a reflection portion of the irradiated microwave; a second step of making determination as to whether metallic fiber is included in the document or not by using the detection signal for the reflected wave detected in the forward direction for scanning detected in the first step; a third step of determining that the document is the specific document when it is determined in the second step that metallic fiber is included in the document; a fourth step of irradiating a microwave to the document in the backward direction for scanning, detecting the reflected wave, and outputting a detection signal when it is determined in the second step that metallic fiber is not included in the document; a fifth step of making determination as to whether metallic fiber is included in the document or not by using a detection signal for the reflected wave in the backward direction for scanning detected in the fourth step; and a sixth step of making determination as to whether the document is the specific document or not according to a result of determination in the fifth step, so that an interference element due to influence of each direction of irradiation and reflection of a microwave can be removed from detection signals, which allows processing for determination of a specific document with high accuracy to be executed.

With the specific document determining method according to the present invention, the method comprises a first step of irradiating a microwave to the document in the forward direction for scanning, detecting the reflected wave, and outputting a detection signal when irradiating a microwave to and scanning the document and detecting a reflected portion of the irradiated microwave; a second step of making determination as to whether metallic fiber is included in the document or not by using the detection signal for the reflected wave in the forward direction for scanning detected in the first step; a third step of determining that the document is not the specific document when it is determined in the second step that metallic fiber is not included in the document; a fourth step of irradiating a microwave for the document in the forward direction for scanning, detecting the reflected wave, and outputting a detection signal when it is determined in the second step that metallic fiber is included in the document; a fifth step for making determination as to whether metallic fiber is included in the document or not by using the detection signal for the reflected wave in the backward direction for scanning detected in the fourth step; and a sixth step of making determination as to whether the document is the specific document or not according to a result of determination in the fifth step, so that interference elements due to influence of each direction of irradiation and reflection of a microwave can be removed from detection signals, which allows processing for determination of a specific document with high accuracy to be executed.

With the specific document determining method according to the present invention, a light for illumination is always lit under the same conditions upon execution of scanning and detection of a reflected wave when irradiating a microwave to and scanning the document and detecting a reflected portion of the irradiated microwave, if a light for illumination is lit for reading the document, so that interference elements due to influence of temperature or the like can be removed from detection signals, which allows processing for determination of a specific document with high accuracy to be executed.

With the specific document determining apparatus according to the present invention, the apparatus comprises a detector for irradiating a microwave to the document in both the forward and backward directions for scanning, detecting the reflected wave, and outputting a detection signal when irradiating a microwave to and scanning the document and detecting a reflected portion of the irradiated microwave; a first determining unit for making determination as to whether metallic fiber is included in the document or not by using detection signals for reflected waves in both the forward and backward directions for scanning detected by the detector; and a second determining unit for making determination as to whether the document is the specific document or not according to a result of determination by the first determining unit, so that interference elements such as each direction of irradiation and reflection of a microwave, temperature, signals, and external noises can be removed from detection signals, which allows processing for determination of a specific document with high accuracy to be executed.

With the specific document determining apparatus according to the present invention, the apparatus comprises a detector for executing the scanning and detection of reflected waves several times and outputting detection signals for reflected waves detected several times when irradiating a microwave to and scanning the document and detecting a reflected portion of the irradiated microwave; a first determining unit for making determination as to whether metallic fiber is included in the document or not by using the detection signals for reflected waves detected several times by the detector; and a second determining unit for making determination as to whether the document is the specific document or not according to a result of determination by the first determining unit, so that interference elements such as each direction of irradiation and reflection of a microwave, temperature, signals, and external noises can be removed from detection signals, which allows processing for determination of a specific document with high accuracy to be executed.

With the specific document determining apparatus according to the present invention, the apparatus comprises a detector for irradiating a microwave to and scanning the document, detecting a reflected portion of the irradiated microwave, and outputting a detection signal; a first determining unit for making determination as to whether metallic fiber is included in the document or not by using a detection signal for the reflected wave detected by the detector; and a second determining unit for determining that the document is not the specific document when it is determined by the first determining unit that metallic fiber is not included in the document, and the detector executes the scanning and detection of reflected waves several times and outputs the detection signals for the reflected waves when it is determined by the first determining unit that metallic fiber is included in the document; the first determining unit makes determination as to whether metallic fiber is included in the document or not by using the detection signals for the reflected waves detected several times by the detector; and the second determining unit makes determination as to whether the document is the specific document or not according to a result of determination by the first determining unit, so that interference elements such as each direction of irradiation and reflection of a microwave, temperature, signals, and external noises can be removed from detection signals, which allows processing for determination of a specific document with high accuracy to be executed.

With the specific document determining apparatus according to the present invention, the first determining unit obtains a difference signal for detection signals for reflected waves detected in both the forward and backward directions for scanning and makes determination as to whether metallic fiber is included in the document or not by comparing the difference signal to a prespecified threshold value when making determination as to whether metallic fiber is included in the document or not, so that interference elements such as each direction of irradiation and reflection of a microwave, temperature, signals, and external noises can be removed from detection signals, which allows processing for determination of a specific document with high accuracy to be executed.

With the specific document determining apparatus according to the present invention, the first determining unit obtains an average value signal by averaging detection signals for reflected waves detected several times and makes determination as to whether metallic fiber is included in the document by comparing the average value signal to a prespecified threshold value when making determination as to whether metallic fiber is included in the document or not, so that interference elements such as each direction of irradiation and reflection of a microwave, temperature, signals, and external noises can be removed from detection signals, which allows processing for determination of a specific document with high accuracy to be executed.

With the specific document determining apparatus according to the present invention, the apparatus comprises a detector for irradiating a microwave to the document in the forward direction for scanning, detecting a reflected portion thereof, and outputting a detection signal when irradiating a microwave to and scanning the document and detecting a reflected portion of the irradiating microwave; a first determining unit for making determination as to whether metallic fiber is included in the document or not by using a detection signal for the reflected wave detected by the detector in the forward direction for scanning; and a second detecting unit for determining that the document is the specified document when it is determined by the first determining unit that metallic fiber is included in the document, and the detector irradiates a microwave to the document in the backward direction for scanning, detects the reflected wave, and outputs a detection signal when it is determined by the first detecting unit that metallic fiber is not included in the document; the first determining unit determines whether metallic fiber is included in the document or not by using a detection signal for the reflected wave detected by the detector in the backward direction for scanning; and the second determining unit makes determination as to whether the document is the specific document or not according to a result of determination by the first determining unit, so that interference elements due to influence of each direction of irradiation and reflection of a microwave can be removed from detection signals, which allows processing for determination of a specific document with high accuracy to be executed.

With the specific document determining apparatus according to the present invention, the apparatus comprises a detector for irradiating a microwave to the document in the forward direction for scanning, detecting a reflected wave thereof, and outputting a detection signal when irradiating a microwave to and scanning the document and detecting a reflected portion of the irradiated microwave; a first detecting means for determining whether metallic fiber is included in the document or not by using a detection signal for the reflected wave detected by the detector in the forward direction for scanning; and a second determining unit for determining that the document is not the specific document when it is determined by the first determining unit that metallic fiber is not included in the document, and when it is determined by the first determining unit that metallic fiber is included in the document, the detector irradiates a microwave to the document in the backward direction for scanning, detects the reflected wave, and outputs a detection signal; the first determining unit makes determination as to whether metallic fiber is included in the document or not by using a detection signal for the reflected wave detected by the detector in the backward direction for scanning; and the second determining unit makes determination as to whether the document is the specific document or not according to a result of determination by the first determining unit, so that interference elements due to influence of each direction of irradiation and reflection of a microwave can be removed from detection signals, which allows processing for determination of a specific document with high accuracy to be executed.

With the image reading apparatus according to the present invention, in the image reading apparatus comprising a reader for optically reading an image of a document; and a specific document determining unit for making determination as to whether the document is a specific document such as bills or marketable securities with metallic fiber included therein or not, the specific document determining unit comprises the specific document determining apparatus, and the detector in the specific document determining apparatus always turns ON or OFF an illumination light for the reader in all scanning and detection of reflected waves when irradiating a microwave to and scanning the document and detecting a reflected portion of the irradiated microwave, so that interference elements due to influence of temperature or the like can be removed from detection signals, which allows processing for determination of a specific document with high accuracy to be executed.

Further, with the computer-readable recording medium according to the present invention, a program for execution of the specific document determining method is stored therein, so that the program itself of the method can appropriately be protected.

Figure 31:
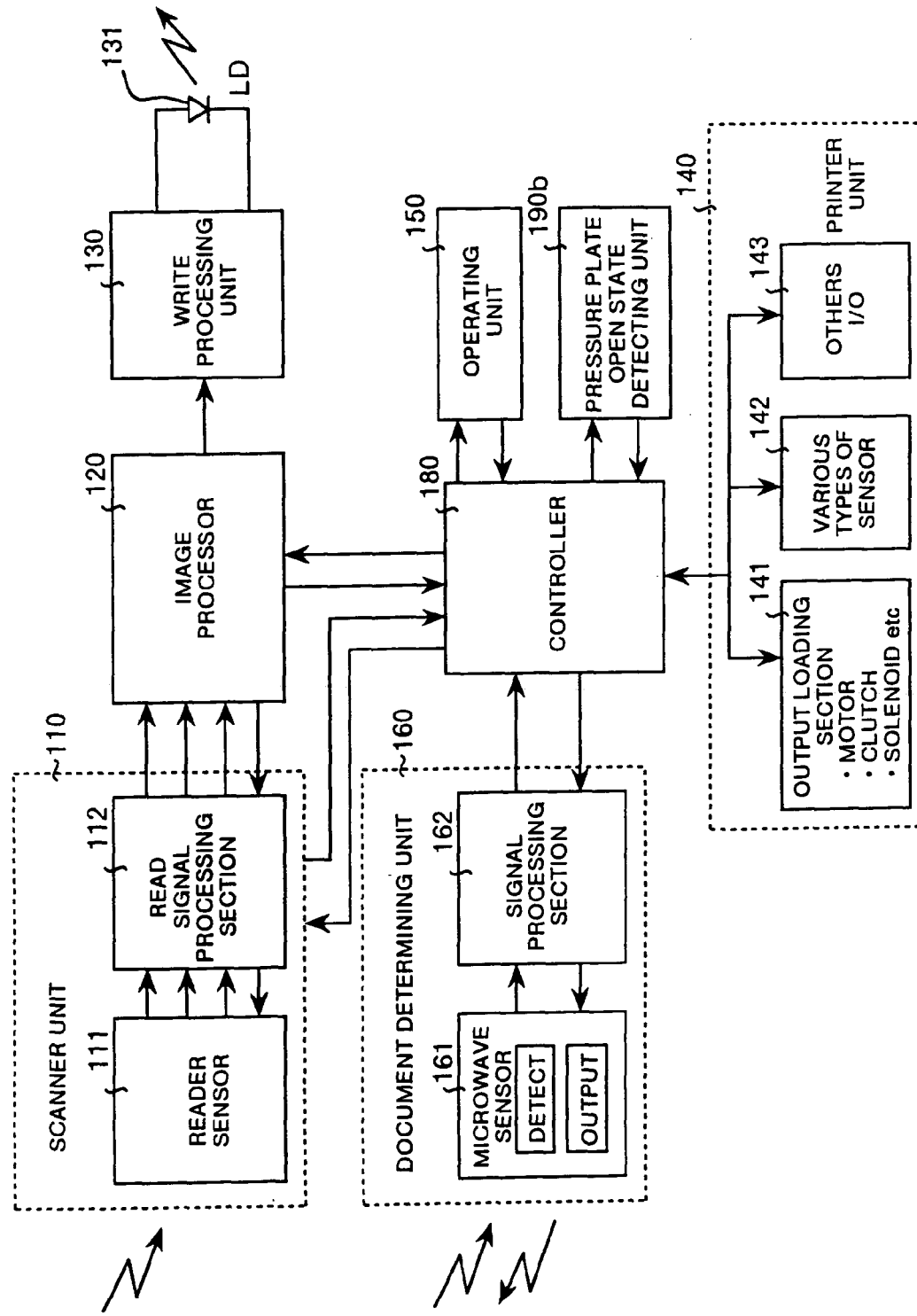
FIG. 31 is a block diagram showing an image reading apparatus having a specific document determining function according to Embodiment 21.

FIG. 31 is a block diagram showing an image reading apparatus having the specific document determining apparatus according to Embodiment 21 of the preset invention. The image reading apparatus having the specific document determining apparatus shown in FIG. 31 comprises a scanner unit 110 for reading RGB color image data from a document; an image processor 120 for receiving the color image data from the scanner unit 110 and subjecting the data to γ-correction, RGB/YMCK conversion, gray-scale processing or the like; a write processing unit 130 for making the laser diode (LD) 131 emit a light to execute the image write processing; a printer unit 140 for recording a color image on recording paper using a light for writing from the LD 131; an operating unit 150 for inputting various types of mode and displaying massages or the like; a document determining unit 160 for making determination as to whether a document is a specific document such as bills and marketable securities with metallic fiber included therein or not by irradiating a microwave to a document and using a reflected portion of the irradiated microwave; a pressure plate open state detecting unit 190b for detecting that the pressure plate pressing a document to a document base has been opened; and a controller 180 for controlling each of the above components.

In FIG. 31, the scanner unit 110 comprises a read sensor 111 such as a CCD sensor for reading color image data, and a read signal processing section 112 for subjecting the color image data as an analog signal outputted from the read sensor 111 to signal processing such as conversion of the data to a digital signal or the like and outputting the signal to the image processor 120.

Figure 32:
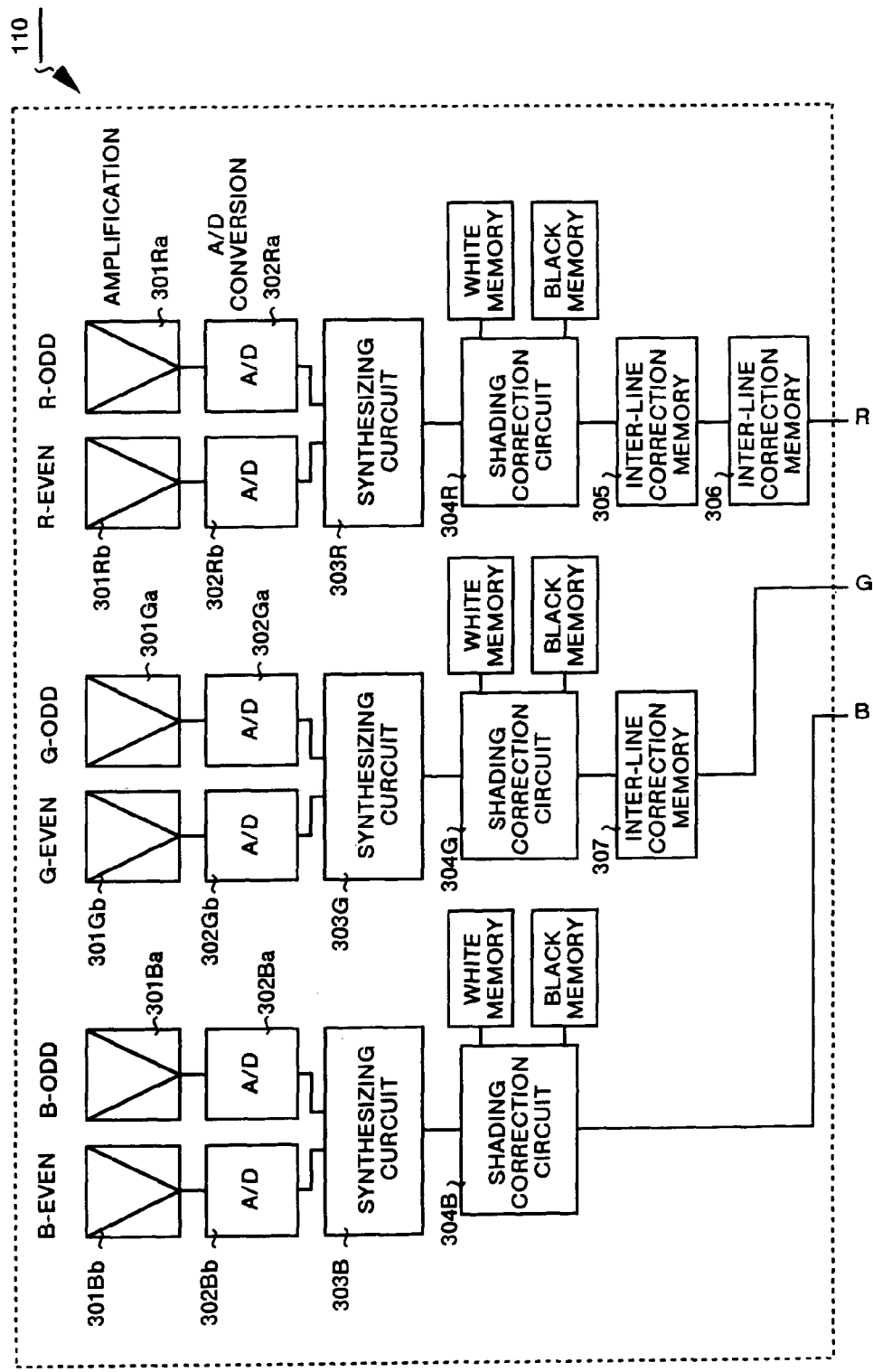
FIG. 32 is a block diagram showing a scanner unit of the image reading apparatus having the specific document determining function shown in FIG. 31.

FIG. 32 is a block diagram showing the scanner unit 110. In FIG. 32, the reference numerals 301Ra, 301Rb, 301Ga, 301Gb, 301Ba and 301Bb indicate amplifiers each for amplifying an even number or an odd number RGB signal (analog signal herein) obtained by reading color data from a document; reference numerals 302Ra, 302Rb, 302Ga, 302Gb, 302Ba, and 302Bb indicate A/D converters each for converting an analog RGB signal for a digital RGB signal; the reference numerals 303R, 303G, and 303B indicate synthesizing circuits each for synthesizing an even number or an odd number RGB signal; the reference numerals 304R, 304G, and 304B indicate shading correction circuit for executing shading correction for RGB signals; and the reference numerals 305, 306, and 307 indicate an inter-line correction memory for adjusting a timing for transferring the RGB signal.

Figure 33:
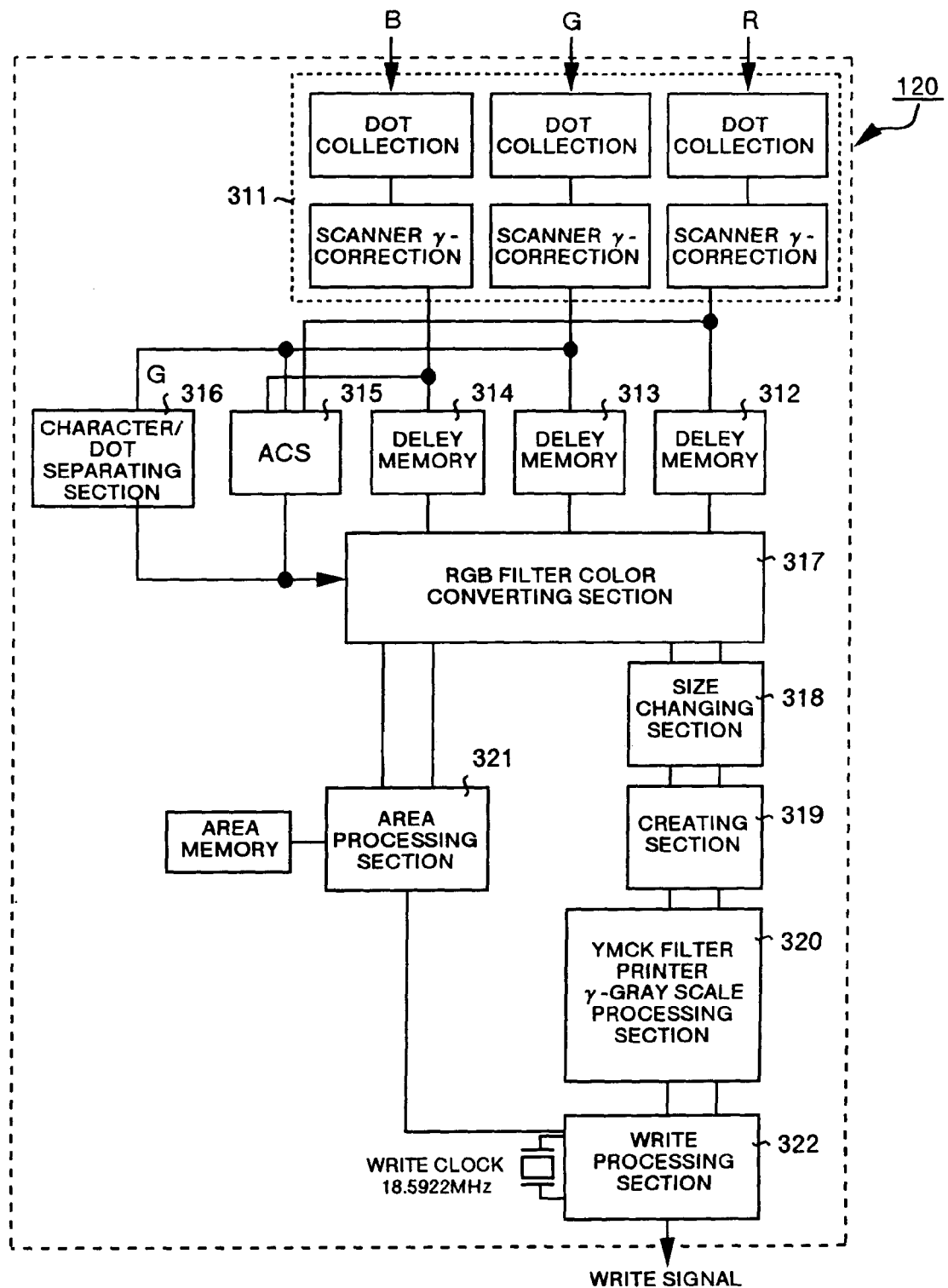
FIG. 33 is a block diagram showing an image processor of the image reading apparatus having the specific document determining function shown in FIG. 31.

FIG. 33 is a block diagram showing the image processor 120. In FIG. 33, designated at the reference numeral 311 is a correction processing section for subjecting received RGB signals to the dot correction or γ-correction, at 312 to 314 delay memories respectively, at 315 an ACS, at 316 a character/dot separating section, at 317 a color converting section for executing color conversion using an RGB filter, at 318 a size changing section, at 319 a creating section, at 320 a gray scale processing section for executing the γ-gray scale processing for a printer with a YMCK filter, at 321 an area processing section, at 322 a write processing section for generating a write signal.

Figure 34:
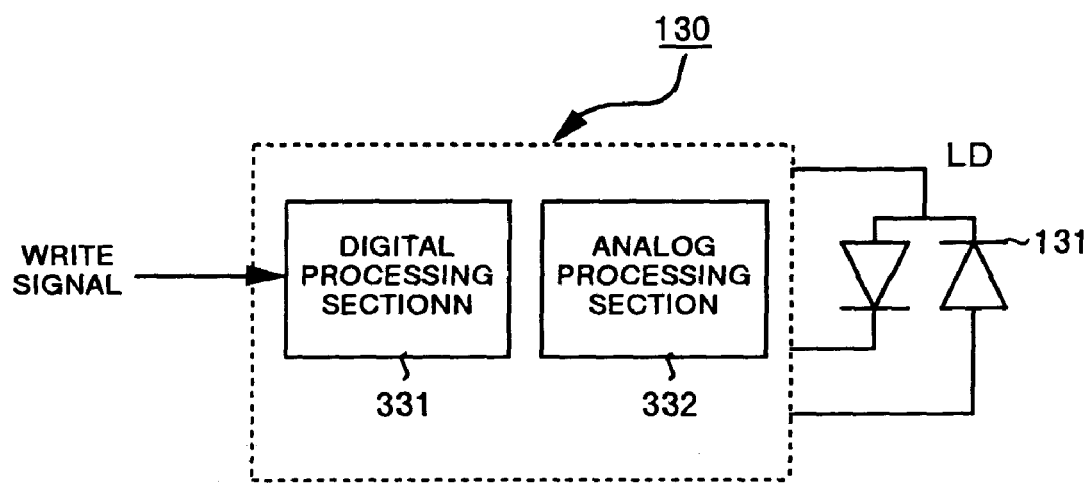
FIG. 34 is a block diagram showing a write processing unit of the image reading apparatus having the specific document determining function shown in FIG. 31.

FIG. 34 is a block diagram showing the write processing unit 130 in the image reading apparatus shown in FIG. 31. In FIG. 34, the reference numeral 331 indicates a digital processing section, and the reference numeral 332 indicates an analog processing section which receives a write signal, subjects the write signal to LD demodulation, and makes the LD 131 emit a light.

The printer unit 140 comprises, as shown in FIG. 31, a an image forming section (not shown) comprising a light-sensing drum, an electrifier, and developing unit, and an output load section 141 including a motor for driving the components as described above, a clutch, and a solenoid, various types of sensors 142 for detecting a surface potential of the light-sensing drum or toner density, and an I/O port 143 for controlling input/output of specified signals.

The document determining unit 160 comprises, as shown in FIG. 31, a microwave sensor 161 for irradiating a microwave to a document, detecting the reflected wave, and outputting a detection signal corresponding to a level of the reflected wave, and a signal processing section 162 for receiving the detection signal outputted from the microwave sensor 161, subjecting the received detection signal to a specified signal processing, and making determination as to whether the document is a specific document such as bills or marketable securities with metallic fiber included therein or not.

Configuration of a document reading system in the image reading apparatus is the same as that shown in FIG. 3, so that description thereof is omitted herein.

Next description is made for operations of the image reading apparatus with the specific document determining function having the configuration as described above in the order of "an operation in the processing for determining a specific document" and "an operation for reading an image".

(Operation in the Processing for Determining a Specific Document)

In the image reading apparatus having the specific document determining function according to Embodiment 21 of the present invention, the processing for determining a specific document is executed when color image data is read from a document. In Embodiment 21, it is assumed that the processing for determining a specific document is carried out when executing a prescan for detecting a size of the document or a toner density thereon. However, the timing for executing the processing for a specific document is not always limited to the time when prescan is executed.

Figure 35:
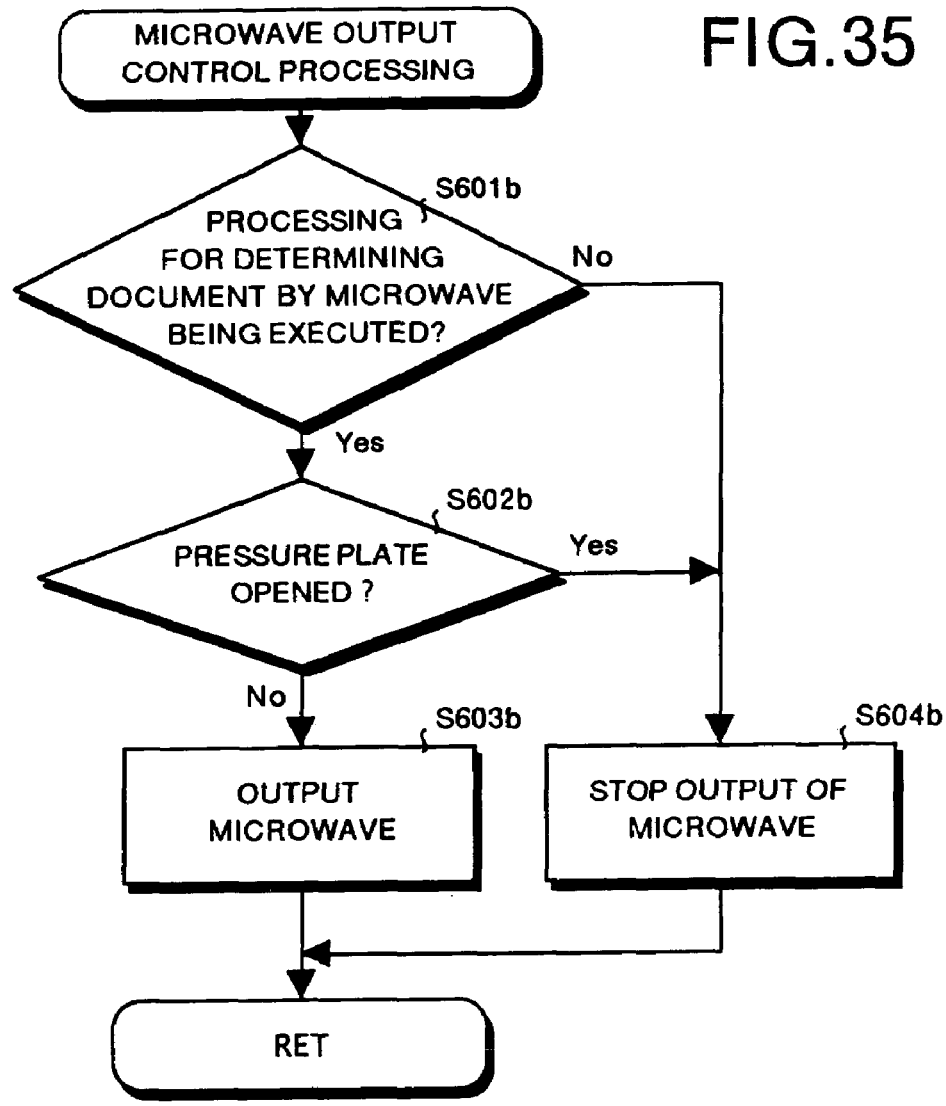
FIG. 35 is a flowchart showing a sequence of controlling an output of a microwave executed for the processing for determining a specific document in the image reading apparatus having the specific document determining function according to Embodiment 21.

FIG. 35 is a flowchart showing a sequence for microwave output control executed in the processing for determining a specific document by the image reading apparatus according to Embodiment 21. When reading of color image data is instructed, prescan is executed, and at the same time the processing for determining a specific document is executed. In this step, the controller 180 reads a subroutine for the microwave output control processing, and makes determination as to whether the processing for determining a specific document is currently being executed or not (S601b).

If it is determined in step S601b that the processing for determining a specific document is not being executed currently, a microwave is not outputted from the microwave sensor 161, and system control goes to the next step (S604b).

On the other hand, if it is determined in step S601b that the processing for determining a specific document is currently being executed, determination is made as to whether the pressure plate 202 has been opened or closed (S602b). Whether the pressure plate 202 has been opened or closed can be checked according to a detection signal outputted from a pressure plate open state detecting unit 190b. Namely the pressure plate open state detecting unit 190b always monitors whether the pressure plate is open or closed, and if it is detected that the pressure plate 202 is opened, the pressure plate open state detecting unit 190b outputs a detection signal indicating that the pressure plate 202 is in the open state to the controller 180. When the controller 180 receives the detection signal, it can determines whether the pressure plate 202 is in the open state or in the closed state.

When it is determined in step S602b that the pressure plate 202 is in the open state, the controller 180 shifts to the next step (S604b) without making the microwave sensor 161 output a microwave. Namely, the controller 180 stops the processing for determining a specific document by the document determining unit 160.

On the other hand, when it is determined in step S602b that the pressure plate 202 is in the closed state, the controller 180 makes the microwave sensor 161 output a microwave (S603b). Namely, the controller 180 makes the document determining unit 160 execute the processing for determining a specific document continuously.

Then the microwave sensor 161 irradiates a microwave to and scans a document to be determined, detects a reflected portion of the irradiated microwave, and outputs a detection signal for the reflected wave. The signal processing section 162 receives a detection signal outputted from the microwave sensor 161, and makes determination as to whether any metallic fiber is included in the document or not by using the received detection signal. When it is determined that metallic fiber is included in the document, a result is reported to the controller 180, and the controller 180 determines that the document is a specific document such as bills or marketable securities with metallic fiber included therein. On the other hand, when it is determined by the signal processing section 162 that metallic fiber is not included in the document, a result is reported to the controller 180, and the controller 180 determines that the document is not a specific document such as bills or marketable securities with metallic fiber included therein, and that the document is an ordinary document.

Even while the microwave sensor 161 is irradiating a microwave to and scanning a document, the controller 180 repeatedly reads a subroutine for the microwave output control processing at a specified timing, and executes the microwave output control processing in steps S601b to step S604b. As a result, when it is determined in step S602b that the pressure plate 202 is in the open state, it stops output of a microwave even during execution of the processing for determining a specific document (S604b). Namely, the controller 180 stops the processing for determining a specific document by the document determining unit 180.

When the processing for determining a specific document is finished, the controllers 180 determines in step S601 that the processing for determining a specific document is not being executed, stops output of a microwave from the microwave sensor 161, and executes, for instance, the processing for reading color image data from the document to be determined.

(Operation for Reading a Document)

After prescan is executed, in other words after the processing for determining a specific document is executed, an operation for reading an image is actually started. To read color image data from a document, the first scanner 205 is moved reciprocally, and a light is irradiated from the exposure illuminating unit 203 in the forward direction for scanning. A reflected light from the document is reflected by the first mirror 204, and is introduced into the second scanner 208. The reflected light introduced into second scanner 208 is reflected by the second mirror 206 and the third mirror 207, and is introduced into the image reading section 213. The reflected light introduced into the image reading section 213 passes through the filter 209 and lens 210, and is introduced into the CCD 212. In the CCD 212, the reflected light is converted to color image data as electric signals, and is inputted into the read signal processing section 112.

The color image data is subjected to specified processing in the read signal processing unit 112 as well as in the image processor 120, and is outputted as a laser beam from the write processing unit 130. The printer unit 140 forms a color image using the laser beam outputted from the write processing unit 130, and transfers the formed color image onto recording paper.

As described above, with the image reading apparatus having the specific document determining function according to Embodiment 21 of the present invention, during the processing for determining a specific document, if it is determined that the pressure plate 202 is in the open state, output of a microwave is stopped, so that it is possible to prevent a human body from being directly exposed to a microwave.

Figure 36:
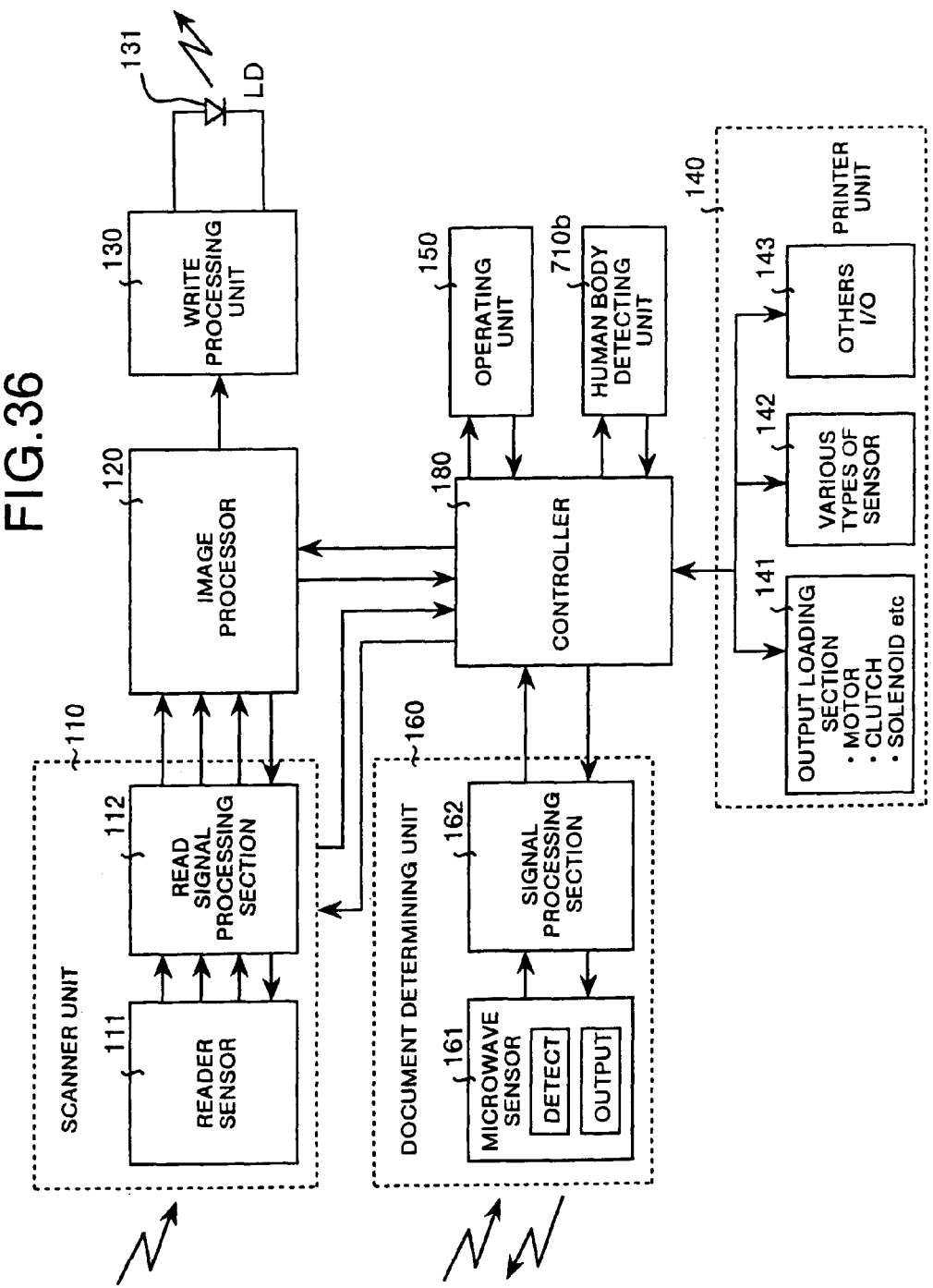
FIG. 36 is a block diagram showing an image reading apparatus having a specific document determining function according to Embodiment 22.

FIG. 36 is a block diagram showing an image reading apparatus having the specific document determining function according to Embodiment 22 of the present invention. It should be noted that, in the image reading apparatus having the specific document determining function shown in FIG. 36, the same reference numerals are assigned to the components as shown in the image reading apparatus having the specific document determining function according to Embodiment 21, and description thereof is omitted herein.

The image reading apparatus having the specific document determining function according to Embodiment 22 has a human body detecting unit 710b for detecting presence of a man near the image reading apparatus in place of the pressure plate open state detecting unit 190b in the image reading apparatus according to Embodiment 21.

Next description is made for operations of the image reading apparatus having the specific document determining function with the configuration as described above. In the image reading apparatus having the specific document determining function according to Embodiment 22, the pressing for determining a specific document is executed when color image data is read from a document. In Embodiment 22, the processing for determining a specific document is executed when prescan is carried out to detect a size of a document or an image density thereon. However, the timing for executing the processing for determining a specific document is not always limited to the time when prescan is executed.

Figure 37:
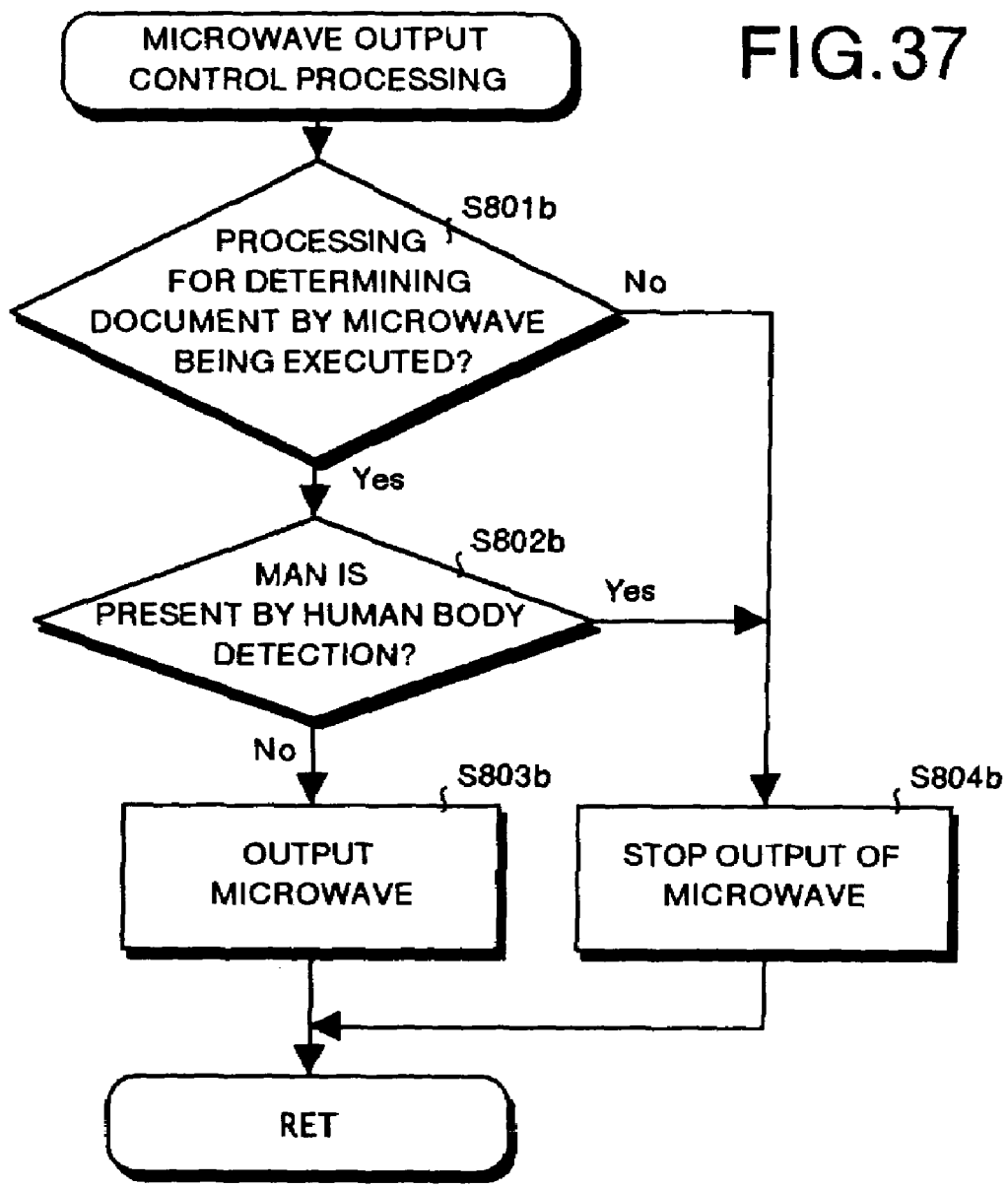
FIG. 37 is a flowchart showing a sequence of controlling an output of a microwave executed for the processing for determining a specific document in the image reading apparatus having the specific document determining function according to Embodiment 22.

FIG. 37 is a flowchart for the microwave output control sequence executed when the processing for determining a specific document is executed by the image reading apparatus according to Embodiment 22. When it is instructed to read color image data, prescan is executed, and at the same time the processing for determining a specific document is executed. In this step, the controller 180 reads out a subroutine for execution of the microwave output control processing, and makes determination as to whether the processing for determining a specific document is currently being executed or not (S810b).

In step S810b, when it is determined that the processing for determining a specific document is not being executed, system control shifts to the next step without making the microwave sensor 161 output a microwave (S804b).

On the other hand, when it is determined in step S801b that the processing for determining a specific document is currently being executed, determination is made as to whether a man is present near the image reading apparatus or not (S802b). Whether a man is present near the image reading apparatus or not can be checked according to a detection signal outputted from the human body detecting unit 710b. Namely, the human body detecting unit 710b always monitors whether a man is present near the image reading apparatus or not, and when a human body is detected, the human body detecting unit 710b outputs a detection signal indicating presence of a human body to the controller 180. When receiving the detection signal, the controller 180 can check whether a man is present near the image reading apparatus or not.

When it is determined in step S802b that a man is present near the image reading apparatus, the controller 180 goes to the next step without making the microwave sensor 161 output a microwave (S804b). Namely, the controller 180 stops the processing for determining a specific document by the document determining unit 160.

On the other hand, when it is determined in step S802*b* that a man is not present near the image reading apparatus, the controller 180 makes the microwave sensor 161 output a microwave (S803*b*). Namely the controller 180 makes the document determining unit 160 execute the processing for determining a specific document continuously.

And, the microwave sensor 161 irradiates a microwave to and scans a document to be determined, detects a reflected portion of the irradiated microwave, and outputs a detection signal for the reflected wave. The signal processing section. 162 receives the detection signal outputted from the microwave sensor 161, and makes determination as to whether metallic fiber is included in the document or not by using the received detection signal. When it is determined that metallic fiber is not included in the document, a result is reported to the controller 180, and the controller 180 determines that the document is a specific document such as bills or marketable securities with metallic fiber included therein. On the other hand, when it is determined by the signal processing section 162 that metallic fiber is not included therein, a result is reported to the controller 180, and the controller 180 determines that the document is not a specific document such as bills or marketable securities, and that the document is an ordinary document.

Even while the microwave sensor 161 is irradiating a microwave to and scanning a document, the controller 180 repeatedly reads out a subroutine for the microwave output control processing at a specified timing, and executes the microwave output control processing in step S801*b* to step S804*b*. As a result, when it is determined in step S802*b* that a man is present near the image reading apparatus, even during execution of the processing for determining a specific document, output of a microwave is stopped (S804*b*). Namely, the controller 180 stops the processing for determining a specific document by the document determining unit 160 during the operation.

When the processing for determining a specific document is finished, the controller 180 determines in step S801*b* that the processing for determining a specific document is not currently being executed, makes the microwave sensor 161 stop output of a microwave, and executes, for instance, the processing for reading color image data from a document to be determined.

As described above, with the image reading apparatus having the specific document determining function according to Embodiment 22 of the present invention, when it is determined that a man is present near the image reading apparatus, it is possible to prevent a microwave from being directly irradiated to a human body.

Figure 38:
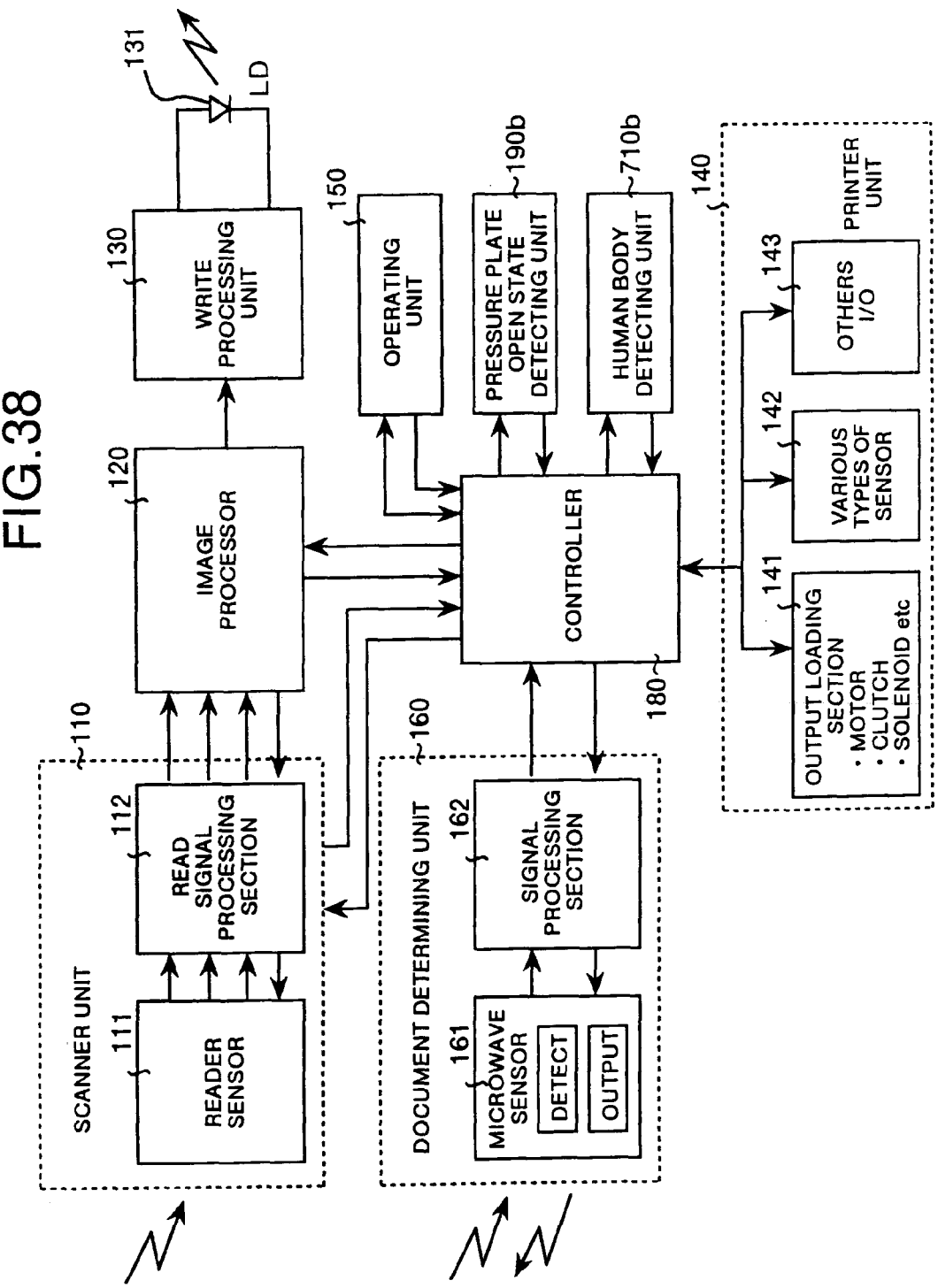
FIG. 38 is a block diagram showing an image reading apparatus having a specific document determining function according to Embodiment 23.

FIG. 38 is a block diagram showing the image reading apparatus having the specific document determining function according to Embodiment 23 of the present invention. It should be noted that, in the image reading apparatus having the specific document determining function shown in FIG. 38, the same reference numerals are assigned to the same components as those in the image reading apparatus having the specific document determining function according to Embodiment 21 as well as in that according to Embodiment 22, and description thereof is omitted herein.

The image reading apparatus having the specific document determining function according to Embodiment 23 comprises a pressure plate open state detecting unit 190*b* for detecting that the pressure plate 202 for pressing a document to a contact glass 201 has been opened, and a human body detecting unit 710*b* for detecting that a man is present near the image reading apparatus.

Next description is made for the image reading apparatus having the specific document determining function with the configuration as described above. In the image reading apparatus having the specific document determining function according to Embodiment 23, the processing for determining a specific document is executed when color image data is read from a document. In Embodiment 23, the processing for determining a specific document is executed when prescan for detecting a size of a document or an image density thereon is executed. However the timing for execution of the processing for determining a specific document is not always limited to the time when prescan is executed.

Figure 39:
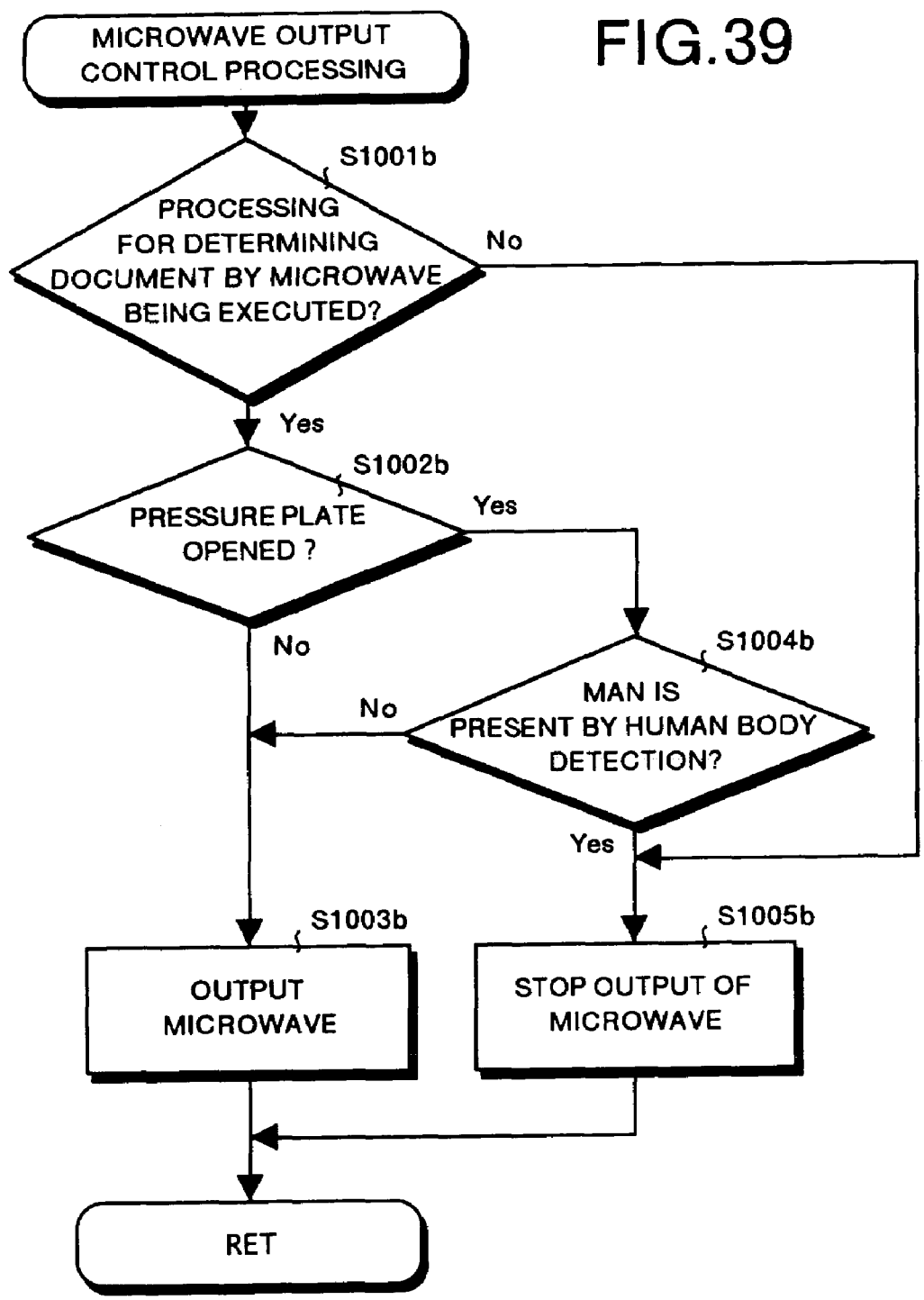
FIG. 39 is a flowchart showing a sequence of controlling an output of a microwave executed for the processing for determining a specific document in the image reading apparatus having the specific document determining function according to Embodiment 23.

FIG. 39 is a flowchart showing the microwave output control sequence executed when the processing for determining a specific document is executed by the image reading apparatus according to Embodiment 23. When it is instructed to read color image data, prescan is executed, and at the same time the processing for determining a specific document is executed. In this step, the controller 180 reads out a subroutine for the microwave output control processing, and makes determination as to whether the processing for determining a specific document is currently being executed or not (S1001*b*).

In step S1001*b*, when it is determined that the processing for determining a specific document is not currently being executed, system control shifts to the next step without making the microwave sensor 161 output a microwave (S1005*b*).

On the other hand, when it is determined that the processing for determining a specific document is currently being executed, determination is made as to whether the pressure plate 202 is open or closed (S1002*b*). Whether the pressure plate 202 is open or closed can be checked according to a detection signal outputted from the pressure plate open state detecting unit 190*b*. Namely, the pressure plate open state detecting unit 190*b* always monitors whether the pressure plate 202 has been opened or closed, and when the pressure plate 202 is opened, the pressure plate open state detecting unit 190*b* outputs a detection signal indicating that the pressure plate 202 has been opened to the controller 180. When the controller 180 receives this detection signal, the controller 180 can determine whether the pressure plate 202 has been opened or not.

When it is determined in step S1002*b* that the pressure plate 202 has been closed, the controller 180 makes the microwave sensor 161 output a microwave (S1003*b*). Namely the controller 180 makes the document determining unit 160 execute the processing for determining a specific document continuously.

On the other hand, when it is determined in step S1002*b* that the pressure plate has been opened, the controller 180 determines whether a man is present near the image reading apparatus or not (S1004*b*). Whether a man is preset near the image reading apparatus or not can be checked according to a detection signal outputted from the human body detecting unit 710*b*. namely the human body detecting unit 710*b* always monitors whether a man is present near the image reading apparatus or not, and when a human body is detected, the human body detecting unit 710*b* outputs a detection signal indicating that a man is present near the image reading apparatus to the controller 180. The controller 180 can determine whether a man is present near the image reading apparatus or not by receiving this detection signal.

When it is determined in step S1004b that a man is present near the image reading apparatus, the controller 180 shifts to the next step without making the microwave sensor 161 output a microwave (S1005b). Namely, the controller 180 stops the processing for determining a specific document by the document determining unit 160.

When it is determined in step 1004b that a man is not present near the image reading apparatus, the controller 180 makes the microwave sensor 161 output a microwave (S1003b). Namely, the controller 180 makes the document determining unit 160 execute the processing for determining a specific document continuously.

And, the microwave sensor 161 irradiates a microwave to and scans a document to be determined, detects a reflected portion of the irradiated microwave, and outputs a detection signal for the reflected wave. The signal processing section 162 receives the detection signal outputted from the microwave sensor 161, and makes determination as to whether metallic fiber is included in the document or not by using the received detection signal. When it is determined that metallic fiber is included in the document, a result is reported to the controller 180, and the controller 180 determines that the document is a specific document such as bills or marketable securities with metallic fiber included therein. On the other hand, when it is determined in the signal processing section 162 that metallic fiber is not included in the document, a result is reported to the controller 180, and the controller 180 determines that the document is not a specific document such as bills or marketable securities with metallic fiber included therein, but an ordinary document.

Even while the microwave sensor 161 is irradiating a microwave to and scanning a document, the controller 180 repeatedly reads out a subroutine for the microwave output control processing at a specified timing, and executes the microwave output control processing in step S1001b to step 1005b. As a result, when it is determined in step S1002b that the pressure plate 202 is open, and at the same time when it is determined in step S1004b that a man is present near the image reading apparatus, even during execution of the processing for determining a specific document, output of a microwave is stopped (S1005b). Namely, the controller 180 stops the processing for determining a specific document by the document determining unit 160.

When the processing for determining a specific document is finished, the controller 180 determines in step S1001b that the processing for determining a specific document is not currently being executed, stops output of a microwave from the microwave sensor 161, and executes, for instance, the processing for reading color image data from the document to be determined.

As described above, with the image reading apparatus having the specific document determining function according to Embodiment 23, when the fact that the pressure plate 202 has been opened is detected and at the same time the fact that a man is present near the image reading apparatus is detected, output of a microwave is stopped, so that a microwave is prevented from being directly irradiated to a human body.

The image reading apparatus having the specific document determining function according to Embodiment 24 of the present invention is different from the image reading apparatus having the specific document determining function according to any of Embodiments 21 to 23 of the present invention in the point that, when irradiation of a microwave is stopped, namely when the processing for determining a specific document is stopped, an operation for reading image data from a document is stopped. It should be noted that configuration of the image reading apparatus having the specific document determining function according to Embodiment 24 is the same as that of the image reading apparatus having the specific document determining function according to any of Embodiments 21 to 23, so that description thereof is omitted herein, and description is made below for operations of the image reading apparatus having the specific document determining apparatus according to Embodiment 21.

In the image reading apparatus having the specific document determining function according to Embodiment 24, the processing for determining a specific document is executed when color image data is read from a document. In Embodiment 24, it is assumed that the processing for determining a specific document is executed when prescan is executed to detect a size of a document or an image density thereof. The timing is, however, not always limited to the time when prescan is executed.

Figure 40:
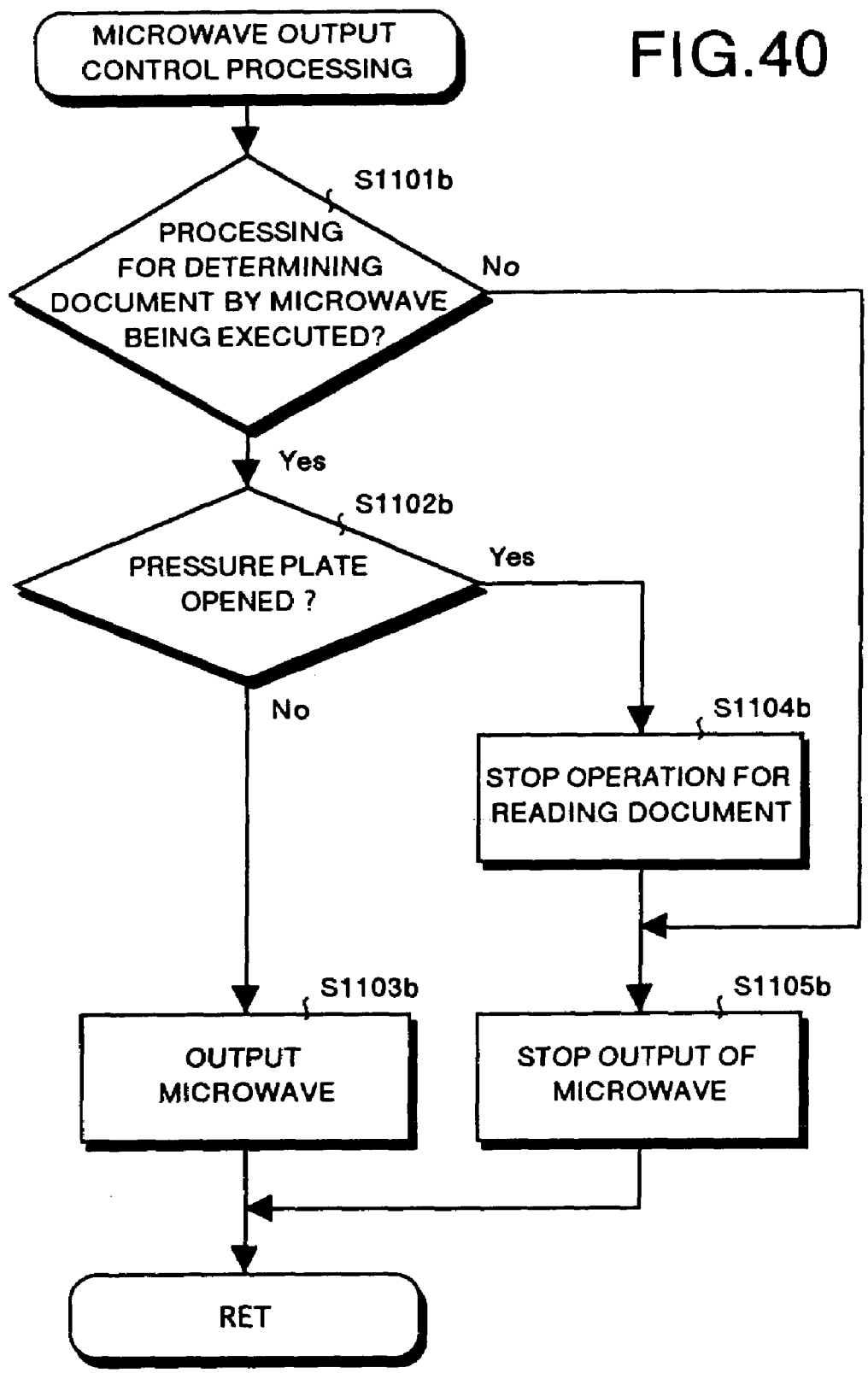
FIG. 40 is a flowchart showing a sequence of controlling an output of a microwave executed for the processing for determining a specific document in an image reading apparatus having a specific document determining function according to Embodiment 24.

FIG. 40 is a flowchart showing the microwave output control sequence executed when the processing for determining a specific document is executed by the image reading apparatus according to Embodiment 24. When it is instructed to read color image data, prescan is executed, and at the same time the processing for determining a specific document is executed. In this step, the controller 180 reads out a subroutine for the processing for microwave output control, and makes determination as to whether the processing for determining a specific document is not being executed or not (S1101b).

When it is determined in step S1101b that the processing for determining a specific document is not being executed currently, system control shifts to the next step without making the microwave sensor 161 output a microwave (S1105b).

When it is determined in step S1101b that the processing for determining a specific document is currently being executed, determination is made as to whether the pressure plate 202 is in the open state or not (S1102b). Whether the pressure plate 202 is in the open state or in the closed state can be checked according to a detection signal outputted from the pressure plate open state detecting unit 190b. Namely, the pressure plate open state detecting unit 190b always monitors whether the pressure plate 202 is opened or closed, and when the pressure plate 202 is opened, the pressure plate open state detecting unit 190b outputs a detection signal indicating that the pressure plate 202 has been opened to the controller 180. When the controller 180 receives the detection signal, the controller can determine whether the pressure plate 202 is open or closed.

When it is determined in step S1102b that the pressure plate 202 is in the open state, the controller 180 stops an operation for reading color image data from a document, after prescan is finished, by the scanner unit 110 (S1104b). After the controller 180 stops an operation for reading color image data, the controller 180 shifts to the next step without making the microwave sensor 161 output a microwave (S1105b). Namely, the controller 180 stops the processing for determining a specific document by the document determining unit 160.

On the other hand, when it is determined in step S1102b that the pressure plate 202 is in the closed state, the controller 180 makes the microwave sensor 161 output a microwave (S1103b). Namely, the controller 180 makes the document determining unit 160 execute the processing for determining a specific document continuously.

Then the microwave sensor 161 irradiates a microwave to and scans a document as an object to be determined, detects a reflected portion of the irradiated microwave, and outputs a detection signal for the detected wave. The signal processing section 162 receives the detection signal outputted from the microwave sensor 161, and makes determination as to whether metallic fiber is included or not in the document by using the received detection signal. When it is determined that metallic fiber is included in the document, a result is reported to the controller 180, and the controller 180 determines that the document is a specific document such as bills or marketable securities with metallic fiber included therein. On the other hand, when it is determined in the signal processing section 162 that metallic fiber is not included therein, a result is reported to the controller 180, and the controller 180 determines that the document is not a specific document such as bills or marketable securities with metallic fiber included therein and that the document is an ordinary document.

Even while the microwave sensor 161 is irradiating a microwave to and scanning a document, the controller 180 repeatedly reads out a subroutine for the microwave output control processing at a prespecified timing, and executes the microwave output control processing in step S1101b to step S1105b. As a result, when it is determined in step S1102b that the pressure plate 202 is in the open state, even when the processing for determining a specific document is being executed, the controller 180 stops the operation for reading color image data from the document (S1104b), and also stops output of a microwave (S1105b). Namely, the controller 180 stops the processing for determining a specific document by the document determining unit 160.

When the processing for determining a specific document is finished, the controller 180 determines in step S1101b that the processing for determining a specific document is not being executed, stops output of a microwave, and executes, for instance, the processing for reading color image data from the document as an object to be determined.

As described above, with the image reading apparatus having the specific document determining function according to Embodiment 24, as irradiation of a microwave can be stopped, even when the processing for determining a specific document cannot be executed, an operation for reading the operation for reading image data is stopped and the processing for forming an image is disabled, so that it is possible to prevent a specific document such as bills or marketable securities from being illegally copied. Also as irradiation of a microwave can be stopped, it is possible to prevent a microwave from being directly irradiated to a human body.

The image reading apparatus having the specific document determining function according to Embodiment 25 of the present invention is different from the image reading apparatus having the specific document determining function according to any of Embodiments 21 to 23 in the point that, after irradiation of a microwave is stopped, when image data is read from a document, an image processing is executed to the image data so that the read image data is differentiated from image data for the document. It should be noted that configuration of the image reading apparatus having the specific document determining function according to Embodiment 25 is the same as that of the image reading apparatus having the specific document determining function according to any of Embodiments 21 to 23, so that description thereof is omitted herein, but description is made hereinafter for configuration of the image reading apparatus having the specific document determining function according to Embodiment 21.

In the image reading apparatus having the specific document determining function according to Embodiment 25, the processing for determining a specific document is executed when color image data is read from a document. In Embodiment 25, the processing for determining a specific document is executed when prescan is executed to detect a size of a document or an image density thereon. However, the timing for execution of the processing for determining a specific document is not always limited to the time when prescan is executed.

Figure 41:
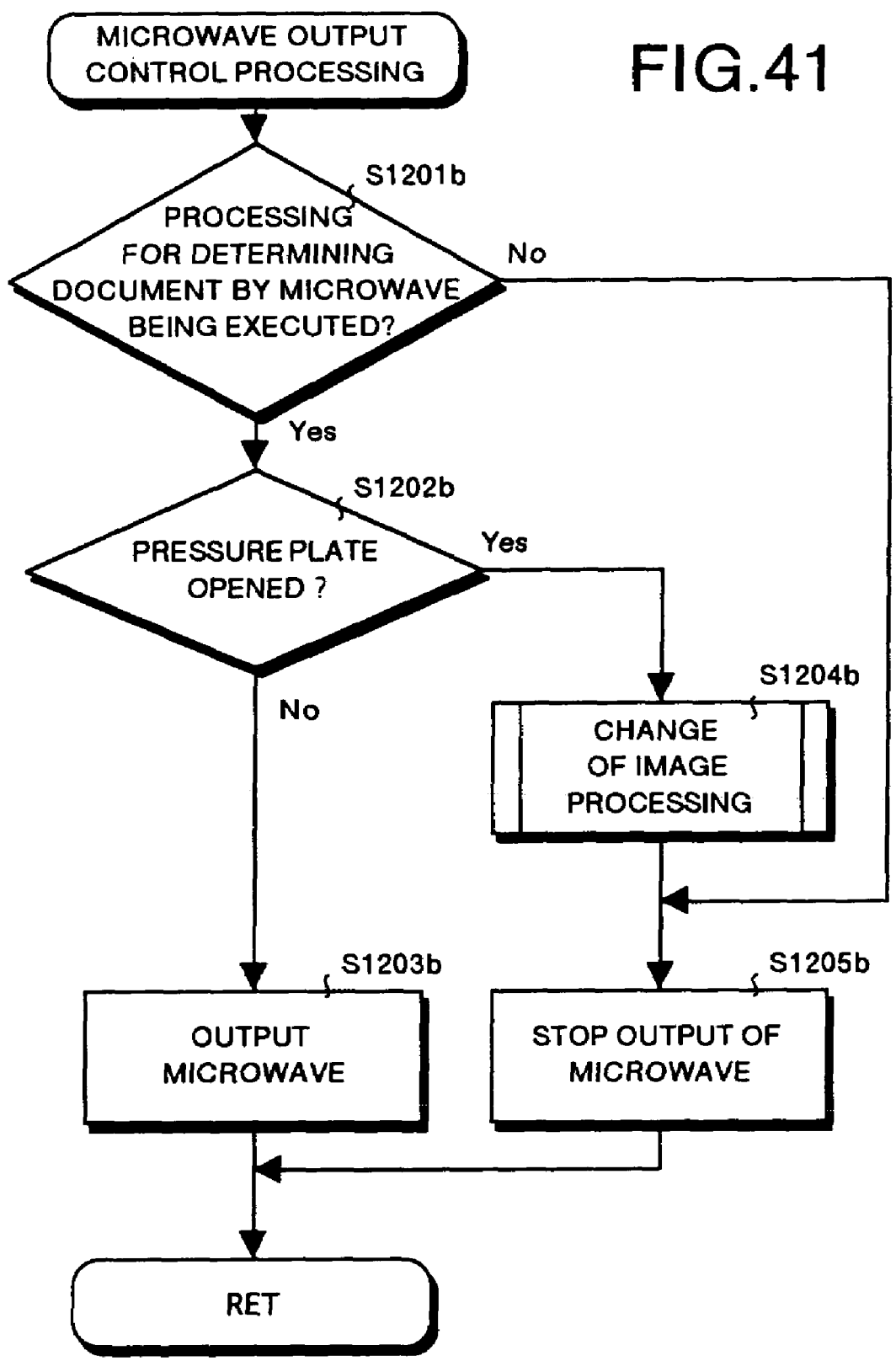
FIG. 41 is a flowchart showing a sequence of controlling an output of a microwave executed for the processing for determining a specific document in an image reading apparatus having a specific document determining function according to Embodiment 25.

FIG. 41 is a flowchart showing the microwave output control sequence executed when the processing for determining a specific document is executed by the image reading apparatus according to Embodiment 25. When it is instructed to read color image data, prescan is executed and at the same time the processing for determining a specific document is executed. In this step, the controllers 180 reads out a subroutine for the microwave output control processing, and makes determinations as to whether the processing for determining a specific document is currently being executed or not (S1201b).

When it is determined in step S1201b that the processing for determining a specific document is not currently being executed, system control shifts to the next step without making the microwave sensor 161 output a microwave (S1205b).

On the other hand, when it is determined in step S1201b that the processing for determining a specific document is currently being executed, determination is made as to whether the pressure plate 202 is in the open state or in the closed state (S1202b). Whether the pressure plate 202 is in the open state or in the closed state can be checked according to a detection signal outputted from the pressure plate open state detecting unit 190b. Namely the pressure plate open state detecting unit 190b always monitors whether the pressure plate 202 is open or closed, and when the pressure plate 202 is opened, the pressure plate open state detecting unit 190b outputs a detection signal indicating that the pressure plate 202 is open to the controller 180. The controller 180 can determine whether the pressure plate 202 is in the open state or not by receiving the detection signal.

When it is determined in step S1202b that the pressure plate 202 is in the open state, the controller 180 executes subroutine for changing the image processing for subjecting the color image data to the image processing so that the color image data read from a document after prescan is finished will be differentiated from the image data for the document (S1204b). Namely, the controller 180 changes parameters for the image processing by the image processor 120.

Then the controller 180 shifts to the next step without making the microwave sensor 161 output a microwave (S1205b). Namely the controller 180 stops the processing for determining a specific document by the document determining unit 160.

On the other hand, when it is determined in step S1202b that the pressure plate 202 is in the closed state, the controller 180 makes the microwave sensor 161 output a microwave (S1203b). Namely, the controller 180 makes the document determining unit 160 execute the processing for determining a specific document continuously.

And, the microwave sensor 161 irradiates a microwave to and scans a document as an object to be determined, detects a reflected portion of the irradiated microwave, and outputs a detection signal for the reflected wave. The signal processing section 162 receives the detection signal outputted from the microwave sensor 161, and makes determination as to whether metallic fiber is included in the document by using the received detection signal. When it is determined that metallic fiber is included therein, a result is reported to the controller 180, and the controller 180 determines that the document is a specific document such as bills or marketable securities with metallic fiber included therein. On the other hand, when it is determined in the signal processing section 162 that metallic fiber is not included in the document, a result is reported to the controller 180, and the controller 180 determines that the document is not a specific document such as bills or marketable securities with metallic fiber included therein, but an ordinary document.

Even while the microwave sensor 161 is irradiating a microwave and scanning a document, the controller 180 repeatedly reads out a subroutine for the microwave output control processing at a specified timing, and executes the microwave output control processing in step S1201*b* to step S1205*b*. As a result, when it is determined in step S1202*b* that the pressure plate 202 is in the open state, even during execution of the processing for determining a specific document, the controller 180 executes a subroutine for changing the image processing (S1204*b*), and at the same time stops output of a microwave (S1205*b*). Namely, the controller 180 stops the processing for determining a specific document by the document determining unit 160.

When the processing for determining a specific document is finished, the controller 180 determines in step S1201*b* that the processing for determining a specific document is not currently being executed, stops output of a microwave from the microwave sensor 161, and makes the scanner unit 110 execute the processing for reading color image data from a document. The read color image data is subjected to the image processing in the image processor 120 so that the read image data is differentiated from the image data for the document. Namely, the image processor 120 executes the image processing according to parameters for the image processing changed in the subroutine step S1204*b* for changing the image processing.

As described above, with the image reading apparatus having the specific document determining function according to Embodiment 25, as the image processing is executed to the image data read after irradiation of a microwave is stopped and execution of the processing for determining a specific document is inhibited will be differentiated from the image data for the document, even when image data is read without making determination as to whether the document is a specific one or not, it is possible to prevent a specific document such as bills or marketable securities from being illegally copied. Also as irradiation of a microwave is stopped, it is possible to prevent a microwave from being directly irradiated to a human body.

The image reading apparatus having the specific document determining apparatus according to Embodiment 26 is different from the image reading apparatus having the specific document determining function according to Embodiment 25 in the point that the image processor 120 executes the processing for changing a color phase of image data as an image processing to image data read after execution of the processing for determining a specific document is stopped.

Figure 42:
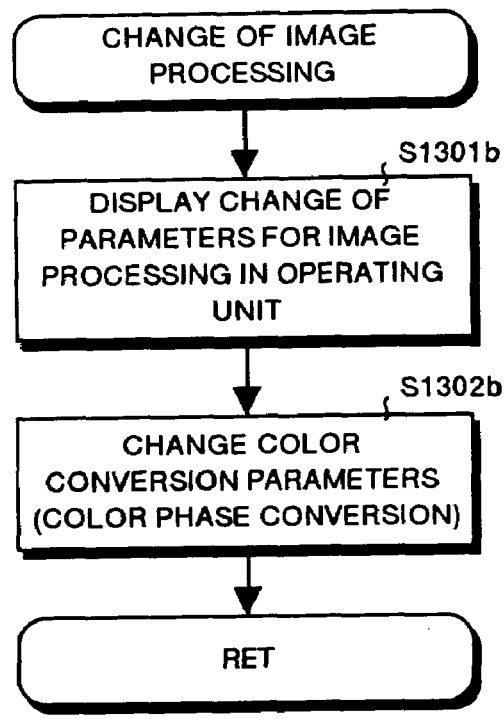
FIG. 42 is a flowchart showing a sequence of changing image processing in an image reading apparatus having a specific document determining function according to Embodiment 26.

FIG. 42 is a flowchart showing a sequence of changing the image processing in the image reading apparatus having the specific document determining function according to Embodiment 26. In step S1204*b* shown in FIG. 14, when the controller 180 enters a subroutine for changing the image processing, at first change of parameters for the image processing is displayed in an operating unit 150 (S1301*b*).

Then the controller 180 changes color conversion parameters for the image processor 120 so that a color change for the read color image data will be changed (S1302*b*), and terminates the processing for changing the image processing.

As described above, in the image reading apparatus having the specific document determining function according to Embodiment 26, as a color phase of image data read from a document after the processing for determining a specific document is inhibited is changed, so that, even when image data is read from a document without making determination as to whether the document is a specific one or not, it is possible to prevent a specific document such as bills or marketable securities from being illegally copied.

The image reading apparatus having the specific document determining function according to Embodiment 27 of the present invention is different from the image reading apparatus having the specific document determining function according to Embodiment 25 in the point that the image processor 120 executes the processing for changing a density of image data as an image processing for image data read after execution of the processing for determining a specific document is inhibited.

Figure 43:
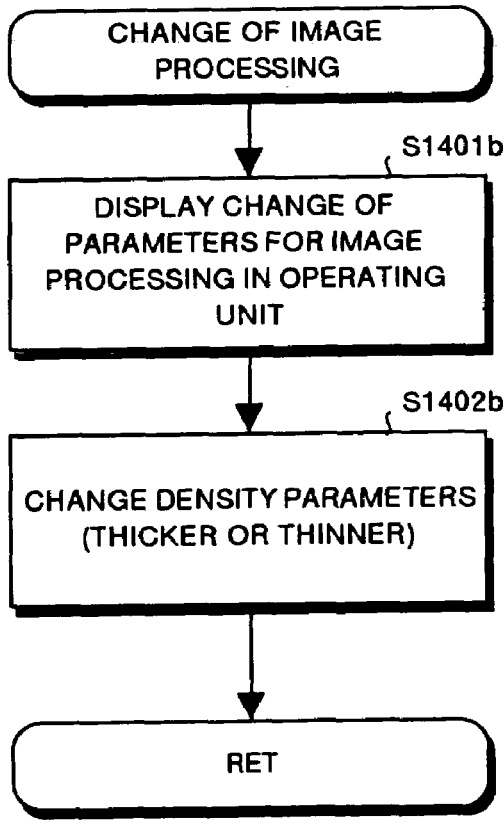
FIG. 43 is a flowchart showing a sequence of changing image processing in an image reading apparatus having a specific document determining function according to Embodiment 27.

FIG. 43 is a flowchart showing a sequence of changing the image processing in the image reading apparatus having the specific document determining function according to Embodiment 27. In step S1204*b* shown in FIG. 41, when the controller 180 enters a subroutine for changing the image processing, at first change of parameters for the image processing is displayed in the operating unit 150 (S1401*b*).

Then the controller 180 changes density parameters for the image processor 120 so that a density of read color image data will be thicker or thinner (S1402*b*), and then terminates the processing for changing the image processing.

As described above, in the image reading apparatus having the specific document according to Embodiment 27, as a density of image data read from a document to which the processing for determining a specific document has been inhibited is changed, so that, even when image data is read from a document without making determination as to whether the document is a specific document or not, it is possible to prevent a specific document such as bills or marketable securities from being illegally copied.

The image reading apparatus having the specific document determining function according to Embodiment 28 of the present invention is different from the image reading apparatus having the specific document determining function according to Embodiment 25 in the point that the image processor 120 executes the processing for limiting a range of color reproduction for image data as an image processing for image data read after execution of the processing for determining a specific document is stopped.

Figure 44:
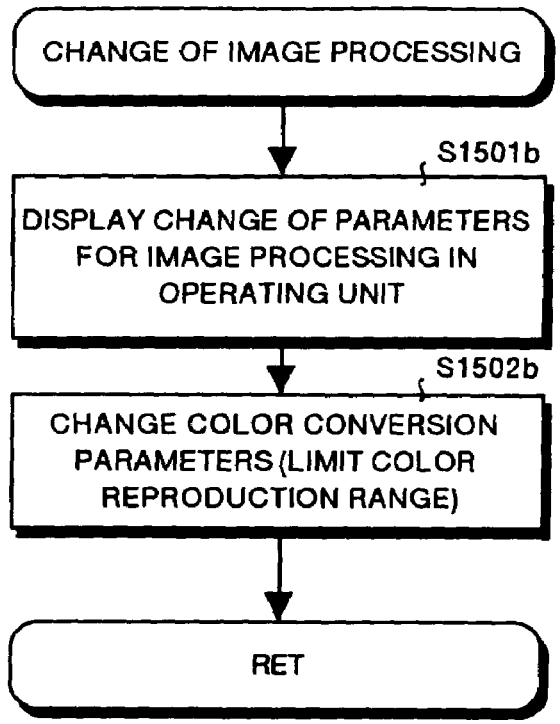
FIG. 44 is a flowchart showing a sequence of changing image processing in an image reading apparatus having a specific document determining function according to Embodiment 28.

FIG. 44 is a flowchart showing a sequence of changing the image processing in the image reading apparatus having the specific document determining function according to Embodiment 28. In step S1204*b* shown in FIG. 41, when the controller 180 enters a subroutine for changing the image processing, at first change of parameters for the image processing is displayed in the operating unit 150 (S1501*b*).

Then the controller 180 changes parameters for color reproduction in the image processor 120 so that a color reproduction range for read color image data can be limited (S1502*b*), and then terminates the processing for changing the image processing.

As described above, in the image reading apparatus having the specific document determining function according to Embodiment 28, as a color reproduction range for image data read from a document to which execution of the processing for determining a specific document has been stopped is limited, even when image data is read from a document without making determination as to whether a document is a specific document or not, it is possible to prevent a specific document such as bills or marketable securities from being illegally copied.

The image reading apparatus having the specific document determining function according to Embodiment 29 of the present invention is different from the image reading apparatus having the specific document determining function according to Embodiment 25 in the point that the image processor 120 changes the processing for changing a resolution of image data as an image processing for image data read after execution of the processing for determining a specific document is stopped.

Figure 45:
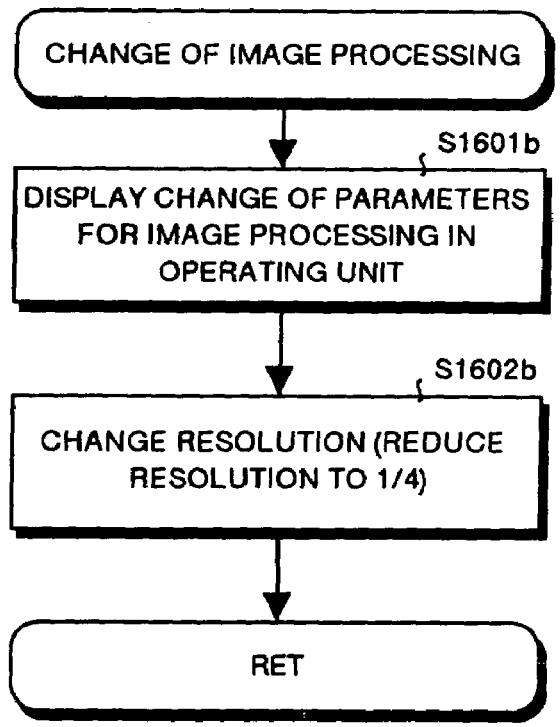
FIG. 45 is a flowchart showing a sequence of changing image processing in an image reading apparatus having a specific document determining function according to Embodiment 29.

FIG. 45 is a flowchart showing a sequence of changing the image processing in the image reading apparatus having the specific document determining function according to Embodiment 29. In step S1204b shown in FIG. 41, when the controller 180 enters a subroutine for changing the image processing, at first change of parameters for the image processing is displayed in the operating unit 150 (S1601b).

Then the controller 180 changes parameters for a resolution of the image processor 120 so that a resolution of read color image data can be changed (for instance by reducing the resolution to ¼) (S1602b), and then terminates the processing for changing the image processing.

As described above, in the image reading apparatus having the specific document determining function according to Embodiment 29, as a resolution of image data read from a document to which execution of the processing for determining a specific document is stopped is changed, so that, even when image data is read from a document without making determination as to whether the document is a specific one or not, it is possible to prevent a specific document such as bills or marketable securities from being illegally copied.

The image reading apparatus having the specific document determining function according to Embodiment 30 of the present invention is different from the image reading apparatus having the specific document determining function according to Embodiment 25 in the point that the image processor 120 executes the mosaic processing to image data as an image processing to image data read after execution of the processing for determining a specific document is stopped.

Figure 46:
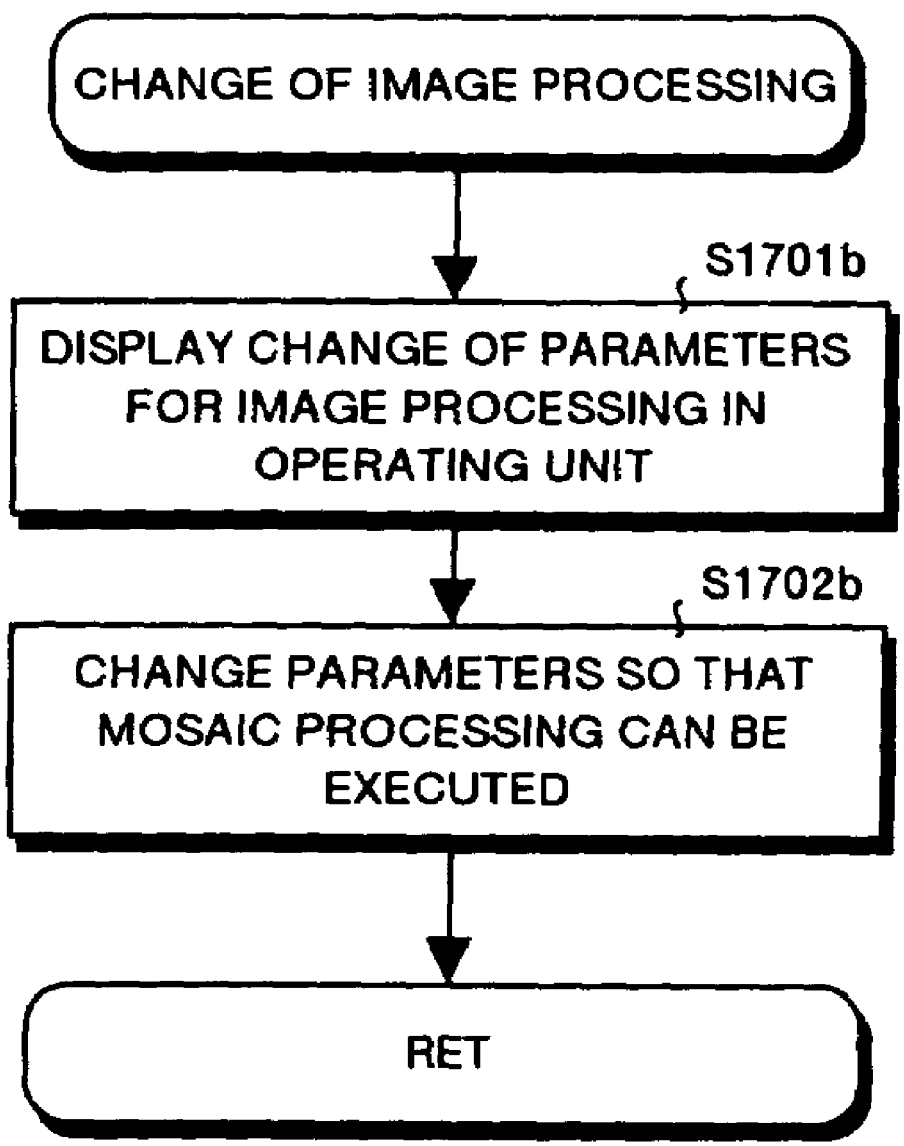
FIG. 46 is a flowchart showing a sequence of changing image processing in an image reading apparatus having a specific document determining function according to Embodiment 30.

FIG. 46 is a flowchart showing a sequence of changing the image processing in the image reading apparatus having the specific document determining function according to Embodiment 30. In step 1204b shown in. FIG. 41, when the controller 180 enters a subroutine for changing the image processing, at first change of parameters for the image processing is displayed in the operating unit 150 (S1701b).

Then the controller 180 changes parameters for the image processor 120 so that the mosaic processing can be executed to the read color image data (S1702b), and then terminates the processing for changing the image processing.

As described above, in the image reading apparatus having the specific document determining function according to Embodiment 30, as the mosaic processing is executed to image data read from a document to which execution of the processing for determining a specific document has been stopped, even when image data is read from a document without making determination as to whether the document is a specific one or not, it is possible to prevent a specific document such as bills or marketable securities from being illegally copied.

The image reading apparatus having the specific document determining function according to Embodiment 31 of the present invention is different from the image reading apparatus having the specific document determining function according to any of Embodiments 21 to 23 in the point that, when the document determining unit 160 stops irradiation of a microwave, determination as to whether the document is a specific one or not is made with a system other than that in which a microwave is used. It should be noted that, as configuration of the image reading apparatus having the specific document determining function according to Embodiment 31 is the same as that of the image reading apparatus having the specific document determining function according to Embodiments 21 to 23, description thereof is omitted herein, and description is made below with reference to configuration of the image reading apparatus having the specific document determining function according to Embodiment 21.

In the image reading apparatus having the specific document determining function according to Embodiment 31, the processing for determining a specific document is executed when color image data is read from a document. In Embodiment 31, the processing for determining a specific document is executed when prescan is carried out to detect a size of a document or an image density thereon. However, the timing for execution of the processing for determining a specific document is not always limited to the time when prescan is executed.

Figure 47:
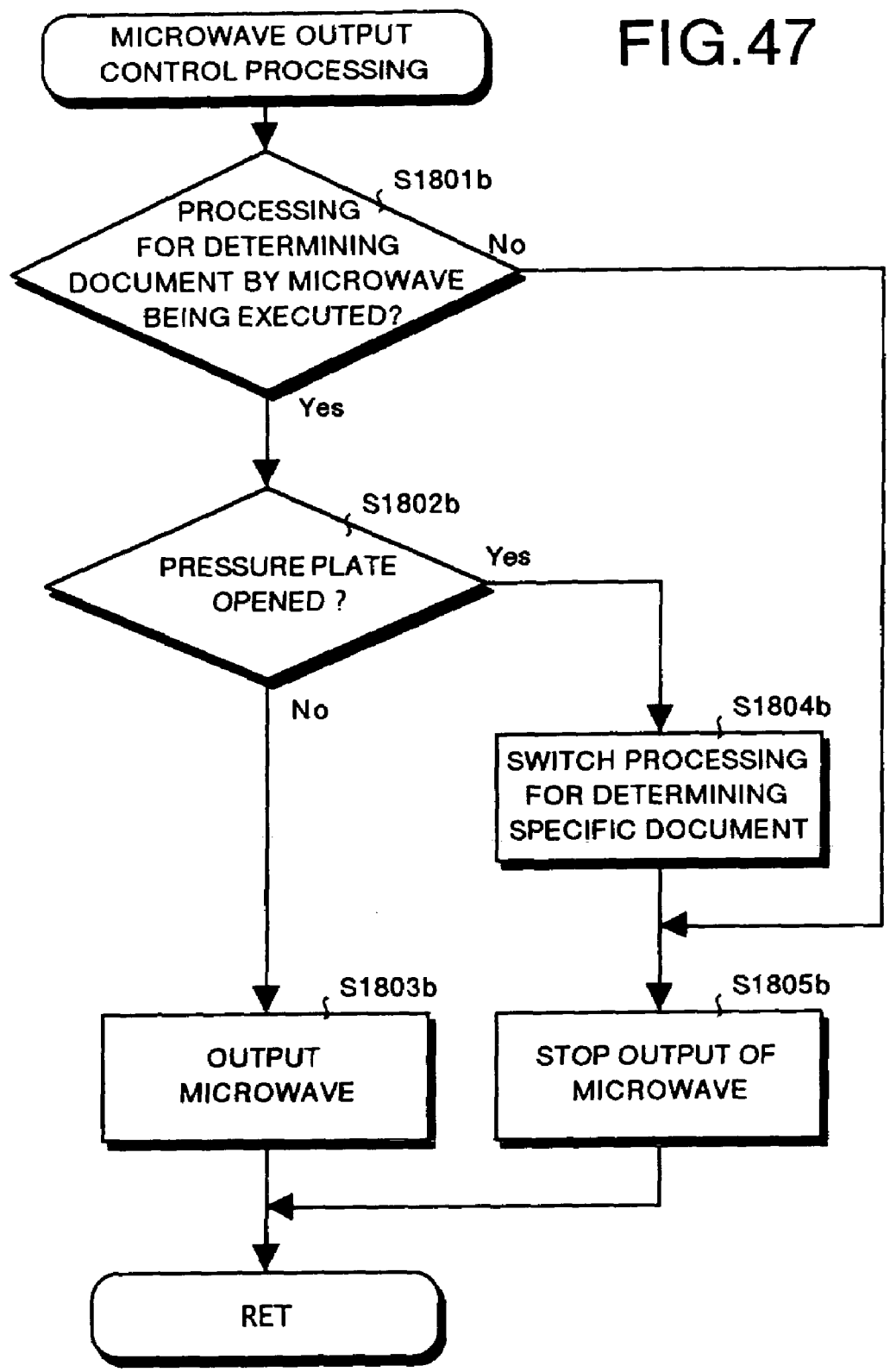
FIG. 47 is a flowchart showing a sequence of controlling an output of a microwave executed for the processing for determining a specific document in an image reading apparatus having a specific document determining function according to Embodiment 31.

FIG. 47 is a flowchart showing a microwave output control sequence executed when the processing for determining a specific document is executed by the image reading apparatus having the specific document determining function according to Embodiment 31. When it is instructed to read color image data, prescan is executed, and at the same time the processing for determining a specific document is executed. In this step, the controller 180 reads out a subroutine for the microwave output control processing, and makes determination as to whether the processing for determining a specific document is currently being executed or not (S1801b).

When it is determined in step S1801b that the processing for determining a specific document is not currently being executed, system control shifts to the next step without making the microwave sensor 161 output a microwave (S1805b).

On the other hand, when it is determined in step S1801b that the processing for determining a specific document is currently being executed, then determination is made as to whether the pressure plate 202 is in the open state or in the closed state (S1802b). Whether the pressure plate 202 is in the open state or in the closed state can be checked according to a detection signal outputted from the pressure plate open state detecting unit 190b. Namely, the pressure plate open state detecting unit 190b always monitors whether the pressure plate 202 is in the open state or in the closed state, and when the pressure plate 202 is opened, the pressure plate open state detecting unit 190b outputs a detecting signal indicating that the pressure plate has been opened to the controller 180. The controller 180 receives the detection signal and can determine whether the pressure plate 202 is in the open state or in the closed state.

When it is determined in step S1802b that the pressure plate 202 is in the open state, the controller 180 executes the processing for switching from the processing for determining a specific document using a microwave to the processing for determining a specific document not using a microwave (S1804b). The controller 180 executes the processing for switching the processing for determining a specific document, and then stops output of a microwave from the microwave sensor 161 (S1805b). Namely, the controller 180 stops the processing for determining a specific document using a microwave, and makes the document determining unit 160 execute other type of processing for determining a specific document to determine whether the document is a specific one or not.

On the other hand, when it is determined in step S1802b that the pressure plate 202 is in the closed state, the controller 180 makes the microwave sensor 161 output a microwave (S1803b). Namely, the controller 180 makes the document determining unit 160 execute the processing for determining a specific document continuously.

And, the microwave sensor 161 irradiates a microwave to and scans a document as an object to be determined, detects a reflected portion of the irradiated microwave, and outputs a detection signal for the reflected wave. The signal processing section 162 receives the detection signal outputted from the microwave sensor 161, and makes determination as to whether metallic fiber is included in the document or not by using the received detection signal. When it is determined that metallic fiber is included therein, a result is reported to the controller 180, and the controller 180 determines that the document is a specific document such as bills or marketable securities with metallic fiber included therein. On the other hand, when it is determined in the signal processing section 162 that metallic fiber is not included in the document, a result is reported to the controller 180, and the controller 180 determines that the document is not a specific document such as bills or marketable securities with metallic fiber included therein, and that the document is an ordinary one.

Even while the microwave sensor 161 is irradiating a microwave to and scanning a document, the controller 180 repeatedly reads a subroutine for the microwave output control processing at a specified timing, and executes the microwave output control processing in step S1801b to step S1805b. As a result, when it is determined in step S1802b that the pressure plate 202 is in the open state, even during execution of the processing for determining a specific document, the controller 180 has other type of processing for determining a specific document executed (S1804b), and also stops output of a microwave (S1805b).

When the processing for determining a specific document is finished, the controllers 180 determines in step S1801b that the processing for determining a specific document is not currently being executed, stops output of a microwave from the microwave sensor 161, and executes, for instance, the processing for reading color image data from a document as an object to be obtained.

As described above, with the image reading apparatus having the specific document determining function according to Embodiment 31, even when irradiation of a microwave is stopped and the processing for determining a specific document can not be executed, other type of processing for determining a specific document is executed, so that it is possible to prevent a specific document such as bills or marketable securities from being illegally copied. Also irradiation of a microwave is stopped, so that it is possible to prevent a microwave from being directly irradiated to a human body.

Figure 48:
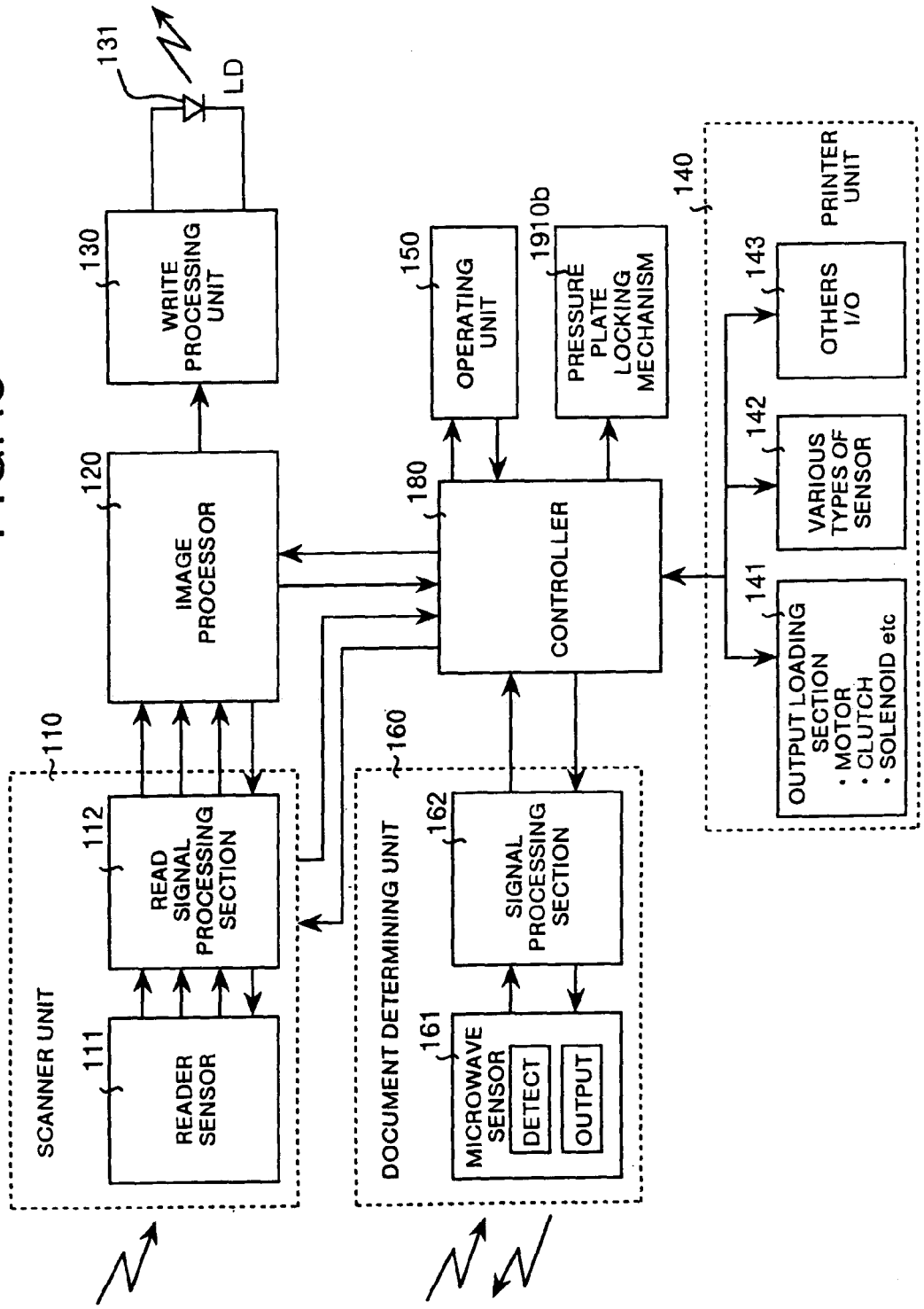
FIG. 48 is a block diagram showing an image reading apparatus having a specific document determining function according to Embodiment 32.

FIG. 48 is a block diagram showing the image reading apparatus having the specific document determining function according to Embodiment 32 of the present invention.

It should be noted that, in the image reading apparatus having the specific document determining function shown in FIG. 48, the same reference numerals are assigned to components as those in the image reading apparatus having the specific document determining function shown in FIG. 21, and description thereof is omitted therein.

The image reading apparatus having the specific document determining function according to Embodiment 32 has a pressure plate locking mechanism 1910b to prevent the pressure plate 202 pressing a document to a contact glass 201 from being opened when determination is made by the document determining unit 160 as to whether metallic fiber is included in the document or not.

Next description is made for operations of the image reading apparatus having the specific document determining function based on the configuration as described above. In the image reading apparatus having the specific document determining function according to Embodiment 32, the processing for determining a specific document is executed when color image data is read from a document. In Embodiment 32, the processing for determining a specific document is executed at a timing when prescan is executed to detect a size of a document or an image density thereon. However, the timing for executing the processing for determining a specific document is not limited to the time when prescan is executed.

Figure 49:
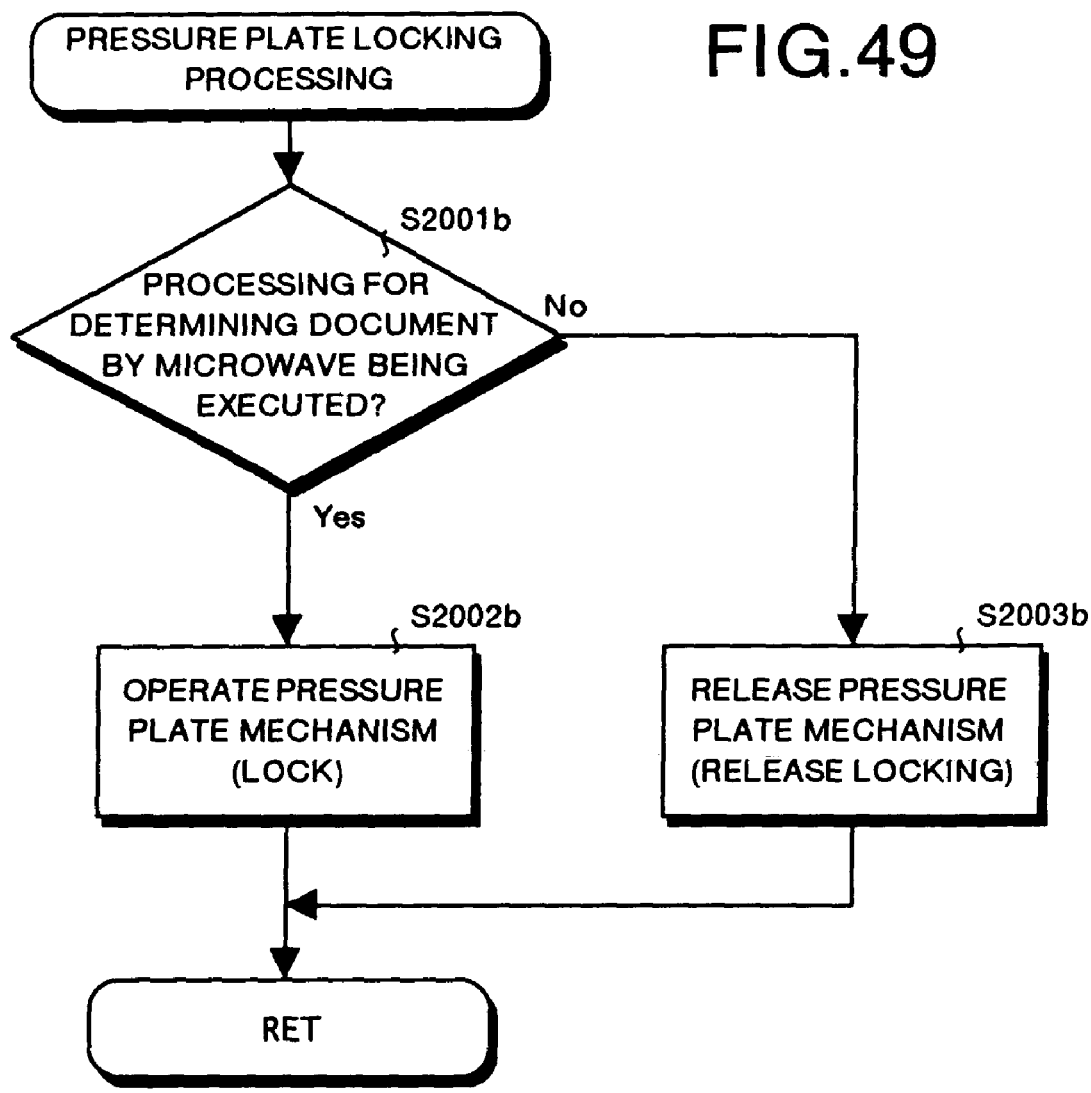
FIG. 49 is a flowchart showing a sequence of locking a pressure plate in the processing for determining a specific document in an image reading apparatus having a specific document determining function according to Embodiment 32.

FIG. 49 is a flowchart showing a sequence of locking a pressure plate when the image reading apparatus according to Embodiment 32 executes the processing for determining a specific document. When it is instructed to read color image data, prescan is executed, and at the same time the processing for determining a specific document is executed. In this step, the controller 180 reads out a subroutine for the microwave output control processing, and makes determination as to whether the processing for determining a specific document is currently being executed or not (S2001b).

When it is determined in step S2001b that the processing for determining a specific document is not currently being executed, system control makes the pressure lock mechanism 1910b release locking of the pressure plate, and shifts to the next step (S2003b).

On the other hand, when it is determined in step S2001b that the processing for determining a specific document is currently being executed, the controller 180 makes the pressure plate locking mechanism 1910b operate to effect locking so that the pressure plate can not be opened (S2002b). And, the controller 180 makes the document determining unit 160 execute the processing for determining a specific document without the pressure plate 202 kept locked.

Also when the processing for determining a specific document is finished, the controller 180 determines in step S2001b that the processing for determining a specific document is not being executed, the controller 180 makes the pressure plate locking mechanism 1910b operate to release locking of the pressure plate 202 (S2003b).

As described above, with the image reading apparatus having the specific document determining function according to Embodiment 32, as the pressure plate locking mechanism 1910b locks the pressure plate to prevent it from being opened during execution of the processing for determining a specific document, it is possible to prevent the pressure plate 202 from being opened by mistake during execution of the processing for determining a specific document. As a result, it is possible to prevent a microwave from being directly irradiated to a human body.

It should be noted that it is possible to program a method of controlling the image reading apparatus having the specific document determining function described in Embodiments 21 to 32 and to store the program in a computer-readable recording medium such as a floppy disk, a hard disk, a CD-ROM, or DVD.

As described above, the image reading apparatus having the specific document determining function according to the present invention has a pressure plate determining unit for making determination as to whether a pressure plate pressing a document to a document base is in the open state or in the closed state when irradiating a microwave to and scanning the document, and a specific document determining unit for stopping irradiation of a microwave when it is determined by the pressure plate determining unit that the pressure plate is in the open state, and also executing the processing for irradiating a microwave to and scanning a document when it is determined by the pressure plate determining unit that the pressure plate is in the closed state, so that it is possible to prevent a microwave from being directly irradiated to a human body.

Also the image reading apparatus having the specific document determining function according to the present invention has a human body determining unit for making determination as to whether a man is present near the image reading apparatus when a microwave is irradiated to a document for scanning, and a specific document determining unit for stopping irradiation of a microwave when it is determined by the human body determining unit that a man is present near the image reading apparatus, and also for executing the operation for irradiating a microwave to and scanning a document continuously when it is determined by the human body determining unit that a man is not present near the image reading apparatus, so that it is possible to prevent a microwave from being directly irradiated to a human body.

Also the image reading apparatus having the specific document determining function according to the present invention has a pressure plate determining unit for making determination as to whether a pressure plate pressing a document to a document base is in the open state or in the closed state when irradiating a microwave to and scanning the document, a human body determining unit for making determination as to whether a man is present near the image reading apparatus or not when it is determined by the pressure plate determining unit that the pressure plate is in the open state, and a specific document determining unit for executing the operation for irradiating a microwave to and scanning a document continuously when it is determined by the pressure plate determining unit that the pressure plate is in the closed state and when it is determined by the human body determining unit that a man is not present near the image reading apparatus, and also for stopping irradiation of a microwave when it is determined by the human body determining unit that a man is present near the image reading apparatus, so that it is possible to prevent a microwave from being directly irradiated to a human body.

Also the image reading apparatus having the specific document determining function according to the present invention has a reader for stopping an operation for reading image data from a document when irradiation of a microwave is stopped, so that it is possible to prevent a specific document such as bills or marketable securities from being illegally copied and also to prevent a microwave from being directly irradiated to a human body.

Also the image reading apparatus having the specific document determining function according to the present invention has an image processor for executing an image processing to image data, when the image data is read from a document after irradiation of a microwave is stopped, so that the read image data is differentiated from image data for the document, so that, when image data is read from a document without making determination as to whether a document is a specific one or not, it is possible to prevent a specific document such as bills or marketable securities from being illegally copied. Also as irradiation of a microwave is stopped, it is possible to prevent a microwave from being directly irradiated to a human body.

With the image reading apparatus having the specific document determining function according to the present invention, the image processor changes a color phase of image data, so that, even when image data is read from a document without making determination as to whether a document is a specific one or not, it is possible to prevent a specific document such as bills or marketable securities from being illegally copied.

With the image reading apparatus having the specific document determining function according to the present invention, the image processor changes an image density of image data, so that, even when image data is read from a document without making determination as to whether the document is a specific one or not, it is possible to prevent a specific document such as bills or marketable securities from being illegally copied.

With the image reading apparatus having the specific document determining function according to the present invention, the image processor changes a color reproduction range for image data, so that, even when image data is read from a document without making determination as to whether the document is a specific one or not, it is possible to prevent a specific document such as bills or marketable securities from being illegally copied.

With the image reading apparatus having the specific document determining function according to the present invention, the image processor changes a resolution of image data, so that, even when image data is read from a document without making determination as to whether the document is a specific one or not, it is possible to prevent a specific document such as bills or marketable securities from being illegally copied.

With the image reading apparatus having the specific document determining function according to the present invention, the image processor executes the mosaic processing to the image data, so that, even when image data is read from a document without making determination as to whether the document is a specific one or not, it is possible to prevent a specific document such as bills or marketable securities from being illegally copied.

With the image reading apparatus having the specific document determining function according to the present invention, the specific document determining unit makes determination as to whether a document is a specific one or not, when irradiation of a microwave is stopped, by using a method not requiring the operations for irradiating a microwave to a document for scanning, so that it is possible to prevent a specific document such as bills or marketable securities from being illegally copied and also to prevent a microwave from being directly irradiated to a human body.

The image reading apparatus having the specific document determining function has a locking unit for locking a pressure plate pressing a document to a document base, when determination is made as to whether the document is a specific one or not, so that the pressure plate can not be opened, and also for releasing locking of the pressure plate when the processing for making determination as to whether the document is a specific one or not is finished, so that it is possible to prevent the pressure plate from being opened by mistake during the processing for determining the specific document. As a result, it is possible to prevent a microwave from being directly irradiated to a human body.

The method of controlling an image reading apparatus having the specific document determining function according to the present invention comprises a first step of making determination as to whether the pressure plate pressing a document to a document base is in the open state or in the closed state while a microwave is irradiated to a document for scanning, a second step of stopping irradiation of a microwave when it is determined in the first step that the pressure plate is in the open state, and a third step of executing the processing for irradiating a microwave and scanning a document continuously when it is determined in the first step that the pressure plate is in the closed state, so that it is possible to prevent a microwave from being directly irradiated to a human body.

The method of controlling an image reading apparatus having the specific document determining function according to the present invention comprises a first step of making determination as to whether a man is present near the image reading apparatus or not while a microwave is irradiated to a document for scanning, a second step of stopping irradiation of a microwave when it is determined in the first step that a man is present near the image reading apparatus, and a third step of executing the processing for irradiating a microwave to and scanning the document continuously when it is determined in the first step that a man is not present near the image reading apparatus, so that it is possible to prevent a microwave from being directly irradiated to a human body.

The method of controlling an image reading apparatus having the specific document determining function according to the present invention comprises a first step of making determination as to whether the pressure plate pressing a document to a document base is in the open state or in the closed state while a microwave is irradiated to a document for scanning, a second step of executing the processing for irradiating a microwave and scanning a document continuously when it is determined in the first step that the pressure plate is in the closed state, a third step of making determination as to whether a man is present near the image reading apparatus when it is determined in the first step that the pressure plate is in the open state, a fourth step of executing the processing for irradiating a microwave and scanning the document when it is determined in the third step that a man is not present near the image reading apparatus, and a fifth step of stopping irradiation of a microwave when it is determined in the third step that a man is present near the image reading apparatus, so that it is possible to prevent a microwave from being directly irradiated to a human body.

The method of controlling an image reading apparatus having the specific document determining function according to the present invention comprises a step of stopping an operation for reading image data from a document when irradiation of a microwave is stopped, so that it is possible to prevent a specific document such as bills or marketable securities from being illegally copied and also to prevent a microwave from being directly irradiated to a human body.

The method of controlling an image reading apparatus having the specific document determining function according to the present invention comprises an image processing step of subjecting image data to the image processing, when image data is read from a document after irradiation of a microwave is stopped, so that the read data is differentiated from image data for the document, so that, even when image data is read from a document without making determination as to whether the document is a specific one or not, it is possible to prevent a specific document such as bills or marketable securities from being illegally copied. Also as irradiation of a microwave is stopped, it is possible to prevent a microwave from being directly irradiated to a human body.

In the method of controlling an image reading apparatus having the specific document determining function according to the present invention, the image processing step includes a step of changing a color phase of image data, so that, even when image data is read from a document without making determination as to whether the document is a specific one or not, it is possible to prevent a specific document such as bills or marketable securities from being illegally copied.

In the method of controlling an image reading apparatus having the specific document determining function according to the present invention, the image processing step includes a step of changing an image density of image data, so that, even when image data is read from a document without making determination as to whether the document is a specific one or not, it is possible to prevent a specific document such as bills or marketable securities from being illegally copied.

In the method of controlling an image reading apparatus having the specific document determining function according to the present invention, the image processing step includes a step of changing a color reproduction range for image data, so that, even when image data is read from a document without making determination as to whether the document is a specific one or not, it is possible to prevent a specific document such as bills or marketable securities from being illegally copied.

In the method of controlling an image reading apparatus having the specific document determining function according to the present invention, the image processing step includes a step of changing a resolution of image data, so that, even when image data is read from a document without making determination as to whether the document is a specific one or not, it is possible to prevent a specific document such as bills or marketable securities from being illegally copied.

In the method of controlling an image reading apparatus having the specific document determining function according to the present invention, the image processing step includes a step of executing the mosaic processing to image data, so that, even when image data is read from a document without making determination as to whether the document is a specific one or not, it is possible to prevent a specific document such as bills or marketable securities from being illegally copied.

The method of controlling an image reading apparatus having the specific document determining function according to the present invention comprises a specific document determining step of making determination as to whether a document is a specific one or not by using a method not requiring the processing for irradiating a microwave to and scanning the document when irradiation of a microwave is stopped, so that it is possible to prevent a specific document such as bills or marketable securities from being illegally copied and also to prevent a microwave from being directly irradiated to a human body.

The method of controlling an image reading apparatus having the specific document determining function according to the present invention comprises a first step of locking a pressure plate pressing a document to a document base so that the pressure plate can not be opened when determination is made as to whether a document is a specific one or not, a second step of releasing locking of the pressure plate when the processing for making determination as to whether a document is a specific one or not is finished, so that is possible to prevent the pressure plate from being opened by mistake during execution of the processing for determining a specific document. As a result, it is possible to prevent a microwave from being directly irradiated to a human body.

The computer-readable recording medium according to the present invention stores therein a program for executing the program described above, so that the program for the control method itself can appropriately be protected.

FIG. 1 is a block diagram showing the image reading apparatus in which the specific document determining unit according to Embodiment 33 is applied, and FIG. 2 is a block diagram showing concrete configuration of a document reading system in the image reading apparatus shown in FIG. 1. The concrete contents thereof was described above, so that description thereof is omitted herein.

Next description is made for the processing for making determination as to whether the microwave sensor 161 is normally operating or not.

Figure 50:
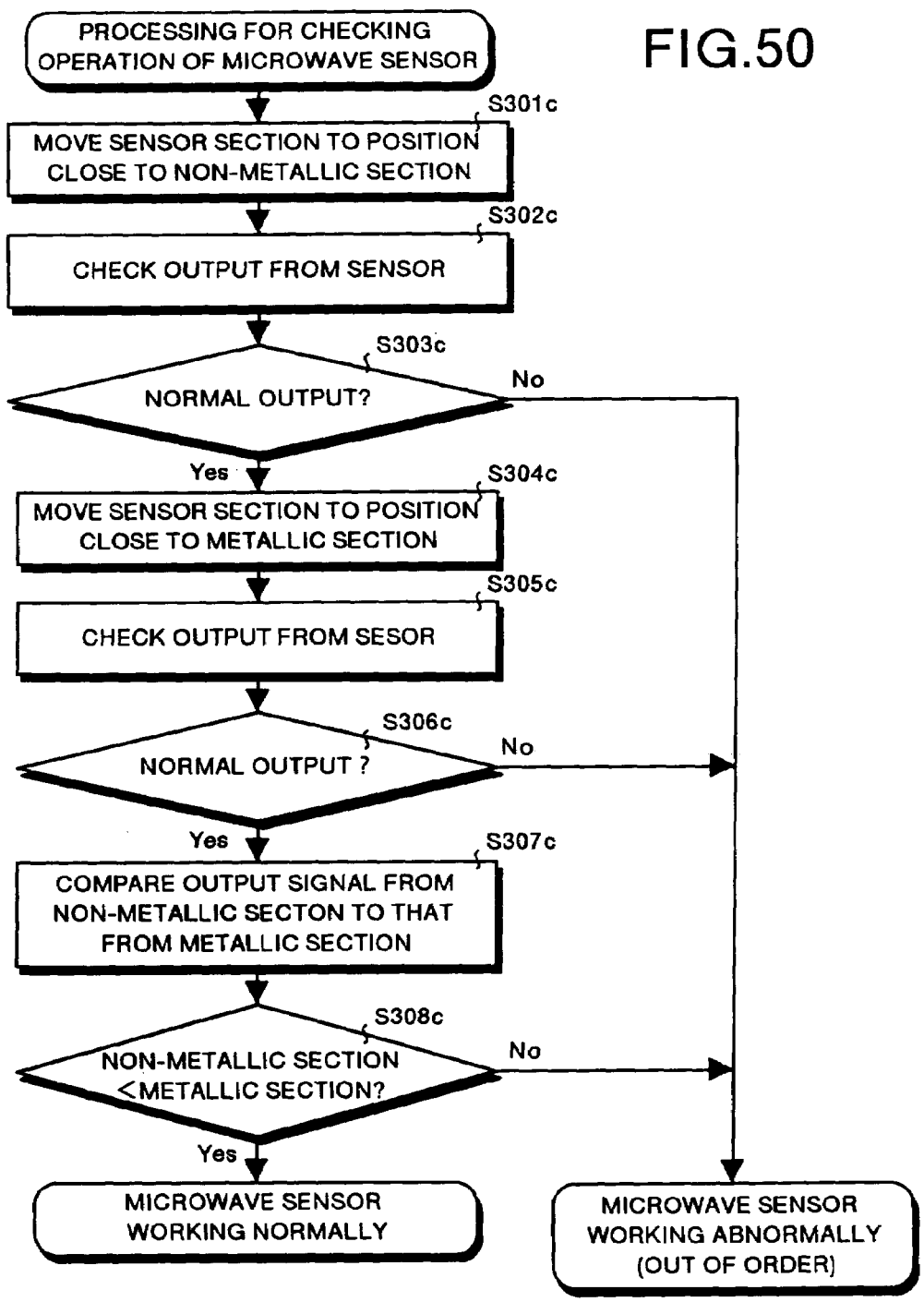
FIG. 50 is a flowchart showing processing for checking an operation of the microwave sensor in an image reading apparatus to which a specific document determining apparatus according to Embodiment 33 is applied.

FIG. 50 is a flowchart showing the processing for checking operations of the microwave sensor 161 in the image reading apparatus to which the specific document determining apparatus according to Embodiment 33 is applied. Herein it is assumed in description of the processing for checking operations of the microwave sensor 161 that the pressure plate 202 of the image reading apparatus has metallic members (such as a mirror pressure plate), and also that non-metallic members are provided around the pressure plate 202.

At first the controller 180 moves the microwave sensor 161 to a position close to the non-metallic members (S301c), and executes the processing for checking operations of the microwave sensor 161 (S302C). Concretely, the microwave sensor 161 irradiates a microwave to and scan the non-metallic members, and detects a reflected portion of the irradiated microwave. The signal processing section 162 receives an output signal from the microwave sensor 16, and makes determination as to whether there is any abnormality in the output signal from the non-metallic member or not (for instance, the abnormality that no output is provided from the microwave sensor 161).

When is determined by the signal processing section 162 that there is any abnormality in the output signal from the microwave sensor 161 (S303c), the controller 180 determines that the microwave sensor 161 is not working normally. On the other hand, when it is determined by the signal processing section 162 that there is not any abnormality in the output signal from the microwave sensor 161, the controller 180 moves the microwave sensor 161 to a position close to the metallic members (S304c), and executes the processing for checking operations of the microwave sensor 161 continuously (S305c). It should be noted that, when the processing for checking operations of the microwave sensor 161 is executed continuously, the signal processing section 162 stores therein an output signal from the non-metallic members used in the determination processing in step S302c.

In step S305c, the microwave sensor 161 irradiates a microwave to and scans the metallic members, and detects a reflected portion of the irradiated microwave. Then the signal processing section 162 receives an output signal from the microwave sensor 161 and makes determination as to whether there is any abnormality in the output signal from the metallic members.

When it is determined by the signal processing section 162 that there is any abnormality in an output signal from the microwave sensor 161 (S306c), the controller 180 determines that the microwave sensor 161 is not working normally. On the other hand, when it is determined by the signal processing section 162 that there is no abnormality in an output signal from the microwave sensor 161 (S306c), the controller 180 makes the signal processing section 162 compare an output signal from the non-metallic members to an output signal from the metallic member (S307c).

Figure 51:
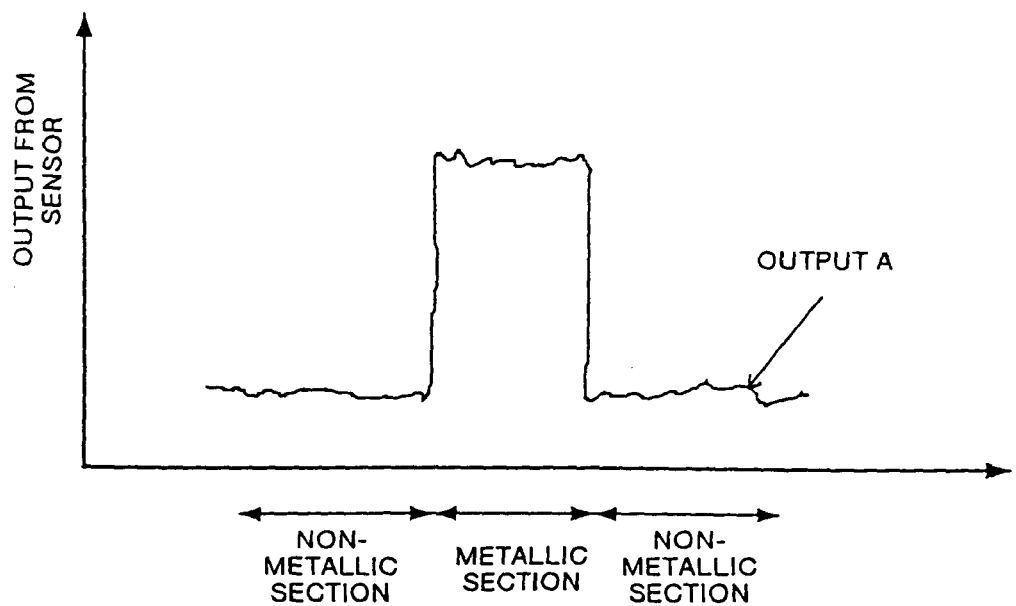
FIG. 51 is an explanatory view showing an output signal when the microwave sensor is normally operating.
Figure 52:
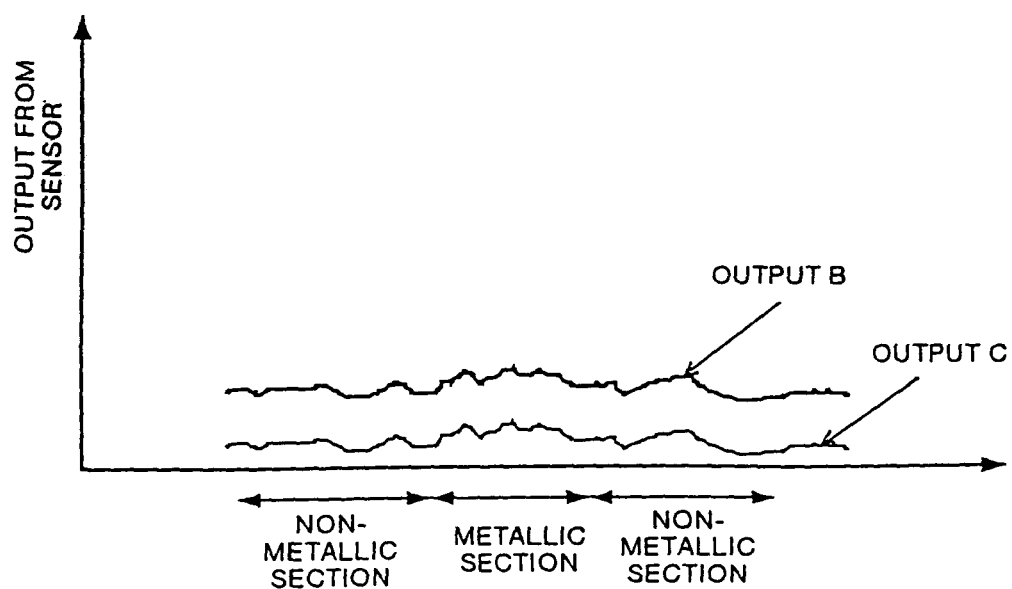
FIG. 52 is an explanatory view showing an output signal when any abnormality occurs in the microwave sensor.

Next description is made for the processing for comparing an output signal from the non-metallic members to that from the metallic members executed by the signal processing section 162. FIG. 51 is an explanatory view showing an output signal outputted when the microwave sensor 161 is working normally, and FIG. 52 is an explanatory view showing an output signal outputted when the microwave sensor 161 is not working normally.

Output A shown in FIG. 51 indicates that a level of an output signal from the metallic members is higher as compared to a level of an output signal from the non-metallic members, and that it is possible to differentiate the metallic members from the non-metallic members. However, from output B and output C shown in FIG. 52, it is understood that a level of output signals is substantially constant, and that, with the output signals, it is impossible to differentiate the non-metallic members from the metallic members.

Then the signal processing section 162 makes determination in step S308c as to whether a level of an output signal from the metallic members is higher than a level of output signals from the non-metallic numerals or not with reference to a level of an output signal from the non-metallic members as a reference.

When it is determined in step S308c that a level of an output signal from the metallic members is higher than that of an output signal from the non-metallic members, the controller 180 determines that the microwave sensor 161 is working normally. On the other hand, when it is determined by the signal processing section 162 that a level of an output signal from the metallic members is not higher than that of an output signal from the non-metallic members, the controller 180 determines that the microwave sensor 161 is not working normally.

It should be noted that, when it is determined that the microwave sensor 161 is not working normally, the controller 180 executes, for instance, the processing for displaying in the operation unit 150 that the microwave sensor 161 is not working normally.

As described above, with the image reading apparatus to which the specific document determining apparatus according to Embodiment 33 is applied, as a level of an output signal from the metallic members is compared to that of an output signal from the non-metallic members, it is possible to accurately determine whether the microwave sensor 161 is normally working or not. As a result, it is possible to prevent the processing for determining a specific document from being executed when the microwave sensor 161 is not working normally, which makes it possible to improve precision in determination of a specific document.

It should be noted that, in the image reading apparatus to which the specific document determining apparatus according to Embodiment 33 is applied, the signal processing section 162 makes determination as to whether there is any abnormality in an output signal from the microwave sensor 161, and the controller 180 makes determination as to whether the microwave sensor 161 is normally working or not according to a result of determination by the signal processing section 162, but the signal processing section 162 may make the processing for determination in batch.

When power is turned ON, the image reading apparatus to which the specific document determining apparatus according to Embodiment 34 of the present invention is applied executes the processing for checking operations of the microwave sensor 161 described in Embodiment 33. It should be noted that the image reading apparatus to which the specific document determining apparatus is applied in Embodiment 34 has the same configuration as the image reading apparatus to which the specific document determining apparatus according to Embodiment 33 is applied, and description thereof is omitted herein.

Figure 53:
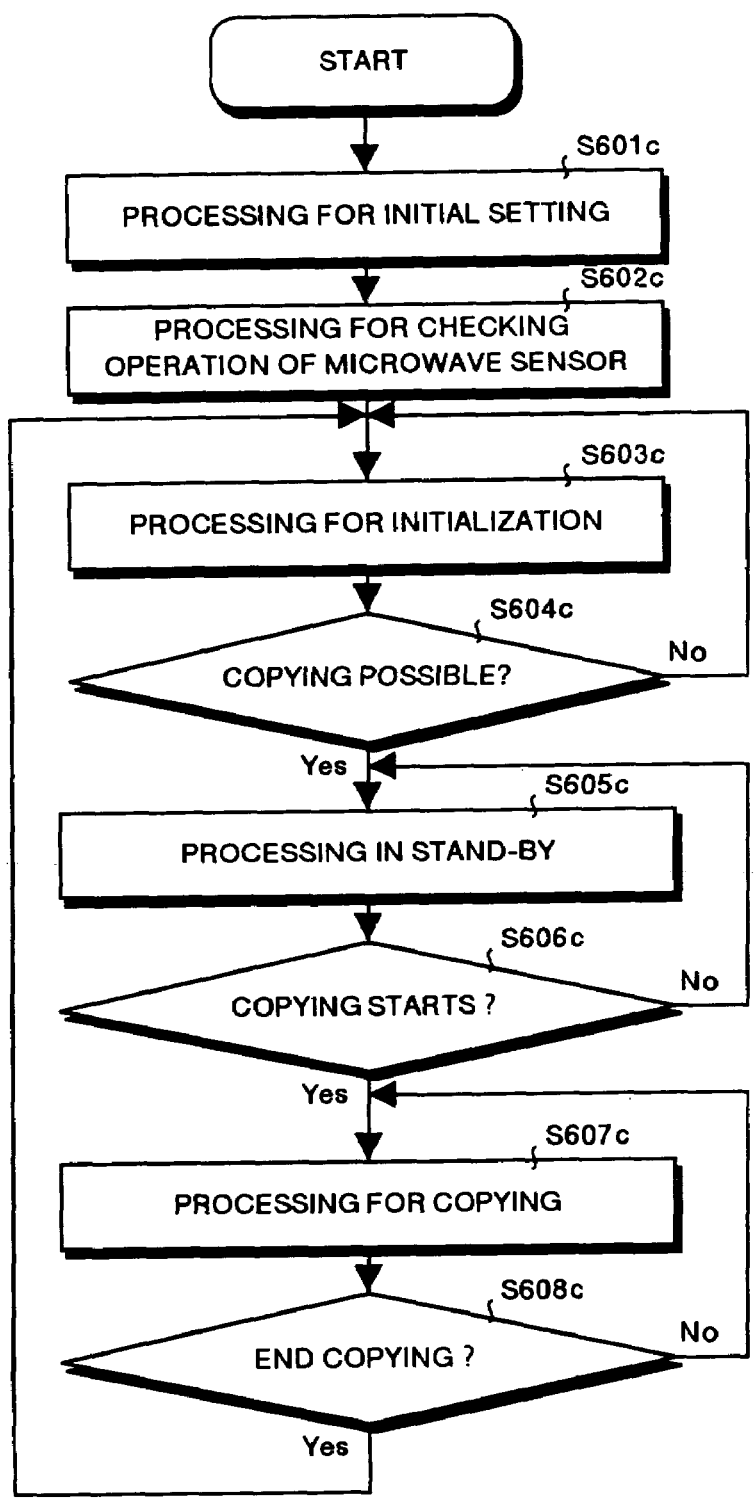
FIG. 53 is a flowchart showing operations of an image reading apparatus to which a specific document determining apparatus according to Embodiment 34 is applied.

Next description is made for operations of the image reading apparatus to which the specific document determining apparatus according to Embodiment 34 is applied. FIG. 53 is a flowchart showing operations of the image reading apparatus to which the specific document determining apparatus according to Embodiment 34 is applied.

When power for the image reading apparatus is turned ON, the processing for initial setting is executed (S601c). And, after the processing for initial setting is executed, the processing for checking operations of the microwave sensor 161 is executed under controls by the controller 180 (S602c). It should be noted that the processing for checking operations of the microwave sensor 161 was described in detail in relation to Embodiment 1 and description thereof is omitted herein.

When the processing for operations of the microwave sensor 161 is finished in step S602c, the processing for initialization is executed in the image reading apparatus (S603c), and it becomes possible to read an image from a-document (S604c). And, the image reading apparatus executes the processing in stand-by state (S605c), and waits for an instruction for reading an image (S606c).

When the controller 180 detects an instruction for reading an image (S606c), the controller 180 controls the microwave sensor 161 and the signal processing section 162, and makes determination as to whether a document, from which an image is to be read, is a specific document such as bills or marketable securities with metallic fiber included therein prior to start of operations for reading an image.

Namely, the microwave sensor 161 irradiates a microwave to and scans a document, detects a reflected portion of the irradiated microwave, and outputs a reflected signal corresponding to a level of a reflected wave. Then the signal processing section 162 receives the detection signal outputted from the microwave sensor 161, and compares a level of the detection signal to a preset threshold value. As a result of comparison of a level of the detection signal to the threshold value, when it is determined that a level of the detection signal is higher than the threshold value, the signal processing section 162 determines that metallic fiber is included in the document, and when it is determined that a level of the detection signal is not higher than the threshold value, the signal processing signal 162 determines that metallic fiber is not included in the document. A result of determination by the signal processing section 162 is reported to the controller 180. When it is determined that metallic fiber is included in the document, the controller 180 determines that the document is a specific document such as bills or marketable securities with metallic fiber included therein, and when it is determined that metallic fiber is not included in the document, the controller 180 determines that the document is not a specific document such as bills or marketable securities with metallic fiber included therein.

As described above, as a result of determination as to whether a document is a specific document one or not, when it is determined that the document is not a specific one, image data is read from the document (S607c). When reading of image data is finished (S608c), system control returns to step S603c, and the controller 180 waits for an instruction for reading image data.

On the other hand, when it is determined that a document is a specific one, according to the preset processing method, for instance, an operation for reading image data from a document is finished, or the processing for subjecting the read image data to a specific image processing is executed to prevent bills or marketable securities from being illegally copied.

However, when it is determined in step S602c for the processing for checking operations of the microwave sensor 161 that there is any abnormality in the microwave sensor 161, it is impossible to make determination as to whether a document is a specific one or not, and also it become impossible to prevent bills or marketable securities from being illegally copied. For this reason, the controller 180 inhibits, according to the present processing method, an operation for reading an image from the document, or executes the processing for, for instance, issuing an instruction to the image processor 120 to subject the read image data to a specific image processing.

As described above, with the image reading apparatus in which the specific document determining apparatus according to Embodiment 24 is applied, the processing for checking operations of the microwave sensor 161 is executed when power is turned ON, so that abnormality in the microwave sensor 161 can be detected early.

The image reading apparatus to which the specific document determining apparatus according to Embodiment 35 is applied executes the processing for checking operations of the microwave sensor 161 described in Embodiment 33 each time determination is made as to whether a document is a specific document such as bills or marketable securities with metallic fiber included therein or not. It should be noted that the image reading apparatus to which the specific document determining apparatus according to Embodiment 35 is applied has the same configuration that of the image reading apparatus to which the specific document determining apparatus according to Embodiment 33 is applied, and description thereof is omitted herein.

Figure 54:
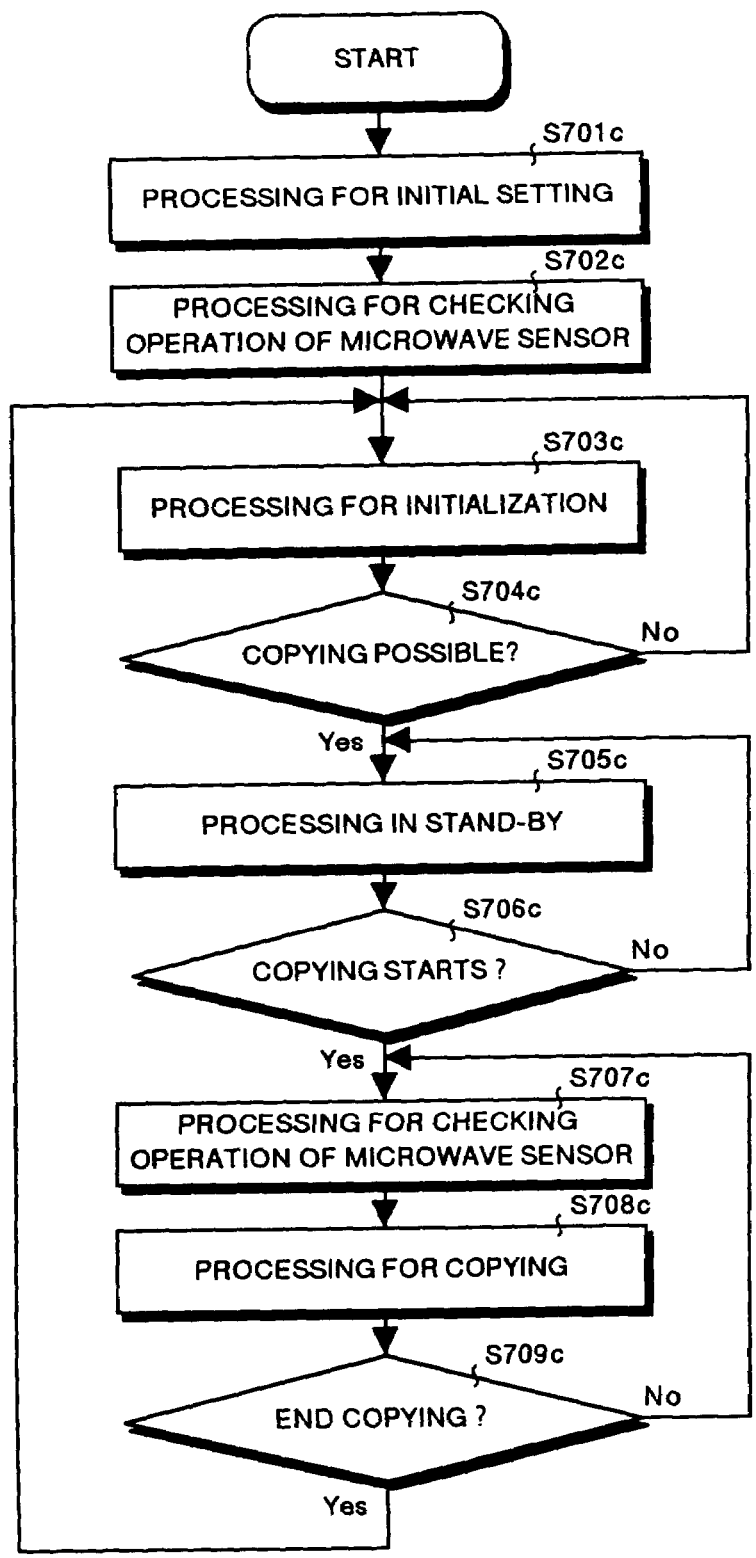
FIG. 54 is a flowchart showing operations of an image reading apparatus to which a specific document determining apparatus according to Embodiment 35 is applied.

Next description is made for operations of the image reading apparatus to which the specific document determining apparatus according to Embodiment 35 is applied. FIG. 54 is a flowchart showing operations of the image reading apparatus to which the specific document determining apparatus according to Embodiment 35 is applied.

When power for the image reading apparatus is turned ON, the processing for initialization is executed (S701c). After the processing for initialization is executed, the processing for checking operations of the microwave sensor 161 is executed under controls by the controller 180 (S702c). It should be noted that the processing for operations of the microwave sensor 161 were described in detail in relation to Embodiment 1, and description thereof is omitted herein.

In step S702c, when the processing for operations of the microwave sensor 161 is finished, the processing for initializing the image reading apparatus is executed (S703c), and an operation for reading an image from a document is enabled (S704c). And the image reading apparatus executes processing in the stand-by state (S705), and waits for an instruction for reading an image (S706c).

When an instruction for reading an image is detected (S706c), the controller 180 controls the microwave sensor 161 as well as the signal processing section 162, and executes the processing for checking operations of the microwave sensor 161 (S707c) prior to start of operations for reading an image and determining a specific document.

After the processing for checking operations of the microwave sensor 161 is executed in step S707c, determination is made as to whether a document, from which an image is to be read, is a specific document such as bills or marketable securities with metallic fiber included therein. The processing for determining a specific document was described in relation to Embodiment 34, and description thereof is omitted herein.

As a result of determination as to whether a document is a specific one or not, when it is determined that the document is not a specific one, image data is read from the document (S708c). And, when an operation for reading image data is finished (S709c), system control returns to step S703c, and an instruction for reading image data is waited for.

On the other hand, when it is determined that a document is a specific one, according to the preset processing method, for instance, the operation for reading image data from a document is finished, or the processing for subjecting the read image data to a specific image processing is executed to prevent bills or securities from being illegally copied.

However, in the processing for checking operations of the microwave sensor 161 executed in step S702c as well as in step S707c, when it is determined that there is any abnormality in the microwave sensor 161, the processing for making determination as to whether a document is a specific one or not can not be executed, and it becomes impossible to prevent bills or marketable securities from being illegally copied. For this reason, according to the preset processing method, the controller 180 executes such processing as inhibiting an operation for reading an image from a document, or issuing an instruction to the image processor 120 to subject the read image data to a specific image processing.

As described above, with the image reading apparatus to which the specific document determining apparatus according to Embodiment 35 is applied, the processing for checking operations of the microwave sensor 161 is executed each time the processing for making determination as to whether a document is a specific one or not is executed, so that it becomes possible to immediately detect abnormality in the microwave sensor 161.

As described above, the specific document determining apparatus according to the present invention comprises testing members comprising metallic members and non-metallic members provided for checking operations of the microwave sensor, and a determination controller for controlling the microwave sensor to make it irradiate a microwave to and scan the metallic members and non-metallic members, receiving an output signal from the metallic members and an output signal from the non-metallic members each outputted from the microwave sensor, and making determination whether the microwave sensor is working normally or not by comparing the output signal from the metallic members to that from the non-metallic members, so that it is possible to accurately determine whether the microwave sensor is normally working or not. As a result, it is possible to prevent the processing for determining a specific document from being executed when the microwave sensor is not working normally, which improves a precision in determination of a specific document.

With the specific document determining apparatus, when power for the specific document determining apparatus is turned ON, the determination controller executes the processing for making determination as to whether the microwave sensor is working normally or not, it is possible to detect abnormality in the microwave sensor 161 early.

With the specific document determining apparatus according to the present invention, the processing for making determination as to whether the microwave sensor is normally working or not is executed by the determination controller each time determination is made as to whether a document is a specific document or not, so that it is possible to immediately detect abnormality in the microwave sensor.

With the specific document determining apparatus according to the present invention, the metallic member is a white reference board, so that, when the specific document determining apparatus according to the present invention is applied to an image reading apparatus, the white reference board provided in the image reading apparatus can be used for determination as to whether the microwave sensor is normally working or not. For this reason, simplification of system configuration and cost reduction are enabled.

With the specific document determining apparatus according to the present invention, the metallic member is a metallic plate having bar code, and for this reason, when the specific document determining apparatus is applied to an image reading apparatus, the bar code plate provided in the image reading apparatus can be used for determination as to whether the microwave sensor is normally working or not. So simplification of system configuration and cost reduction are enabled.

Further with the specific document determining apparatus according to the present invention, the metallic member is a metallic pressure plate for covering a document, and for this reason when the specific document determining apparatus according to the present invention is applied in an image reading apparatus, the pressure plate provided in the image reading apparatus can be used for determination as to whether the microwave sensor is normally working or not. For this reason, simplification of system configuration and cost reduction are enabled.

FIG. 1 is a block diagram showing the image forming apparatus according to Embodiment 36. FIG. 32 is a block diagram showing the scanner unit 110. FIG. 33 is a block diagram showing the image processor 120. FIG. 34 is a block diagram showing the write processing unit 130 shown in FIG. 1. Further, FIG. 3 is a block diagram showing particular configuration of a document reading system in the image forming apparatus shown in FIG. 1. Concrete contents shown in each figure was already described, and description thereof is omitted herein.

The image forming apparatus according to Embodiment 36 has the configuration adapted to determination as to whether the microwave sensor 161 is normally working or not by using a pressure plate 202 or the like. When determination as to whether the microwave sensor 161 is normally working or not is to be executed, the controller 180 controls the microwave sensor 161 so that a microwave is irradiated to the metallic members (such as the metallic plate 202, white reference board 215, and bar code plate 220) and the non-metallic members for scanning. The signal processing section 162 receives output signals from the metallic members and output signal from the non-metallic members each outputted from the microwave sensor 161, and compares the output signal from the metallic members to that from the non-metallic member. And, the controller 180 makes determination as to whether the microwave sensor 161 is normally working or not according to a result of comparison in the signal processing unit 162. It should be noted that the case where the microwave sensor 161 is defined herein as a case, for instance, where the microwave sensor 161 is in failure, a case where the microwave sensor 161 has been removed, or a case where the signal line has been disconnected.

When it is determined that the microwave sensor 161 is not working normally, as the processing for making determination as to whether a document is a specified one or not can not be executed normally, the controller 180 restricts some of the functions which the image forming apparatus has by, for instance, inhibiting an operation for full color copy to prevent a specific document from being illegally copied, and provides controls so that the normally copying operation can be continued.

Next detailed description is made for operations of the image forming apparatus according to Embodiment 36 in the order of 1), the processing for checking operations of a microwave sensor, 2) the processing executed when any abnormality is generated in the microwave sensor, 3) the processing for determining a specific document, and 4) the operation for copying.

1) Processing for Checking Operations of a Microwave Sensor

Figure 55:
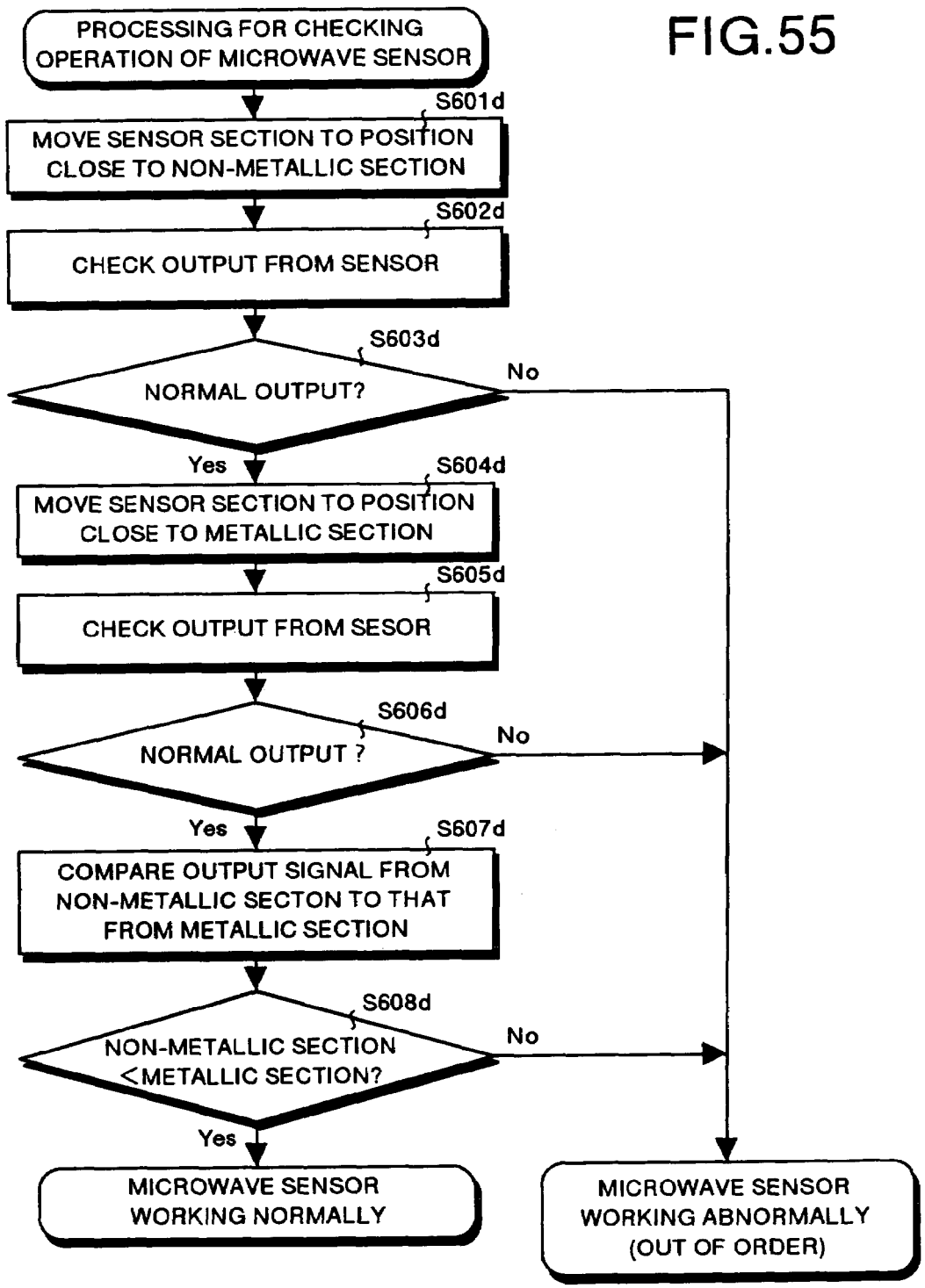
FIG. 55 is a flowchart showing processing for checking an operation of the microwave sensor in an image forming apparatus according to Embodiment 36.

FIG. 55 is a flowchart showing the processing for checking operations of the microwave sensor 161 in the image forming apparatus according to Embodiment 36. Herein description of the processing for checking operations of the microwave sensor 161 is made based on the assumption that the pressure plate of the image forming apparatus has metallic members (such as a mirror pressure plate), and that non-metallic members are provided around the pressure plate 202.

The processing for checking operations for the microwave sensor wave sensor 161 is executed when power for the image forming apparatus is turned ON, or before execution of the processing of determining a specific document. It should be noted that, in Embodiment 36, the processing for checking operations of the microwave sensor 161 is executed when power is turned ON.

In FIG. 55, at first the controller 180 moves the microwave sensor 161 to a position close to the non-metallic members (S601d), and executes the processing for checking operations of the microwave sensor 161 (S602d). Concretely, the microwave sensor 161 irradiates a microwave to and scans a non-metallic member, and detects a reflected portion of the irradiated microwave. The signal processing section 162 receives an output signal from the microwave sensor 161, and determines whether there is any abnormality in an output signal from the non-metallic member (such as the fact that no output is provided from the microwave sensor 161).

When it is determined in the signal processing section 162 that there is any abnormality in an output signal from the microwave sensor 161 (S603d), the controller 180 determines that the microwave sensor 161 is not normally working. On the other hand, when it is determined in the signal processing section 162 that there is no abnormality in an output signal from the microwave sensor 161 (S603d), the controller 180 moves the microwave sensor 161 to a position close to the metallic members (S604d), and has the processing for checking operations of the microwave sensor 161 executed continuously (S605d). It should be noted that, when the processing for checking operations of the microwave sensor 161 is to be executed continuously, the signal processing section 162 stores therein the output signal from the non-metallic members used in the processing for determination in step S602d.

In step S605d, the microwave sensor 161 irradiates a microwave to and scans the metallic members, and detects a reflected portion of the irradiated microwave. Then the signal processing section 162 receives an output signal from the microwave sensor 161, and makes determination as to whether there is any abnormality in an output signal from the metallic members or not.

When it is determined in the signal processing section 162 that there is any abnormality in an output signal from the microwave sensor 161 (S606d), the controllers 180 determines that the microwave sensor 161 is not normally working. On the other hand, when it is determined in the signal processing section 162 that there is no abnormality in an output signal from the microwave sensor 161 (S606d), the controller 180 makes the signal processing section 162 compare an output signal from the non-metallic member to an output signal from the metallic member (S607d).

Next description is made for the processing executed by the signal processing section 162 for comparing an output signal from the non-metallic members to that from the metallic members with reference to FIG. 51 and FIG. 52. FIG. 51 is an explanatory view showing an output signal outputted when the microwave sensor 161 is working normally, and FIG. 52 is an explanatory view showing an output signal outputted when the microwave sensor 161 is not normally working.

From the output A shown in FIG. 51, it is understood that a level of the output signal from the metallic members is higher as compared to that of the output signal from the non-metallic members, and that the non-metallic members and metallic members are differentiated from each other. However, the output B and output C shown in FIG. 52 show that each level of the output signals is substantially constant, and it is understood that, with the output signals, the non-metallic members and metallic members can not be differentiated from each other.

So the signal processing section 162 makes determination as to whether a level of an output signal from the metallic members is higher than that of an output signal from the non-metallic members or not by referring to a level of the output signal from the non-metallic members as a reference.

When the signal processing section 162 determines in step S608d that a level of an output signal from the metallic members is higher than that of an output signal from the non-metallic members, the controller 180 determines that the microwave sensor 161 is normally working. On the other hand, when it is determined by the signal processing section 162 in step S608d that a level of the output signal from the metallic members is not higher than that of the output signal from the non-metallic member, the controller 180 determines that there is any abnormality in the microwave sensor 161.

As described above, with the image forming apparatus according to Embodiment 36, as a level of an output signal from the metallic members is compared to a level of an output signal from the non-metallic members, it is possible to accurately determine whether the microwave sensor 161 is normally working or not. As a result, it is possible to prevent the processing for determining a specific document from being executed while the microwave sensor 161 is not normally working, which enables improvement of a precision in determination of a specific document.

It should be noted, that, although the signal processing section 162 makes determination as to whether there is any abnormality in an output signal from the microwave sensor 161 or not and the controller 180 makes determination as to whether there is any abnormality in the microwave sensor 161 or not according to a result of determination by the signal processing section 162 in the image forming apparatus according Embodiment 36, the signal processing section 162 may execute the processing for determination in batch.

2) Processing Executed when Abnormality is Generated in the Microwave Sensor

Next description is made for the processing when it is determined in the processing for checking operations of the microwave sensor 161 described above that there is any abnormality in the microwave sensor 161.

Figure 56:
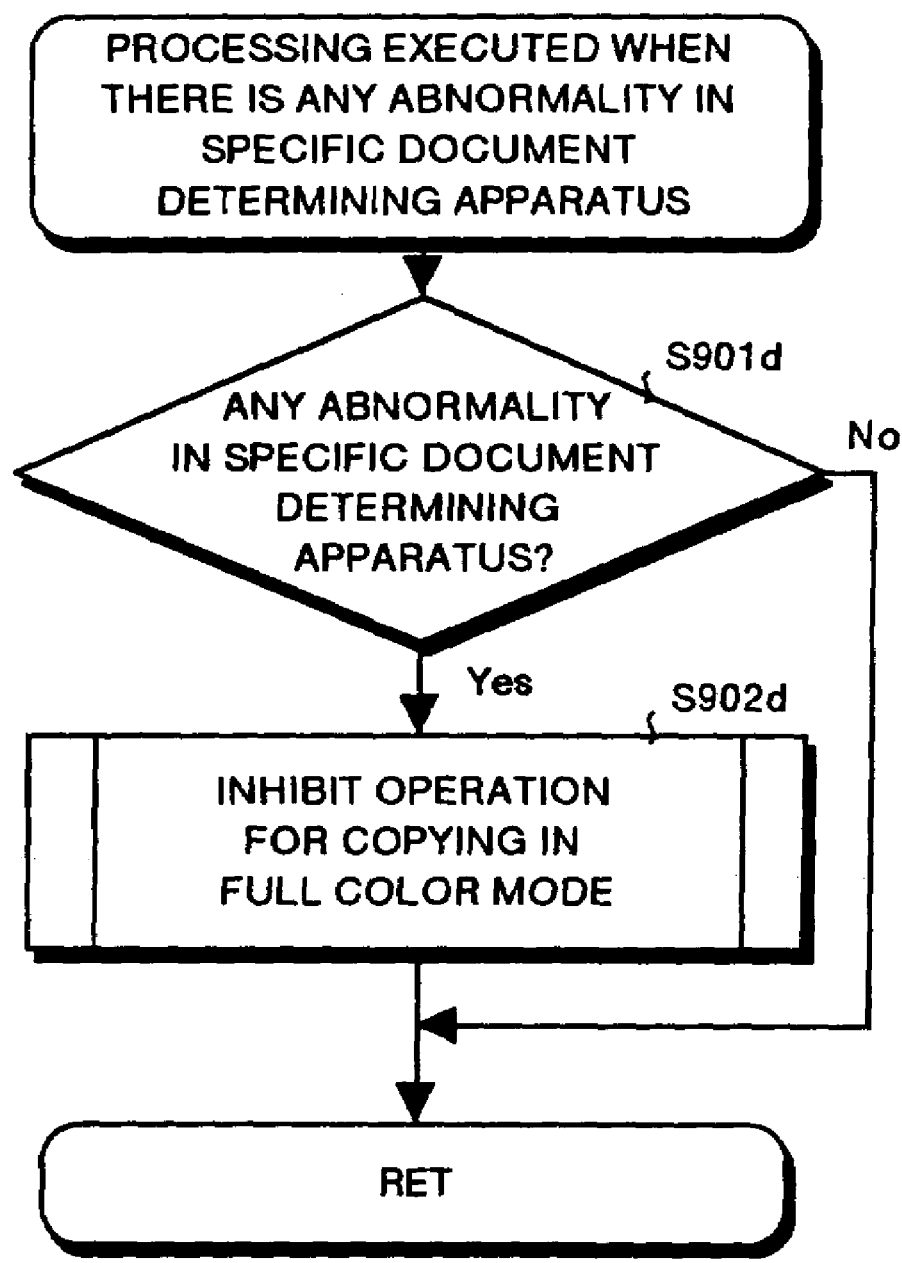
FIG. 56 is a flowchart showing processing executed when any abnormality occurs in the microwave sensor in the image forming apparatus according to Embodiment 36.

FIG. 56 is a flowchart showing the processing executed when there is any abnormality in the microwave sensor 161 (specific document determining apparatus) in the image forming apparatus according to Embodiment 36. In the processing for checking operations of the microwave sensor 161, when it is determined that there is any abnormality in the microwave sensor 161 (S901d), the controller 180 reads out a subroutine for inhibiting the full color mode in which an operation for copying with full colors is inhibited (S902d).

When it is determined that the microwave sensor 161 is normally working (S901d), the controller 180 executes the processing for making determination as to whether a document is a specific document such as bills or marketable securities with metallic fiber included therein upon input of an instruction for an operation for copying. It should be noted that the processing for determining a specific document is described later.

Figure 57:
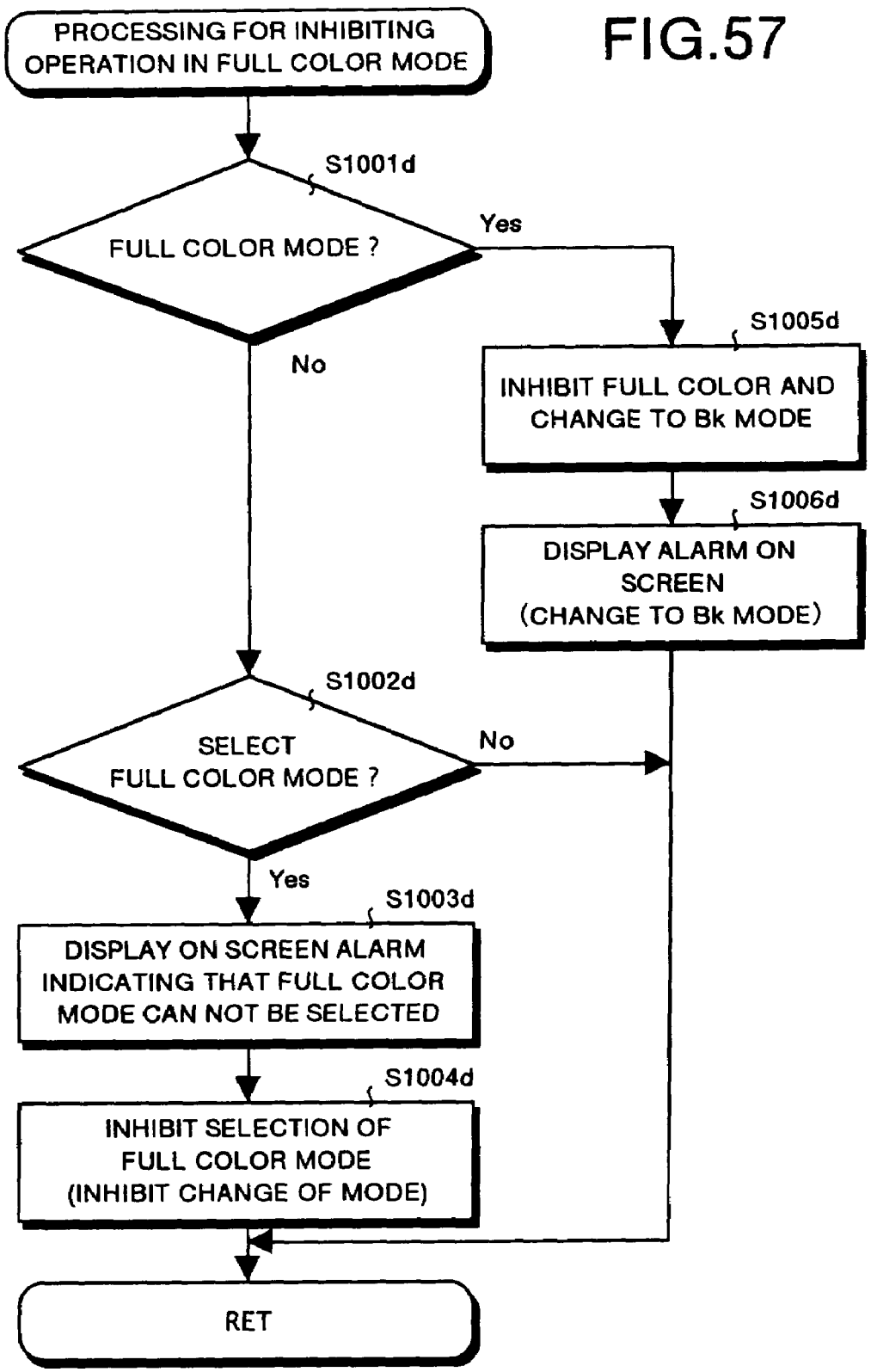
FIG. 57 is a flowchart showing processing for inhibiting a full color mode in the image forming apparatus according to Embodiment 36.

FIG. 57 is a flowchart showing the processing for inhibiting operations in the full color mode. The controller 180 at first makes determination as to whether the full color mode has been effected or not (S1001d). When it is determined in step S1001d that the full color mode has not been set, the controller 180 makes determination as to whether an instruction for selection of the full color mode has been inputted from the operating unit 150 or not (S1002d).

When it is determined in step S1002d that an instruction for selection of the full color mode has been inputted, the controller 180 makes the operating unit 150 display an alarm indicating that the full color mode can not be selected (S1003d) and inhibits selection of the full color mode (S1004d). Namely, switching to the full color mode is inhibited.

On the other hand, when it is determined in step S1001d that the full color mode has been set, the controller 180 changes the setting for the full color mode to the monochrome mode (S1005d), and makes the operation unit 150 display an alarm indicating that selection of the full color mode is impossible (S1006d).

When it is determined in step S1002d that an instruction for selection of the full color mode has not been inputted, the controller 180 terminates the processing for inhibiting the full color mode. It should be noted that, in this case, the controller 180 waits for input of an instruction for selection of the full color mode, and executes the processing in step S1003d and S1004d described above.

In the conventional technology, when any abnormality is generated in the specific document determining apparatus and the processing for determining a specific document is disabled, all operations for copying are inhibited irrespective of whether the current operating mode is the full color mode or the monochrome mode. However, an illegal operation for copying a specific document such as bills or marketable securities is generally copied with full colors is executed in the full color mode, and for this reason the illegal operation for copying a specific document can be prevented by inhibiting an operation for copying a specific document with full colors. Consequently, with the image forming apparatus according to Embodiment 36, only the copying operation in the full color mode is inhibited with the copying operation in the monochrome mode allowed, so that an illegal operation for copying bills, marketable securities or the like can be prevented with the operation for copying general documents allowed. Because of this feature, all the copying operations are not inhibited differently from a case in the image forming apparatus based on the conventional technology, and a down time of the image forming apparatus can be minimized.

3) Processing for Determining a Specific Document

In the processing for checking operations of the specific document determining apparatus described above, when it is determined that the specific document determining apparatus is normally working, determination as to whether a document is a specific document such as bills or marketable securities with metallic fiber included therein is executed as described below.

When an instruction for an operation for reading an image inputted from the operation unit 150 is detected, the controller 150 controls the microwave sensor 161 and the signal processing section 162, and makes determination as to whether a document from which an image is to be read is a specific document such as bills or marketable securities with metallic fiber included therein prior to start of the operation for reading the image.

Namely, the microwave sensor 161 irradiates a microwave to and scans a document, detects a reflected portion of the irradiated microwave, and outputs a detection signal corresponding to a level of the reflected wave. Then the signal processing section 162 receives the detection signal outputted from the microwave sensor 161, and compares a level of the detection signal to a preset threshold value. As a result of comparison of a level of the detecting signal to the threshold value, when it is determined that a level of the detection signal is higher than the threshold value, the signal processing section 162 determines that metallic fiber is included in the document, and when it is determined that a level of the detection signal is not higher than the threshold value, the signal processing section 162 determines that metallic fiber is not included in the document. A result of determination by the signal processing section 162 is reported to the controller 180. When it is determined that metallic fiber is included in the document, the controller 180 determines that the document is a specific document such as bills or marketable securities with metallic fiber included therein, and when it is determined that metallic fiber is not included in the document, the controller 180 determines that the document is not a specific document such as bills or marketable securities with metallic fiber included therein.

On the other hand, when it is determined that the document is a specific document, the controller 180 executes, according to the preset processing method, the processing for preventing a specific document such as bills or marketable securities from being illegally copied by executing such a processing as stopping an operation for reading image data from a document or executing the processing for subjecting the read image data to a specific image processing.

As a result of determination as to whether the document is a specific document or not, when it is determined that the document is not a specific document, the copying operation is executed as described above.

4) Copying Operation

In the processing for determining a specific document, when it is determined that a document is not a specific document, the copying operation is executed. At first, to read image data from a document, a first scanner 205 is reciprocally moved, and then the document is illuminated by an exposure illuminating unit 203 in the forward direction for scanning. The light reflected by the document is reflected by a first mirror 204, and is introduced into a second scanner 208. The reflected light introduced into the second scanner 208 is reflected by a second mirror 206 as well as by a third mirror 207, and is introduced into the image reading section 213. The reflected light introduced into the image reading section 213 passes through the filter 209 and lens 210, and then is introduced into the CCD 212. In the CCD 212, the reflected light is converted to color image data as electric signal, and is inputted into the read signal processing section 112.

The color image data is subjected to a specific processing in the read signal processing section 112 as well as in the image processor 120, and is outputted as a laser beam from the write processing unit 130. The printer unit 140 forms a color image using the laser beam outputted from the write processing unit 130, and transfers the formed color image onto recording paper.

It should be noted that description of the image forming apparatus according to Embodiment 36 assumes use of that using the microwave sensor 161 as a specific document determining apparatus, but the specific document determining apparatus is not limited to that using a microwave sensor. The processing for determining abnormality in the microwave sensor 161 was described above with reference to FIG. 55, but the processing for determining abnormality is not limited to that shown in FIG. 55. Further, the processing executed when any abnormality is generated in the microwave sensor was described with reference to FIG. 56 and FIG. 57, but it is needless to say that the processing shown in FIG. 56 and FIG. 57 is applicable not only to abnormality in a microwave sensor, but also to that in any type of specific document determining apparatus in an image forming apparatus having a specific document determining apparatus.

The image forming apparatus according to Embodiment 37 comprises, in the image forming apparatus having the configuration shown in FIG. 1, FIG. 3, and FIG. 32 to FIG. 34, a controller 180 for changing the image processing method for image data so that an image formed with image data read from a document after any abnormality is detected in the specific is document determining apparatus is differentiated from an image for the document and then having the copying operation executed, and an image processor 120 for receiving image data read from a document and subjecting the received image data to the image processing using the image processing method changed by the controller 180. It should be noted that configuration of the image forming apparatus according to Embodiment 37 is the same as that of the image forming apparatus according to Embodiment 36 described above, and description thereof is omitted herein.

Next description is made for operations of the image forming apparatus according to Embodiment 37. It should be noted that the processing for checking operations of the microwave sensor, processing for determining a specific document, and copying operation were already described in relation to Embodiment 36, so that description is made herein only for the processing executed when abnormality is generated in the microwave sensor.

Figure 58:
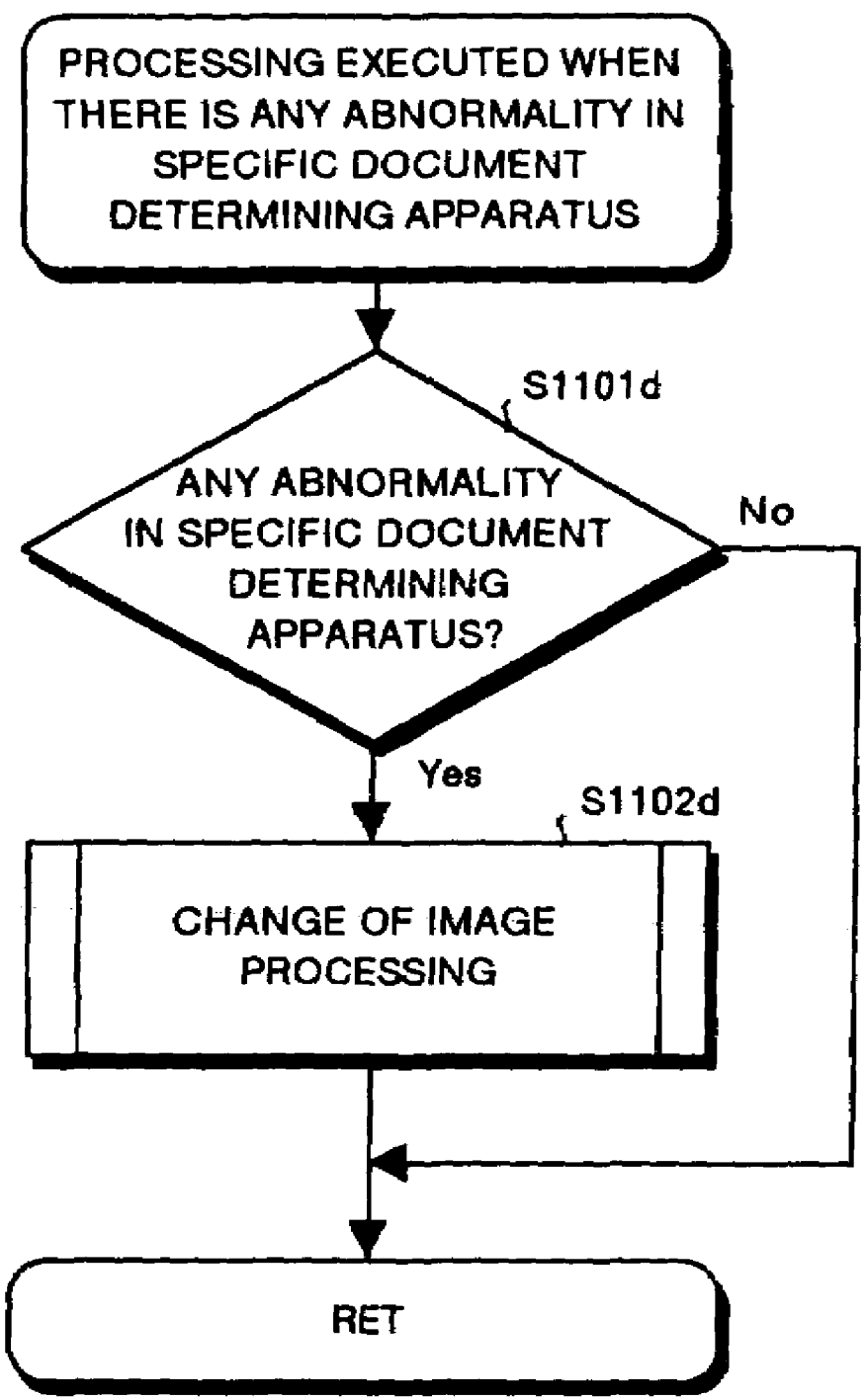
FIG. 58 is a flowchart showing processing executed when any abnormality occurs in the microwave sensor in an image forming apparatus according to Embodiment 37.

FIG. 58 is a flowchart showing the processing executed when abnormality is generated in a microwave sensor in the image forming apparatus according to Embodiment 37.

When it is determined that the microwave sensor 161 is not normally working (S1101*d*), the controller 180 reads out a subroutine for the processing for changing an image processing (S1102*d*).

On the other hand, when it is determined that the microwave sensor 161 is working normally (S1101*d*), the controller 180 makes determination as to whether the document is a specific document such as bills or marketable securities with metallic fiber included therein upon input of an instruction for the copying operation.

Figure 59:
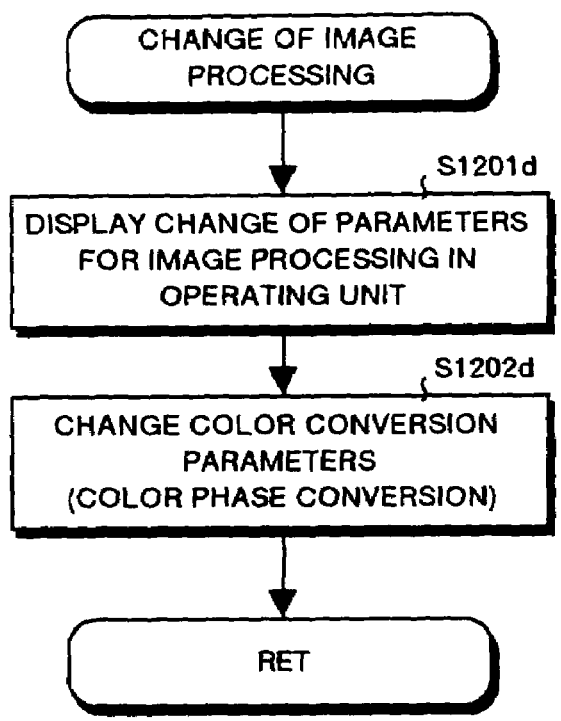
FIG. 59 is a flowchart showing processing for changing image processing in the image forming apparatus according to Embodiment 37.

FIG. 59 is a flowchart showing the processing for changing an image processing in the image forming apparatus according to Embodiment 37. In the image forming apparatus according to Embodiment 37, a color phase of color data is changed so that an image formed with image data read from a document is differentiated from an image for the document. For this reason, it is assumed herein that the full color copying operation is executed.

The controller 180 displays in the operating unit 150 an message indicating that execution of the processing for changing an image processing is started and parameters for the image processing are changed (S1201*d*).

Then the controller 180 changes parameters for color conversion in the image processor 120 so that a color phase of the read color image data can be changed (S1202*d*), and terminates the processing for changing an image processing.

Then, the image processor 120 receives the color image data read from a document, and changes a color phase of the color image data. As a result, an image formed from the color image data has a color tone different from that of an image for the document.

In the conventional technology, when abnormality is generated in the specific document determining apparatus and the processing for determining a specific document is disabled, all the copying operations are inhibited. However, an operation for copying a specific document such as bills or marketable securities is generally executed in the color copy mode, so that it is possible to prevent a specific document from being illegally copied without inhibiting all types of copying operation by changing the image processing for the color image data read from a document so that the image will be differentiated from an image for the document. For this reason, with the image forming apparatus according to Embodiment 37, as a color phase of color image data read from a document is changed, it is possible to prevent bills, marketable securities or the like from being illegally copied, and the copying operation in the monochrome mode can be executed as usual, so that a general monochrome document can be copied as usual. With this feature, different from a case in the image forming apparatus based on the conventional technology, all the copying operations are not inhibited, so that down time of the image forming apparatus can be minimized.

It should be noted that description of the image forming apparatus according to Embodiment 37 assumes use of the microwave sensor 161 as a specific document determining apparatus, but the specific document determining apparatus is not limited to that using a microwave sensor. Also the processing executed when abnormality is generated in the microwave sensor was described with reference to FIG. 58 and FIG. 59, it is needless to say that the processing is applicable not to the abnormality in the microwave sensor, but also to abnormality in any type of specific document determining apparatus in an image forming apparatus having a specific document determining apparatus.

The image forming apparatus according to Embodiment 38 is different from the image forming apparatus according to Embodiment 37 in the point that, when abnormality is detected in the specific document determining apparatus, the controller 180 changes the image processing method by changing density parameters for the image processor 120 so that an image formed with image data read from a document is differentiated from an image for the document.

Figure 60:
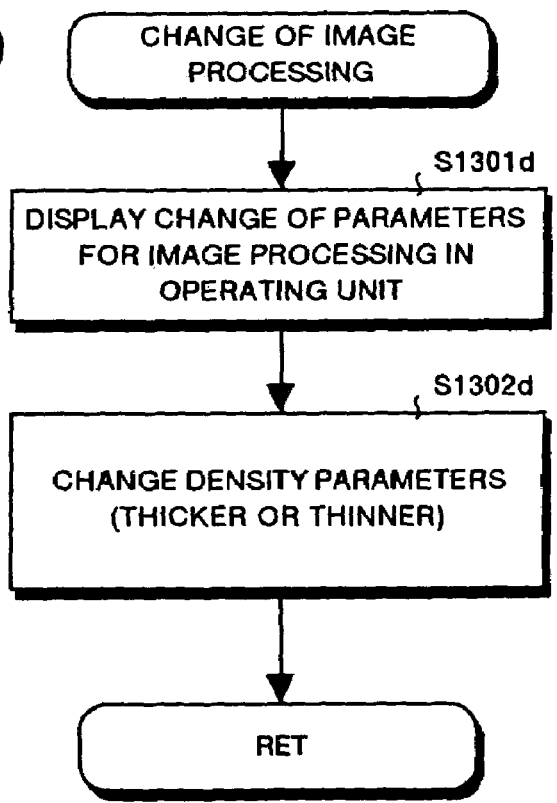
FIG. 60 is a flowchart showing processing for changing image processing in an image forming apparatus according to Embodiment 38.

FIG. 60 is a flowchart showing the processing for changing the image processing in the image forming apparatus according to Embodiment 38. The controller 180 displays in the operating unit 150 a message indicating that the processing for changing the image processing is started and parameters for the image processing are changed (S1301d).

Then the controller 180 changes density parameters of the image processor 120 so that a density of read color image data can be made thicker or thinner (S1302d), and then terminates the processing for changing the image processing.

Then the image processor 120 receives the color image data read from the document, and changes a density of the color image data. As a result, the image formed from the color image data has a density balance different from that of an image for the document.

In the conventional technology, when any abnormality is generated in the specific document determining apparatus and the processing for determining a specific document is disabled, all the copying operations are inhibited. However, as an operation for copying a specific document such as bills or marketable securities is generally executed in the color copy mode, so that it is possible to prevent a specific document from being illegally copied without inhibiting all types of copying operation by changing the image processing for the color image data read from a document so that the image will be differentiated from an image for the document. For this reason, with the image forming apparatus according to Embodiment 38, as a density of color image data read from a document is changed, it is possible to prevent bills, marketable securities or the like from being illegally copied, and the copying operation in the monochrome mode can be executed as usual, so that a general monochrome document can be copied as usual. With this feature, differently from a case in the image forming apparatus based on the conventional technology, all the copying operations are not inhibited, so that down time of the image forming apparatus can be minimized.

The image forming apparatus according to Embodiment 39 of the present invention is different from the image forming apparatus according to Embodiment 37 in the point that, when any abnormality is detected in the specific document determining apparatus, the controller 180 changes the image processing method by changing parameters for color conversion in the image processor 120 so that an image formed with image data read from a document is differentiated from an image for the document.

Figure 61:
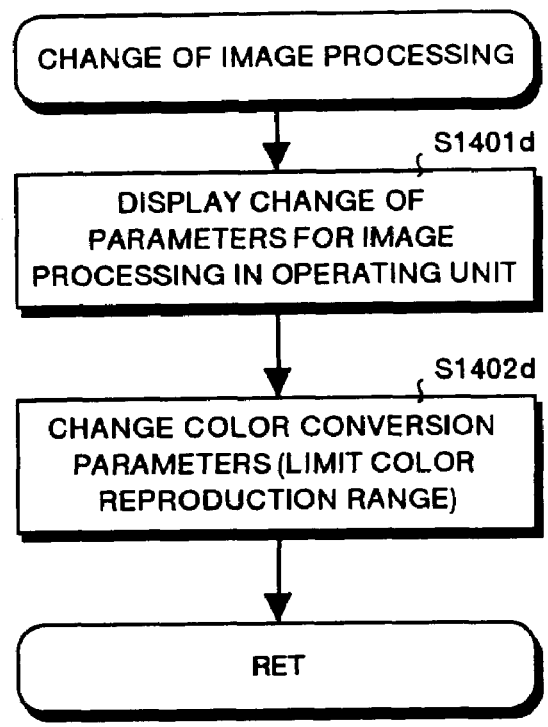
FIG. 61 is a flowchart showing processing for changing image processing in an image forming apparatus according to Embodiment 39.

FIG. 61 is a flowchart showing the processing for changing the image processing in the image forming apparatus according to Embodiment 39. The controller 180 displays a message in the operating unit 150 that the processing for changing an image processing is started and parameters for the image processing are changed (S1401d).

Then the controller 180 changes parameters for color conversion in the image processor 120 so that a color reproduction range for the read color image data can be limited (S1402d), and then terminates the processing for changing the image processing.

Then, the image processing 120 receives color image data read from the document, and executes the processing for limiting a color reproduction range for the color image data. As a result, an image formed from the color image data has reproduced colors (a color tone) different from that of an image for the document.

In the conventional technology, when any abnormality is generated in the specific document determining apparatus and the processing for determining a specific document is disabled, all the copying operations are inhibited. However, an operation for copying a specific document such as bills or marketable securities is generally executed in the color copy mode, so that it is possible to prevent a specific document from being illegally copied without inhibiting all types of copying operation by changing the image processing for the color image data read from a document so that the image will be differentiated from an image for the document. For this reason, with the image forming apparatus according to Embodiment 39, as a color reproduction range of color image data read from a document is limited, it is possible to prevent bills, marketable securities or the like from being illegally copied, and the copying operation in the monochrome mode can be executed as usual, so that a general monochrome document can be copied as usual. With this feature, differently from a case in the image forming apparatus based on the conventional technology, all the copying operations are not inhibited, so that down time of the image forming apparatus can be minimized.

The image forming apparatus according to Embodiment 40 of the present invention is different from that according to Embodiment 37 in the point that, when any abnormality is detected in the specific document determining apparatus, the controller 180 makes the image processor 120 change parameters for a resolution for changing the image processing method so that an image formed with image data read from a document is differentiated from an image for the document.

Figure 62:
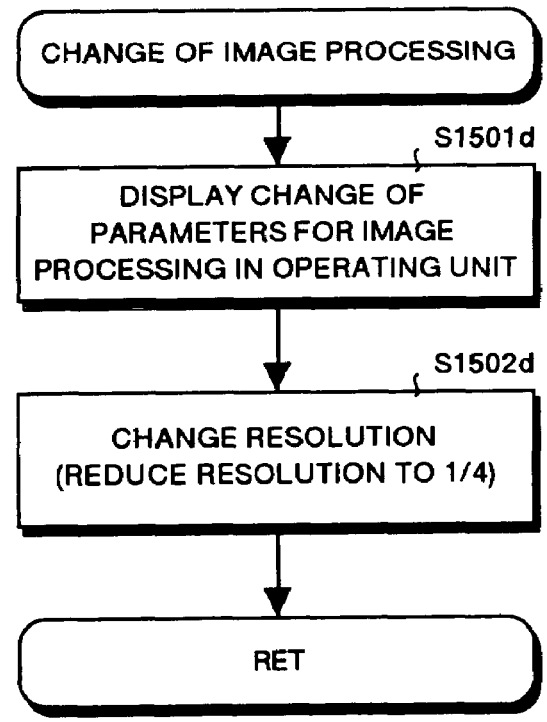
FIG. 62 is a flowchart showing processing for changing image processing in an image forming apparatus according to Embodiment 40.

FIG. 62 is a flowchart showing the processing for changing the image processing in the image forming apparatus according to Embodiment 40. The controller 180 displays a message in the operation unit 150 that the processing for changing an image processing is started and parameters for the image processing are changed (S1501d).

Then the controller 180 changes parameters for resolution in the image processor 120 so that the resolution of read color image data becomes lower, for instance, ¼ (S1502d), and then terminates the processing for changing the image processing.

Then, the image processing 120 receives color image data read from the document, and makes lower the resolution of the color image data to ¼ of the original one. As a result, an image formed from the color image data is different from that of an image for the document.

In the conventional technology, when any abnormality is generated in the specific document determining apparatus and the processing for determining a specific document is disabled, all the copying operations are inhibited. However, an operation for copying a specific document such as bills or marketable securities is generally executed in the color copy mode, so that it is possible to prevent a specific document from being illegally copied without inhibiting all types of copying operation by changing the image processing for the color image data read from a document so that the image will be differentiated from an image for the document. For this reason, with the image forming apparatus according to Embodiment 40, as the reduction of color image data read from a document is changed, it is possible to prevent bills, marketable securities or the like from being illegally copied, and the copying operation in the monochrome mode can be executed as usual, so that a general monochrome document can be copied as usual. With this feature, differently from a case in the image forming apparatus based on the conventional technology, all the copying operations are not inhibited, so that down time of the image forming apparatus can be minimized.

The image forming apparatus according to Embodiment 41 of the present invention is different from that according to Embodiment 37 in the point that, when any abnormality in the specific document determining apparatus is detected, the controller 180 makes the image processor 120 execute the mosaic processing for the purpose to change the image processing method so that an image formed with the image data read from a document is differentiated from an image for the document.

Figure 63:
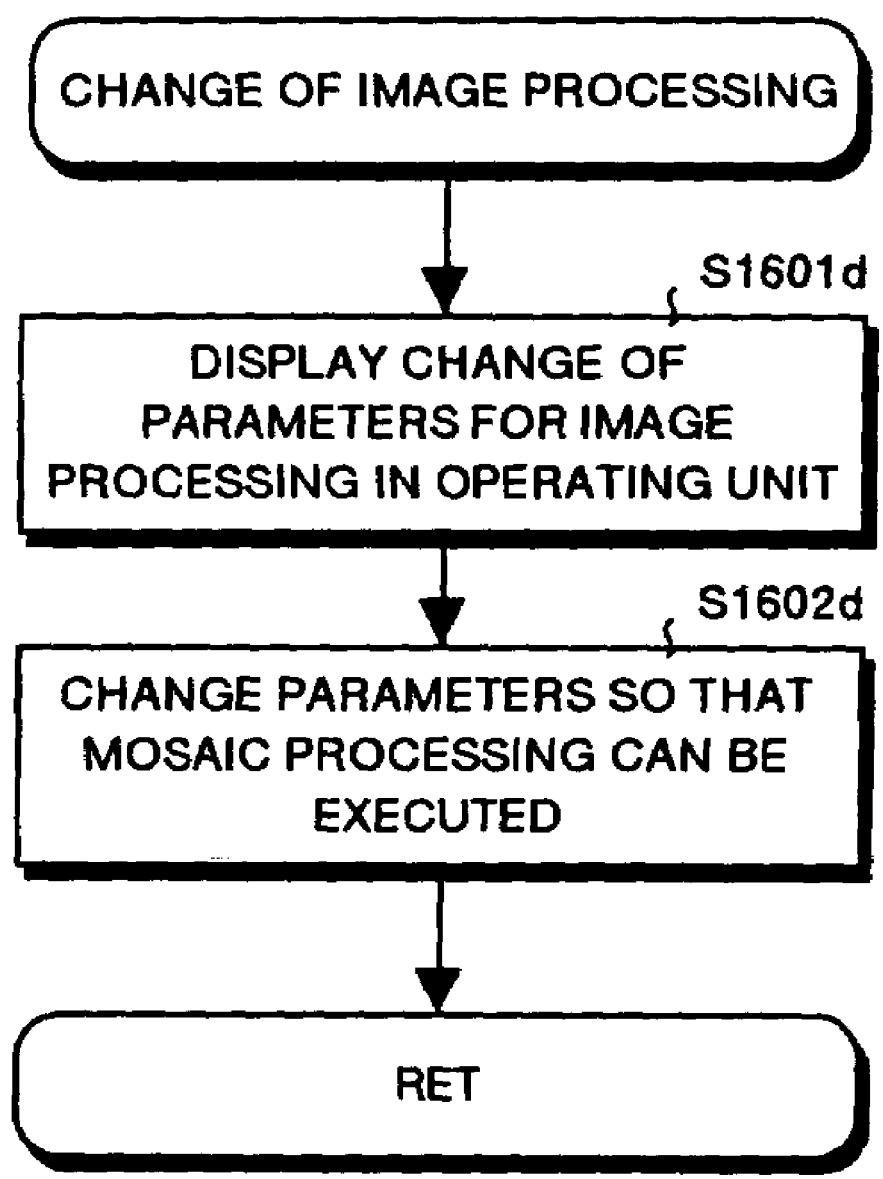
FIG. 63 is a flowchart showing processing for changing image processing in an image forming apparatus according to Embodiment 41.

FIG. 63 is a flowchart showing the processing for changing the image processing in the image forming apparatus according to Embodiment 41. The controller 180 displays a message in the operating unit 150 that the processing for changing an image processing is started and parameters for the image processing are changed (S1601*d*).

Then the controller 180 changes parameters for the image processor 120 so that the mosaic processing can be executed to the read color image data (S1602*d*), and then terminates the processing for changing the image processing.

Then, the image processing 120 receives color image data read from the document, and executes the mosaic processing to the color image data. As a result, an image formed from the color image data is different from that of an image for the document.

In the conventional technology, when any abnormality is generated in the specific document determining apparatus and the processing for determining a specific document is disabled, all the copying operations are inhibited. However, an operation for copying a specific document such as bills or marketable securities is generally executed in the color copy mode, so that it is possible to prevent a specific document from being illegally copied without inhibiting all types of copying operation by changing the image processing for the color image data read from a document so that the image will be differentiated from an image for the document. For this reason, with the image forming apparatus according to Embodiment 41, as the mosaic processing is executed to color image data read from a document, it is possible to prevent bills, marketable securities or the like from being illegally copied, and the copying operation in the monochrome mode can be executed as usual, so that a general monochrome document can be copied as usual. With this feature, differently from a case in the image forming apparatus based on the conventional technology, all the copying operations are not inhibited, so that down time of the image forming apparatus can be minimized.

It should be noted that, in Embodiments 37 to 41, when changing the image processing, the image processing may be changed by not only changing only a color phase or a density of color image data read from a document, but also by combining the processing above, for instance, to simultaneously change both the color phase and density.

As described above, the image forming apparatus according to the present invention has a controller for having the copying operation executed in the state where some of functions owned by the image forming apparatus are suppressed when any abnormality is detected in the specific document determining apparatus, so that, even when determination of a specific document can not be executed, it is possible to prevent a specific document such as bills or marketable securities from being illegally copied by inhibiting only the copying operations using the suppressed functions, and at the same time to have the copying operation without using the suppressed functions, thus the copying operation being executed continuously. Also all the copying operations are not inhibited, so that down time of the image forming apparatus can be minimized.

With the image forming apparatus according to the present invention, the controller restricts some of functions owned by the image forming apparatus by inhibiting the copying operation in the full color mode, so that, even if determination of a specific document can not be executed, it is possible to prevent bills, marketable securities, or the like from being illegally copied with an operation for copying an ordinary document in the monochrome mode kept enabled. With this feature, all the copying operations are not inhibited, so that down time of the image forming apparatus can be minimized.

The image forming apparatus according to the present invention has a display unit for displaying a message indicating that the copying operation in the full color mode has been inhibited when the controller inhibits the copying operation in the full color mode, so that it is possible to make a user understand that abnormality has been generated in the specific document determining apparatus and the copying operation in the full color mode can not be executed.

Further the image forming apparatus according to the present invention comprises a controller for having the copying operation executed by changing the image processing method to image data, when any abnormality in the specific document determining apparatus is detected, so that the image formed with the image data read from a document is differentiated from an image for the document, and an image processor for receiving image data read from a document and subjecting the received image data to an image processing by using the image processing method changed by the controller above, so that, even when the processing for determining a specific document can not be executed, it is possible to output a copy of an image different from an image for the document and prevent bills, marketable securities, or the like from being illegally copied. Also all the copying operations are not inhibited so that down time of the image forming apparatus can be minimized.

The image forming apparatus according to the present invention has a display unit for displaying a message indicating that the image processing method has been changed when the controller changes the image processing method, so that, even when a copy of an image different from an image for the document is outputted, the user can understand the reason.

Further in the image forming apparatus according to the present invention, the controller changes the image processing method by specifying at least one of the processing for changing a color phase, processing for changing a density, processing for limiting a color reproduction range, processing for lowering a resolution, and mosaic processing to the image processor, so that it is possible to output a copy of an image different from an image for the document and also the prevent bills or marketable securities from being illegally copied.

This application is based-on Japanese patent application Nos. HEI 8-284396, HEI 8-284397, HEI 8-289894, HEI 8-289895 and HEI 8-294194 filed in the Japanese Patent Office on Oct. 25, 1996, Oct. 25, 1996, Oct. 31, 1996, Oct. 31, 1996 and Nov. 6, 1996, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The invention claimed is:

1. An image forming apparatus, comprising:
    a specific document determining module configured to determine whether an original document is a specific document;
    means for detecting an abnormality in a sensor of the specific document determining module;
    a controller configured to inhibit full-color copying and to change a mode to monochrome mode upon detection of the abnormality in the sensor of the specific document determining module; and
    a display unit configured to display a message indicating that full-color copying can not be selected.

2. The image forming apparatus of claim 1, wherein the means for detecting the abnormality includes means for moving a microwave sensor.

3. The image forming apparatus of claim 1, wherein the controller is configured to inhibit full-color copying without inhibiting other modes of copying.

4. The image forming apparatus of claim 1, wherein the controller is configured to inhibit full-color copying without replacing image data corresponding to the original document with predetermined image data.

* * * * *